United States Patent
Vermeulen et al.

(10) Patent No.: US 12,223,245 B2
(45) Date of Patent: Feb. 11, 2025

(54) VIRTUAL ENVIRONMENT FOR IMPLEMENTING INTEGRATED PHOTONICS ASSEMBLIES

(71) Applicant: SiPhox Inc., Cambridge, MA (US)

(72) Inventors: Diedrik Rene Vermeulen, Cambridge, MA (US); Michael Dubrovsky, Cambridge, MA (US)

( * ) Notice: Subject to any disclaimer, the term of this patent is extended or adjusted under 35 U.S.C. 154(b) by 0 days.

(21) Appl. No.: 17/922,321

(22) PCT Filed: Apr. 29, 2021

(86) PCT No.: PCT/US2021/029926
§ 371 (c)(1),
(2) Date: Oct. 28, 2022

(87) PCT Pub. No.: WO2021/222590
PCT Pub. Date: Nov. 4, 2021

(65) Prior Publication Data
US 2023/0186005 A1    Jun. 15, 2023

Related U.S. Application Data

(60) Provisional application No. 63/065,622, filed on Aug. 14, 2020, provisional application No. 63/017,616, filed on Apr. 29, 2020.

(51) Int. Cl.
*G06F 30/3308* (2020.01)
*G06F 30/31* (2020.01)
*G06F 111/20* (2020.01)

(52) U.S. Cl.
CPC .......... *G06F 30/3308* (2020.01); *G06F 30/31* (2020.01); *G06F 2111/20* (2020.01)

(58) Field of Classification Search
CPC .. G06F 30/3308; G06F 30/31; G06F 2111/20; G06F 2115/08; G06F 30/367;
(Continued)

(56) References Cited

U.S. PATENT DOCUMENTS 7,251,386 B1 * 7/2007 Dickinson .............. H04B 10/25
    385/24
10,185,799 B2 * 1/2019 Cao ........................ G06F 30/398
(Continued)

OTHER PUBLICATIONS

Vplcomponentmaker, "VPIphotonics Photonics Circuits", Jul. 19, 2019 (Jul. 19, 2019), Retrieved from the Internet: URL:https://web.archive.org/web/20190719075246/https://vpiphotonics.com/Tools/PhotonicCircuits/XP055826013.
(Continued)

*Primary Examiner* — Nha T Nguyen
(74) *Attorney, Agent, or Firm* — Caldwell Intellectual Property Law

(57) ABSTRACT

Systems and methods for generating a virtual environment for implementing an integrated photonics assembly are presented. An example system can include one or more processors and a memory coupled with the processors, where the processor executes a plurality of modules stored in the memory. The plurality of modules can include a user interface module for deploying one or more virtual photonic integrated subcircuits within the virtual environment, in which the virtual environment is configured to enable coupling of at least two virtual photonic integrated subcircuits. The coupling of the virtual photonic integrated subcircuits can form a virtual integrated photonics assembly. The modules can include a library module comprising a plurality of virtual photonic integrated subcircuits. One or more virtual photonic integrated subcircuits can include a performance characteristic. The performance characteristic can represent a real-world performance characteristic of a pre-fabricated physical photonic integrated subcircuit corresponding to the virtual photonic integrated subcircuit.

23 Claims, 64 Drawing Sheets

(58) Field of Classification Search
CPC ..... G06F 30/38; G02B 6/12004; G02B 6/423; H05K 1/0286; H05K 2203/049
See application file for complete search history.

(56) References Cited

U.S. PATENT DOCUMENTS

| | | | | |
|---|---|---|---|---|
| 10,331,842 | B2* | 6/2019 | Alloatti | G06F 30/398 |
| 10,503,865 | B2* | 12/2019 | Alloatti | G06F 30/392 |
| 10,650,110 | B2* | 5/2020 | Van Vaerenbergh | ... G06F 30/39 |
| 11,176,309 | B1* | 11/2021 | Hossam | G02B 6/12004 |
| 11,256,841 | B1* | 2/2022 | Lamant | G06F 30/367 |
| 2014/0007032 | A1* | 1/2014 | Acar | G06F 30/398 |
| | | | | 716/112 |
| 2016/0012176 | A1* | 1/2016 | Liu | G02B 6/107 |
| | | | | 716/112 |
| 2016/0055122 | A1* | 2/2016 | Koranne | G02B 6/12011 |
| | | | | 703/2 |
| 2016/0171149 | A1* | 6/2016 | Alloatti | G06F 30/392 |
| | | | | 716/52 |
| 2018/0189425 | A1* | 7/2018 | Van Vaerenbergh | G02B 6/43 |
| 2019/0018919 | A1* | 1/2019 | Huang | G06F 30/30 |
| 2019/0311086 | A1 | 10/2019 | Alloatti | |
| 2019/0324223 | A1* | 10/2019 | Yim | H04B 10/60 |
| 2020/0327269 | A1* | 10/2020 | Pond | G06N 10/00 |
| 2021/0057365 | A1* | 2/2021 | Kuo | G01R 31/31704 |
| 2021/0181414 | A1* | 6/2021 | Hakkers | G02B 6/1225 |
| 2022/0138371 | A1* | 5/2022 | Youn | G06F 30/367 |
| | | | | 703/13 |
| 2023/0283396 | A1* | 9/2023 | Mathai | H04J 14/0278 |
| | | | | 398/79 |
| 2023/0297751 | A1* | 9/2023 | Cohen | G06F 30/392 |
| | | | | 716/119 |

OTHER PUBLICATIONS

Mingaleev Sergei et al, "Towards an automated design framework for large-scale photonic integrated circuits", Proceedings of SPIE, IEEE, US, vol. 9516, May 1, 2015 (May 1, 2015), p. 951602-951602, XP060053373.

Aspic, "Aspic", Jun. 26, 2019 (Jun. 26, 2019), Retrieved from the Internet: URL:https://web.archive.org/web/20190626080632/http://www.aspicdesign.com/XP055825666.

Daniele Melati et al, "Building block based design of photonic integrated circuits for generic photonic foundries", 2012 14th International Conference on Transparent Optical Networks (ICTON 2012): Coventry, United Kingdom, Jul. 2-5, 2012, IEEE, Piscataway, NJ,Jul. 2, 2012 (Jul. 2, 2012), p. 1-4, XP032214527.

Meint Smit et al, "An introduction to InP-based generic integration technology", Jun. 13, 2014 (Jun. 13, 2014), vol. 29, No. 8, p. 83001, XP020264226.

Chrostowski Lukas et al, "Silicon Photonic Circuit Design Using Rapid Prototyping Foundry Process Design Kits", Sep. 1, 2019 (Sep. 1, 2019), vol. 25, No. 5, p. 1-26, XP011741191.

International Search Report and Written Opinion for PCT/US2021/029926.

Aspic, "Aspic", Web page http://www.aspicdesign.com/, 3 pages, Jun. 26, 2019, Retrieved from Internet Archive Wayback Machine: https://web.archive.org/web/20190626080632/http://www.aspicdesign.com on Feb. 15, 2023.

Chrostowski Lukas et al, "Silicon Photonic Circuit Design Using Rapid Prototyping Foundry Process Design Kits", Sep. 1, 2019 (Sep. 1, 2019), vol. 25, No. 5, pp. 1-26, XP011741191.

Daniele Melati et al, "Building block based design of photonic integrated circuits for generic photonic foundries", 2012 14th International Conference on Transparent Optical Networks (ICTON 2012): Coventry, United Kingdom, Jul. 2-5, 2012, IEEE, Piscataway, NJ,Jul. 2, 2012 (Jul. 2, 2012), pp. 1-4, XP032214527.

International Search Report and Written Opinion for PCT/US2021/029926, filed Apr. 29, 2021. Date of mailing Jul. 29, 2021, 19 pages.

Meint Smit et al, "An introduction to InP-based generic integration technology", Jun. 13, 2014 (Jun. 13, 2014), vol. 29, No. 8, p. 83001, XP020264226, 41 pages.

Mingaleev Sergei et al, "Towards an automated design framework for large-scale photonic integrated circuits", Proceedings of SPIE, IEEE, US, vol. 9516, May 1, 2015 (May 1, 2015), p. 951602, XP060053373, 15 pages.

Vplcomponentmaker, "VPlphotonics Photonics Circuits", Web page https://vplphotonics.com/Tools/PhotonicCircuits, 2 pages, Jul. 19, 2019, Retrieved from the Internet Archive Wayback Machine: https://web.archive.org/web/20190719075246/https://vplphotonics.com/Tools/PhotonicCircuits on Feb. 15, 2023.

* cited by examiner

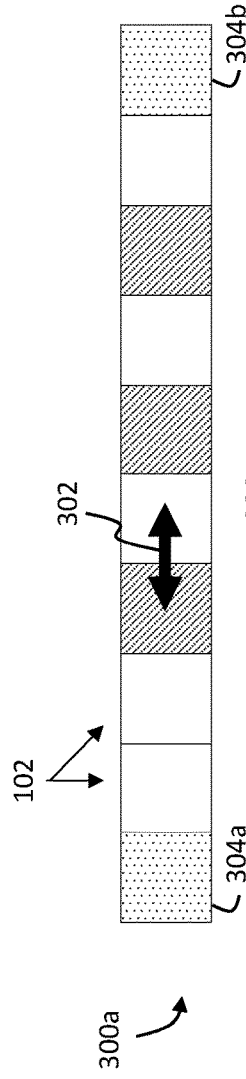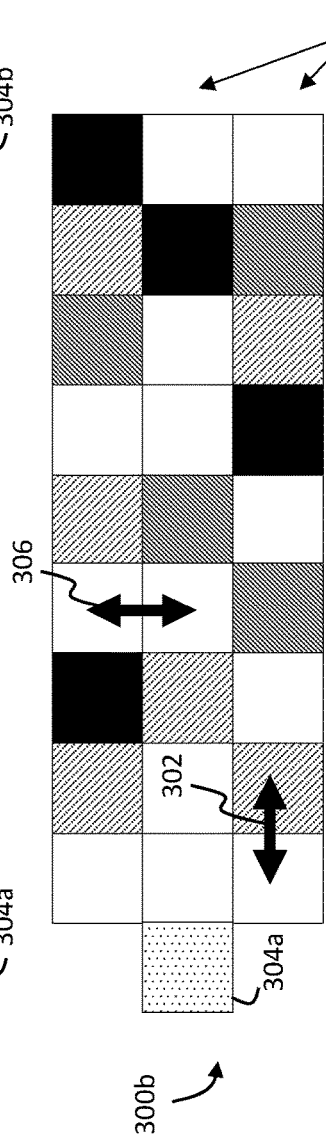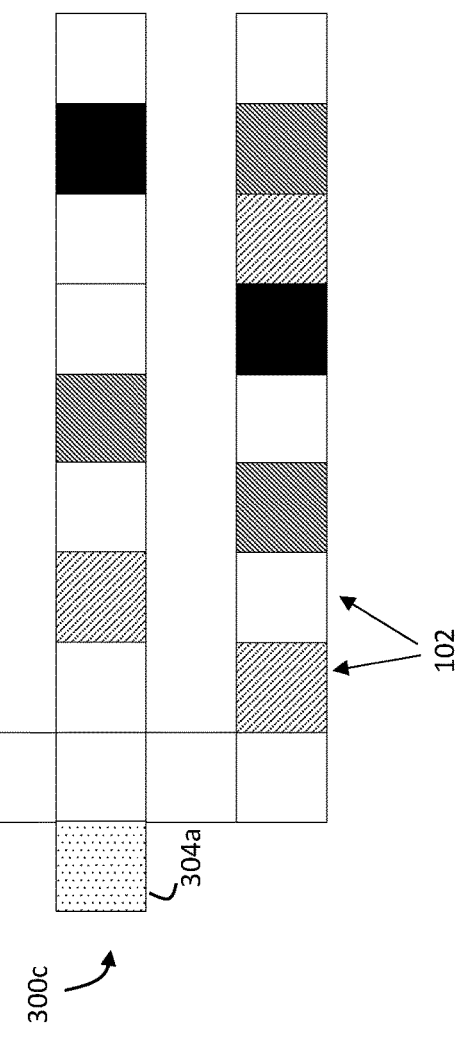

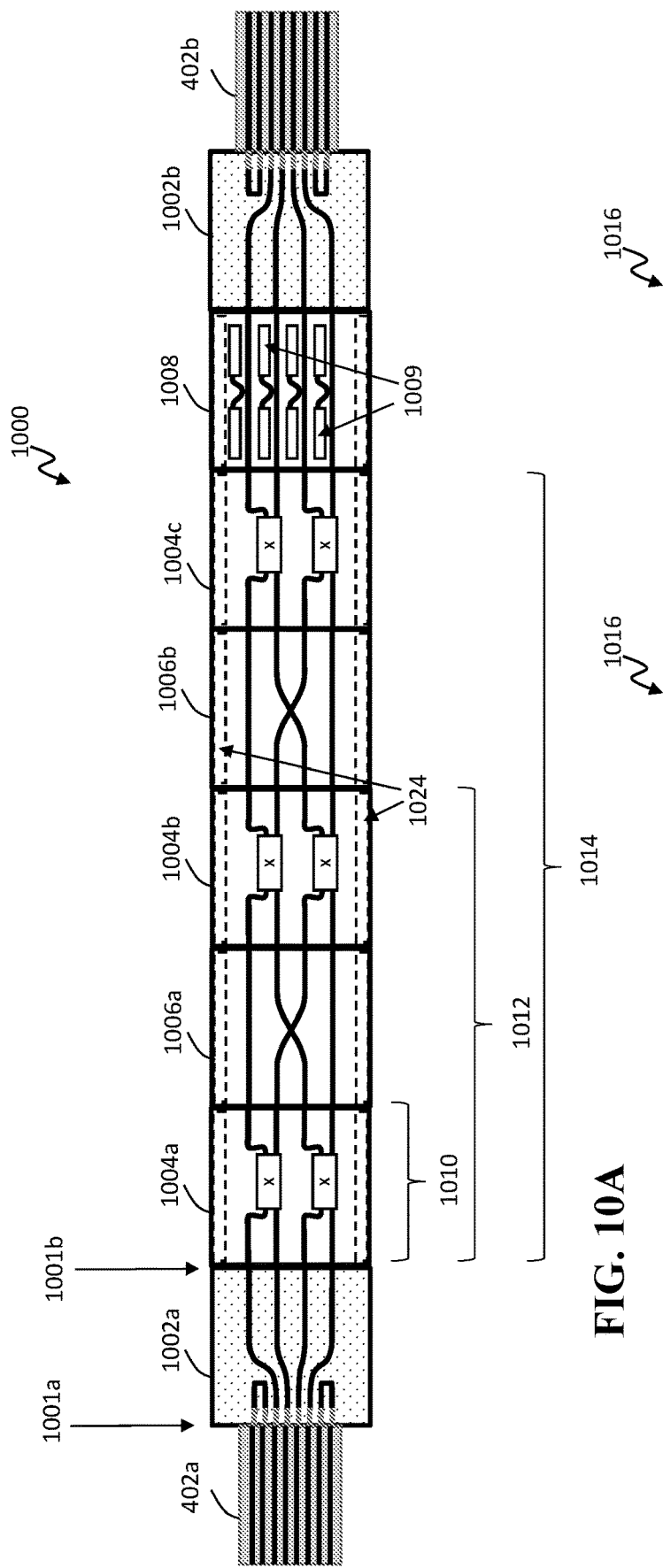
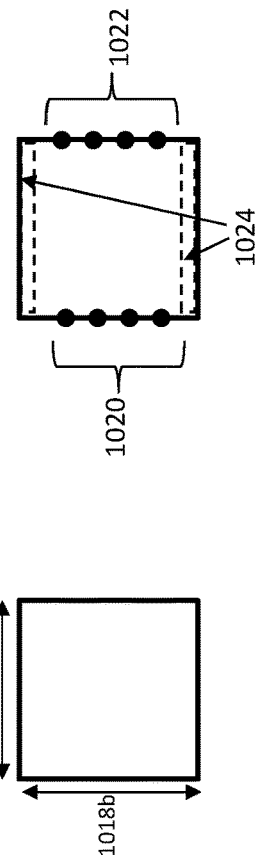
FIG. 10A
FIG. 10B
FIG. 10C

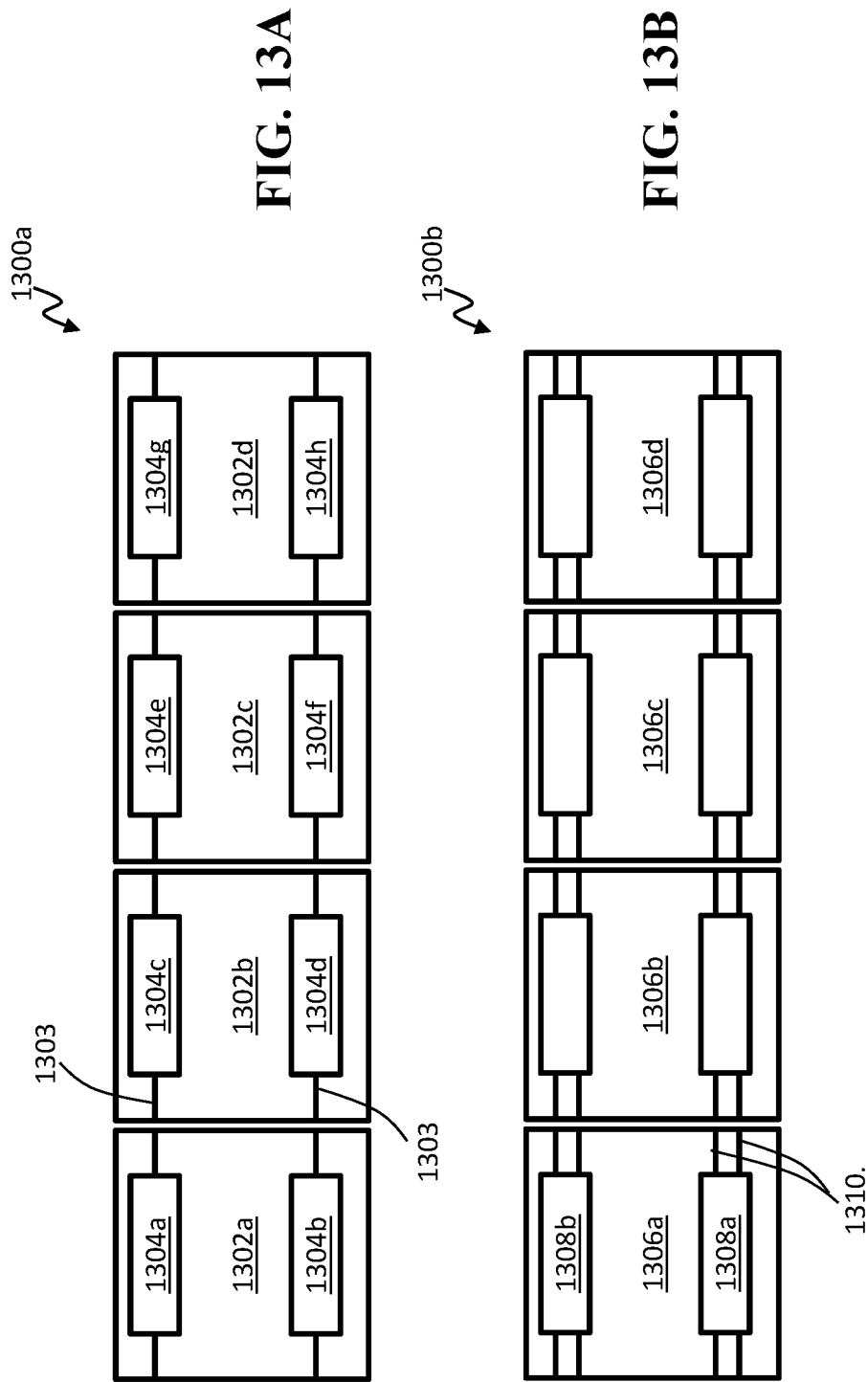

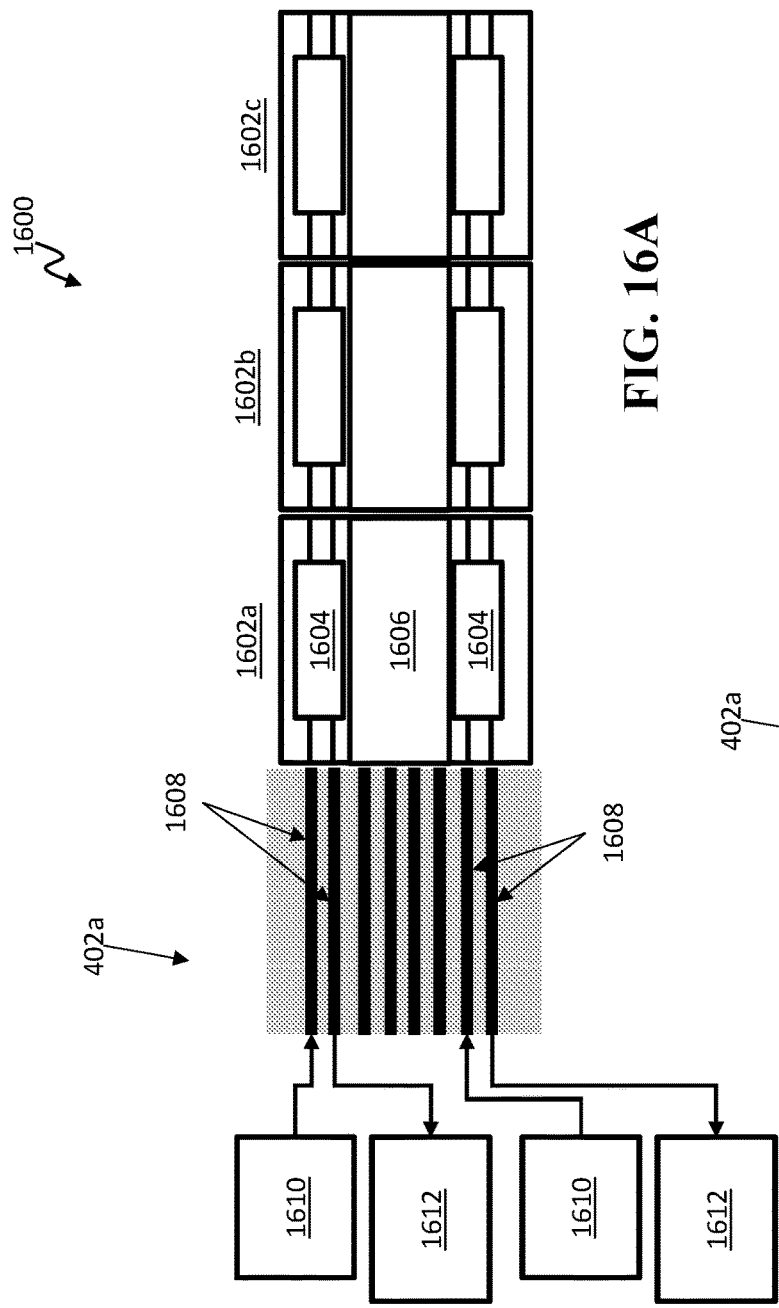
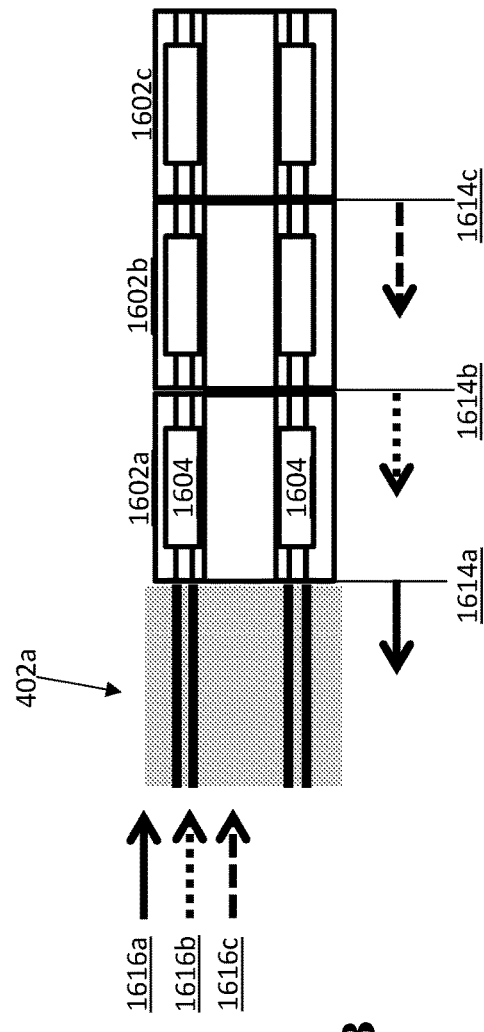
FIG. 16A
FIG. 16B

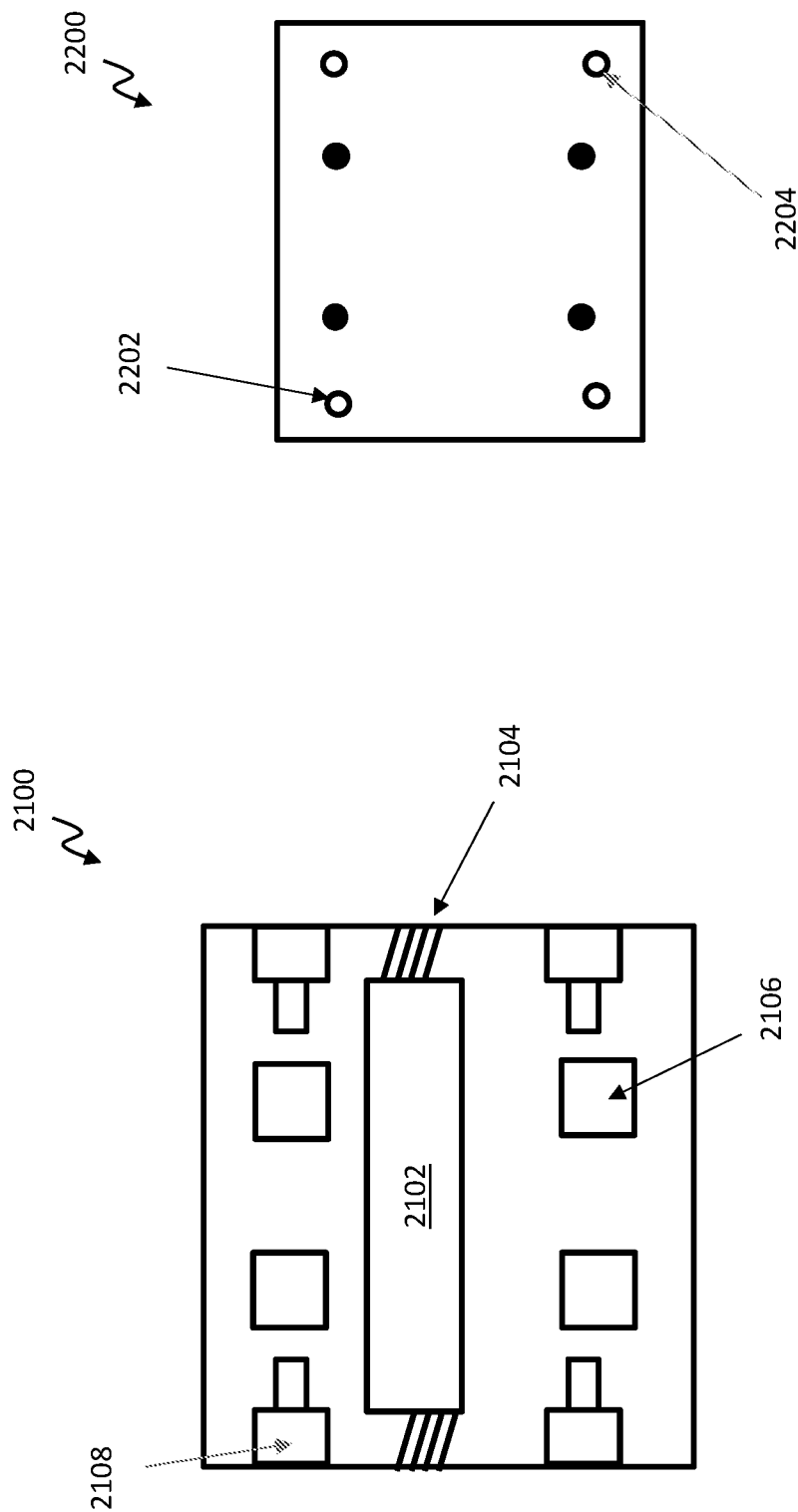

VIRTUAL ENVIRONMENT FOR IMPLEMENTING INTEGRATED PHOTONICS ASSEMBLIES

CROSS-REFERENCE TO RELATED APPLICATIONS

This application claims priority to and the benefit of U.S. Provisional Application No. 63/017,616 titled "Web-Based Tool For Modular Circuitry Design and Simulation" and filed Apr. 29, 2020 and U.S. Provisional Application No. 63/065,622 titled "Modular Silicon Photonics Circuitry Designs" and filed Aug. 14, 2020, which are incorporated herein by reference in their entireties.

TECHNICAL FIELD

The following disclosure is directed to a virtual environment for implementing integrated photonics assemblies and, more specifically, a virtual environment for implementing integrated photonics assemblies including modular photonic integrated subcircuits.

BACKGROUND

Application-specific integrated optics chips are typically designed and fabricated on a wafer using a complementary metal-oxide-semiconductor (CMOS) design and process flow. However, this process results in high production cost and low throughput. These costs and inefficiencies may be passed to a customer of the fabrication or the end-user of the optics chips.

SUMMARY

A system for generating a virtual environment for implementing an integrated photonics assembly is presented. In some embodiments, the system can include one or more processors and a memory coupled with the one or more processors, where the processor executes a plurality of modules stored in the memory. In some embodiments, the plurality of modules can include a user interface module for deploying one or more virtual photonic integrated subcircuits within the virtual environment, the virtual environment configured to enable coupling of at least two virtual photonic integrated subcircuits. In some embodiments, the coupling of the virtual photonic integrated subcircuits forms a virtual integrated photonics assembly. In some embodiments, the plurality of modules can include a library module comprising a plurality of virtual photonic integrated subcircuits. In some embodiments, at least one of the plurality of virtual photonic integrated subcircuits comprises a performance characteristic, and the performance characteristic represents a real-world performance characteristic of a pre-fabricated physical photonic integrated subcircuit corresponding to the at least one virtual photonic integrated subcircuit.

Various embodiments of the system can include one or more of the following features.

The system can include a simulation module configured to generate a performance characteristic of the virtual integrated photonics assembly. In some embodiments, the performance characteristic of the virtual integrated photonics assembly can represent a real-world performance characteristic of a physical integrated photonics assembly corresponding to the virtual integrated photonics assembly. In some embodiments, the pre-fabricated physical photonic integrated subcircuit contributes to a greater fabrication yield of (i) a physical integrated photonics assembly having the pre-fabricated physical photonic integrated subcircuit having the performance characteristic, wherein the performance characteristic is of a type, than (ii) a monolithic photonics integrated circuit having a performance characteristic of the same type.

The system can include a user interface including a selection panel configured to (i) display and (ii) enable a user to select from a set of virtual photonic integrated subcircuits, wherein the displayed set of virtual photonic integrated subcircuits is received from the library module and a control bar configured to enable a user to at least one of: (a) reset the virtual environment, (b) save the virtual integrated photonics assembly in the memory, (c) simulate the performance characteristic, or (d) submit an order for the physical integrated photonics assembly.

The system can include a plurality of virtual photonic integrated subcircuits including at least one of a virtual III-V semiconductor subcircuit, a virtual nitride-based semiconductor subcircuit, a virtual graphene-based subcircuit, a virtual hybrid subcircuit, a virtual heterogeneous subcircuit, a hybrid integration subcircuit including semiconductor materials, a virtual lithium niobite subcircuit, a virtual optical fiber-based subcircuit, a virtual active subcircuit, a virtual garnet subcircuit, a virtual silicon photonic subcircuit, a virtual glass based subcircuit, a virtual electron beam-fabricated subcircuit, a virtual fiber-to-chip coupling subcircuit, a virtual MEMS-photonic subcircuit, a virtual phase change-based subcircuit, or a virtual passive subcircuit.

The system can include a user interface is configured to provide feedback to a user upon coupling a first virtual photonic integrated subcircuit to a second virtual photonic integrated subcircuit. The system can include at least one virtual photonic integrated subcircuit is configured to be rotatable. The system can include, in some embodiments, a performance characteristic including an optical transmission as a function of wavelength. The system can include, in some embodiments, an insertion of at least one virtual photonic integrated subcircuit that can dynamically alter the virtual environment.

The system can include a template library module including a plurality of virtual templates, each virtual template comprising at least two virtual photonic integrated subcircuits coupled together to form a pre-configured virtual integrated photonics assembly. In some embodiments, the virtual templates can include at least one of a virtual laser photonics assembly, a virtual modulator photonics assembly, a virtual switch photonics assembly, a virtual transceiver photonics assembly, or a virtual polarization photonics assembly.

The system can include a virtual environment configured to simulate at least one of (i) light transfer or (ii) light reception between a first subcircuit and a second subcircuit of the plurality of subcircuits. A method for generating a virtual environment for implementing an integrated photonics assembly is presented. The method can include providing a user interface for deploying one or more virtual photonic integrated subcircuits within the virtual environment, the virtual environment configured to enable coupling of at least two virtual photonic integrated subcircuits, wherein the coupling of the virtual photonic integrated subcircuits forms a virtual integrated photonics assembly. The method can further include providing a library module comprising a plurality of virtual photonic integrated subcircuits, where at least one of the plurality of virtual photonic integrated subcircuits comprises a performance characteristic, and the performance characteristic represents a real-world performance characteristic of a pre-fabricated physical photonic integrated subcircuit corresponding to the at least one virtual photonic integrated subcircuit. The method can include receiving, by the user interface, at least one subcircuit from the library module. The method can further include displaying, by the user interface, the received subcircuit upon selection by a user.

Various embodiments of the method can include one or more of the following features.

The method can include providing a simulation module configured to generate a performance characteristic of the virtual integrated photonics assembly, wherein the performance characteristic of the virtual integrated photonics assembly represents a real-world performance characteristic of a physical integrated photonics assembly corresponding to the virtual integrated photonics assembly.

The method can include a pre-fabricated physical photonic integrated subcircuit contributing to a greater fabrication yield of (i) a physical integrated photonics assembly having the pre-fabricated physical photonic integrated subcircuit having the performance characteristic, where the performance characteristic is of a type, than (ii) a monolithic photonics integrated circuit having a performance characteristic of the same type.

The method can include a user interface including a selection panel configured to (i) display and (ii) enable a user to select from a set of virtual photonic integrated subcircuits, wherein the displayed set of virtual photonic integrated subcircuits is received from the library module and a control bar configured to enable a user to at least one of: (a) reset the virtual environment, (b) save the virtual integrated photonics assembly in the memory, (c) simulate the performance characteristic, or (d) submit an order for the physical integrated photonics assembly. The method can include a plurality of virtual photonic integrated subcircuits including at least one of a virtual III-V semiconductor subcircuit, a virtual nitride-based semiconductor subcircuit, a virtual graphene-based subcircuit, a virtual hybrid subcircuit, a virtual heterogeneous subcircuit, a hybrid integration subcircuit including III-V semiconductor materials, a virtual lithium niobite subcircuit, a virtual optical fiber-based subcircuit, a virtual active subcircuit, a virtual garnet subcircuit, a virtual silicon photonic subcircuit, a virtual glass based subcircuit, a virtual electron beam-fabricated subcircuit, a virtual fiber-to-chip coupling subcircuit, a virtual MEMS-photonic subcircuit, a virtual phase change-based subcircuit, or a virtual passive subcircuit.

The method can include providing feedback, via the user interface, to a user upon coupling a first virtual photonic integrated subcircuit to a second virtual photonic integrated subcircuit. The method can include a virtual photonic integrated subcircuit configured to be rotatable. The method including a performance characteristic including an optical transmission as a function of wavelength. The method can include dynamically altering the virtual environment upon an insertion of at least one virtual photonic integrated subcircuit.

The method can include a template library module including a plurality of virtual templates, each virtual template comprising at least two virtual photonic integrated subcircuits coupled together to form a pre-configured virtual integrated photonics assembly. In some embodiments, the virtual templates include at least one of a virtual laser photonics assembly, a virtual modulator photonics assembly, a virtual switch photonics assembly, a virtual transceiver photonics assembly, or a virtual polarization photonics assembly.

The method can include a virtual environment configured to simulate at least one of (i) light transfer or (ii) light reception between a first subcircuit and a second subcircuit of the plurality of subcircuits.

A method for implementing an integrated photonics assembly in a virtual environment is presented. The method can include displaying, on a user interface for deploying one or more virtual photonic integrated subcircuits within the virtual environment, (a) a selection panel configured to display and enable a user to select from a set of virtual photonic integrated subcircuits, (b) a workspace configured to receive one or more virtual photonic integrated subcircuits and to display at least one virtual photonic integrated subcircuits in a virtual environment, and (c) a control bar configured to enable a user to at least one of reset the virtual environment, save the virtual integrated photonics assembly in the memory, simulate the performance characteristic, or submit an order for the physical integrated photonics assembly. The method can further include accessing, by the selection panel, a library of virtual photonic integrated subcircuits, at least one of the virtual photonic integrated subcircuits having a performance characteristic corresponding to a physical modular photonic integrated subcircuit. The method can include forming, in the workspace, a virtual integrated photonics assembly from at least two virtual photonic integrated subcircuits. The method can further include providing a performance characteristic of the virtual integrated photonics assembly to the user via the user interface.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

FIGS. 3A-3C are diagrams of top views of example integrated photonics assemblies, which each include multiple subcircuits.

FIG. 10A is a diagram of a top view of an example 1D integrated photonics assembly. FIGS. 10B-10C are diagrams of top views of a representative subcircuit of the assembly of FIG. 10A.

FIGS. 13A-13B are diagrams of top views of four example integrated photonic subcircuits, in which each subcircuit is configured to transfer light to an adjacent subcircuit.

FIG. 16A is a diagram of a top view of an example 1D integrated photonics assembly including three subcircuits, in which each subcircuit has at least one monitoring circuit and a useful circuit.

FIG. 16B is a diagram of a top view of a simplified representation of FIG. 16A to illustrate an example of wavelength dependence of the interfaces between the subcircuits.

FIG. 21 is a diagram of a top view of an example subcircuit including photonic circuit and input and output waveguides.

FIG. 22 is a diagram of a top view of an example connector chip that may be used in assembling two subcircuits.

DETAILED DESCRIPTION

Figure 1:
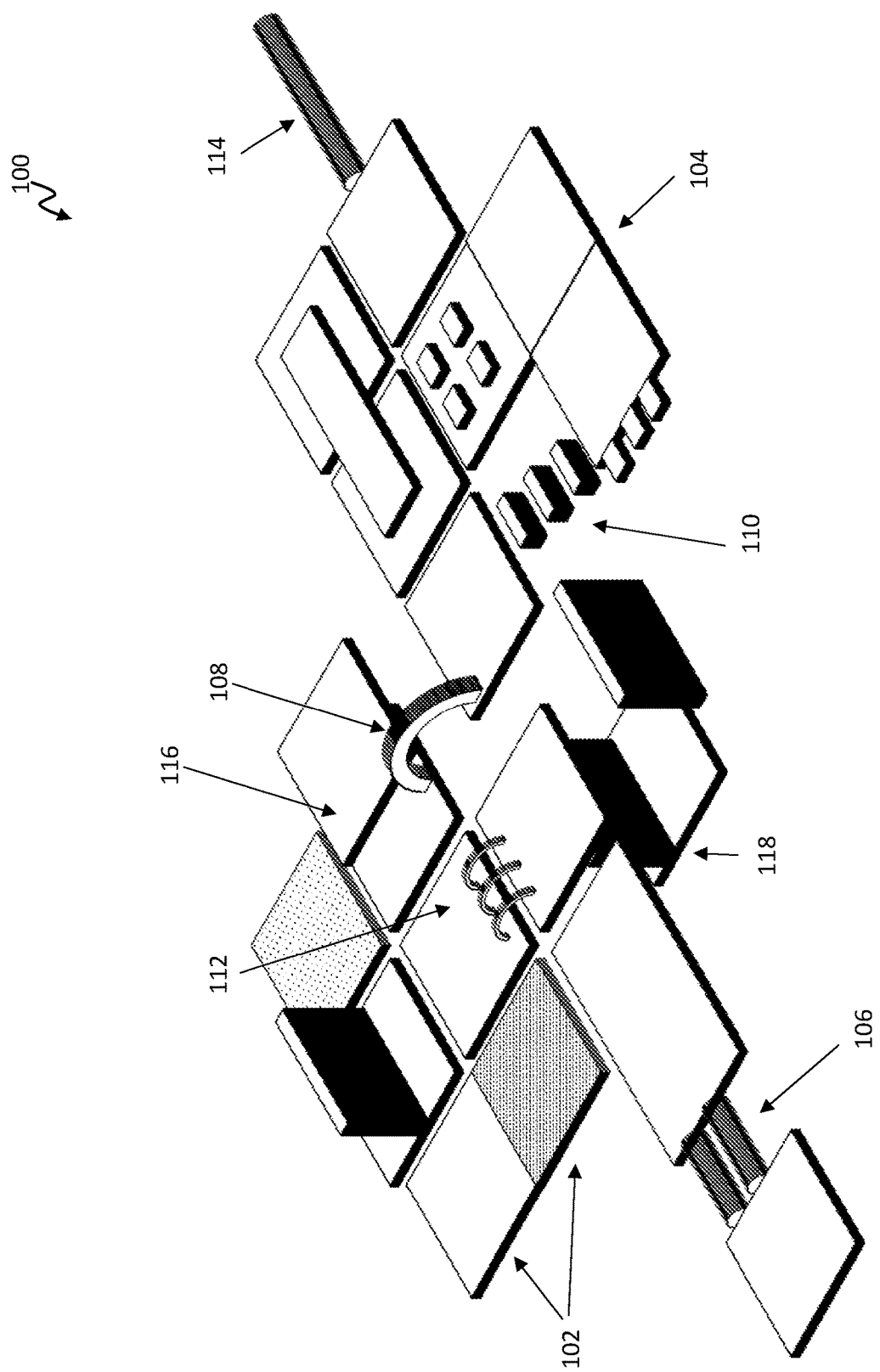
FIG. 1 is a diagram of a perspective view of an example integrated photonics assembly that multiple photonic integrated subcircuits.

Disclosed herein are embodiments of photonic integrated subcircuits that can be assembled into an integrated photonics assembly. These photonic integrated subcircuits may be referred to herein as "subcircuits", "chiplets", or "sub-chips". The integrated photonics assembly may be referred to herein as "an assembly", "an integrated photonics assembly", or "a photonic integrated circuit" (PIC). A given photonic integrated subcircuit can be configured to transfer light to and/or receive light from at least one other subcircuit, for example, using one or more light transfer techniques. In various embodiments, each photonic integrated subcircuit is a discrete integrated circuit or chip that be physically separated from one another, moved, and/or attached to one another. The example subcircuits can be assembled to create a larger integrated photonics circuit using two or more subcircuits. The example subcircuits may be used to extend and/or combine an integrated photonic circuit into a larger integrated photonic circuit. The example subcircuits are configured to guide light via waveguide structures and may contain special functions including, e.g., splitting light, wavelength demultiplexing, photo detection, light generation, light amplification, etc.

Standardization of Photonic Integrated Subcircuits

In various embodiments, each subcircuit is a pre-fabricated integrated circuit. By pre-fabricating the subcircuits, the subcircuits can be standardized so as to enable assembly of two or more subcircuits into a PIC. As discussed further herein, standardization of subcircuits can pertain to one or more properties of the subcircuits, including dimension(s), volume, weight, input(s), output(s), functionality, mechanical feature(s) (e.g., for coupling, alignment, etc.), active alignment feature(s), wirebond pad(s), electrical connection(s), feature(s) that are complementary to a receptacle (including vertical alignment feature(s) and/or lateral alignment features), etc. Standardization can include the configuration of complementary properties or structures of two or more adjacent subcircuits, as described further below. For instance, alignment structures and/or waveguide paths in a first type of subcircuit may be configured to be complementary with respective alignment structures and/or waveguide paths in a second type of subcircuit, such that a subcircuit of a first type can be attached to a subcircuit of a second type, e.g., with low optical loss. Standardization of the subcircuits can enable permutational assembly of the subcircuits into PICs. Further, standardization can enable time-efficient and/or cost-efficient packaging.

Because many different types of integrated photonics assembly can be created from the subcircuits, it is beneficial to standardize the subcircuits. One benefit of standardization is that a subcircuit can be switched or interchanged with another subcircuit, thereby creating a different optical assembly that is a variation of the first assembly. In some cases, subcircuits can be configured such that they enable many optical assemblies that are useful with a minimum number of subcircuits. Further, each subcircuit or type of subcircuit can be configured and/or selected for improved performance, reduced cost, efficient or ease of fabrication, efficient or ease of supply, etc.

Note that there is a nonzero likelihood that certain aspects and/or components (e.g., transistors) of an integrated circuit may fail or render the individual fabricated circuit defective. The resulting integrated circuits of a particular fabricated batch that function correctly is the "yield" of that particular batch. By fabricating (and subsequently testing) the integrated photonics subcircuits individually and/or independently, the non-functioning subcircuits can be eliminated from the supply of subcircuits. Further, it is found that a higher number of functioning subcircuits (of a given type) can be produced using a single type of fabrication process (e.g., on a given wafer). In comparison, a mixed-type integrated circuit (e.g., using more than one type of fabrication process) results in lower yield of that mixed-type integrated circuit. This results in a higher number of fully-functioning integrated subcircuits, thereby contributing to an increased number of integrated photonics assemblies. Therefore, in some cases, it may be preferable to generate an integrated optical circuit from subcircuits even if all the component subcircuits can be fabricated in the same process. This can increase the number of optical assemblies that can be built. Furthermore, the subcircuits can be yielded before they are used in the optical assembly, thereby increasing the total yield of a certain optical assembly. The optical assembly can thus be yield-optimized by forming the assembly from different sub-chips.

In some embodiments, yields are significantly improved in an integrated photonics assembly as compared to a monolithic chip. In some embodiments, cost is significantly reduced in an integrated photonics assembly as compared to a monolithic chip. As illustrated below, improvements in yield and/or cost may depend on the type of internal component or functionality. The following tables provide two numerical examples comparing the yields of traditional "monolithic" integrated photonic circuits to the yields of the modular integrated photonics assemblies, as described herein. In particular, the left side of Table 1 illustrates a monolithic chip that is fabricated with two wavelength demultiplexers (WDMs) in which each individual WDM typically has a 50% yield. Further, the right side of Table 1 illustrates a modular assembly including two 50%-yield WDMs. As illustrated, even with the cost of assembly, the total cost of the assembly is significantly less (e.g., at least 55% less) than the total cost of a monolithic chip.

TABLE 1

Yield comparison between a monolithic chip and a modular assembly having two 50%-yield WDMs.

| Monolithic Chip having two 50%-yield WDMs | | Modular Assembly having two 50%-yield WDMs | |
| --- | --- | --- | --- |
| Cost | $10 | Cost | $10 |
| Yield | 25% | Yield | 50% |
| True Cost | $40 | True Cost | $20 |
| | | Total Cost = True Cost + Assembly Cost | $22 |

Another illustration of the yield difference and cost is provided in Table 2 below. Both yield and cost are dramatically improved for the modular assembly over the monolithic chip. Refer to FIG. 10A for an example of an integrated photonics assembly 1000 including a subcircuit 1008 having Ge photodetectors (PDs).

TABLE 2

Yield comparison between a monolithic chip and a modular assembly having two 90%-yield PDs.

| Monolithic Chip having 100 98%-yield Ge PDs | | Modular Assembly having 100 98%-yield Ge PDs | |
| --- | --- | --- | --- |
| Cost | $20 | Cost | $20 |
| Yield | 13% | Yield | 81.7% |
| True Cost | $154 | True Cost | $25 |
| | | Total Cost = True Cost + Assembly Cost | $27 |

In some embodiments, subcircuits are standardized in size. For example, a standardized set of subcircuits may include subcircuits that are each 1 mm in width and 1 mm in length. In some cases, the standardized set may include two or more subsets of subcircuits in which the size of subcircuits in each subset is standardized. For example, a first subset may have subcircuits of 1 mm×1 mm, a second subset of subcircuits of 1 mm×2 mm, a third subset of subcircuits of 2 mm×2 mm, a fourth subset of subcircuits 1 mm×3 mm, etc.

In some embodiments, the subcircuits are standardized according to the light port positioning and/or electrical pad positioning. For instance, the position of light input ports and/or output ports along the edges or surface of the subcircuits may be standardized for groups of subcircuits. By leveraging standardization, a library of standard subcircuits can be produced to build nearly an endless variety of photonic assemblies without the need for costly or time-consuming customization of the package or assembly process.

In some embodiments, the standardization of subcircuits contributes to and/or directly beget the standardization of other components, e.g., printed circuit boards (PCBs), non-optical components, lasers, etc. For example, by standardizing the electrical pads in a subcircuit, connecting pads on a host PCB can also be standardized, thereby contributing greater efficiency.

Modularity of Photonic Integrated Subcircuits

Importantly, each subcircuit is configured to be a modular component of an integrated photonics assembly. The modular character of the subcircuits is one benefit of the standardization of the subcircuits. For instance, two or more subcircuits, subcircuits $S_1$ and $S_2$, can be assembled into assembly A with functionality $F_A$. One or more of these subcircuits (e.g., subcircuit $S_2$) can be removed from assembly A and connected to another subcircuit (e.g., subcircuit $S_3$) and/or an assembly to form assembly B, in which assembly B has a functionality $F_B$ (which may be different from functionality $F_A$). In doing so, the modular character of the subcircuits enable many useful integrated optical assemblies.

Various benefits flow from the modularity of the photonic integrated subcircuits. In particular, the modularity of the subcircuits facilitate the scaling (e.g., scaling up or down) of integrated photonics assemblies, replacement of subcircuits of an assembly, improvements to existing PICs, reconfigurability of assemblies, etc. Importantly, the described systems and methods can produce the desired subcircuits and/or customized integrated photonics assemblies faster than the fabrication of a conventional PIC. For example, a customized integrated photonics assembly may be produced within seven (7) days as compared to the one (1) year required for the conventional PIC. Accordingly, the described systems and methods enable efficiencies in time and/or cost.

Further, the modular subcircuits can reduce waste. For example, as described below, the described systems and methods permit the reuse of existing subcircuits and/or reconfiguring of existing assemblies. In another example, the described techniques enable the fabrication of subcircuits on demand (and therefore a reduction of inventory).

In some embodiments, in a given assembly, a particular subcircuit S is discovered to be faulty (e.g., inefficient, inoperable, incompatible, etc.). That particular subcircuit S may be removed from the assembly and a replacement subcircuit S' may be installed in its place. In another example, the particular subcircuit S may need to reconfigured and/or translated to another portion of the assembly to be operable. This has the advantage of avoiding disturbing the rest of the assembly while providing a quick and/or simple solution to replacing a faulty part of the assembly. By contrast, a conventional PIC—which requires a single indivisible "chip"—may not be repairable by swapping out or reconfiguring of a fault component.

In another embodiment, the modularity of the subcircuits facilitate the evolution of engineering and/or design of integrated photonics assemblies over time. The development of an assembly A having a particular functionality may change from a first generation (e.g., assembly $A_1$) configuration to a second generation (assembly $A_2$), third generation (assembly $A_3$), and so on to accommodate needs of customers and/or adapt to changing markets, new technologies, different materials, different standards, a change in specifications, evolving regulation, etc. This may be achieved by adding, replacing, moving, reconfiguring, etc. one or more subcircuits in the assembly (e.g., assembly $A_1$) to produce another assembly (e.g., assembly $A_3$). For example, at some time after the production of the first generation assembly $A_1$, a new subcircuit may become available. This new subcircuit may be added to or replace an existing subcircuit in the first generation assembly $A_1$ to form the second generation assembly $A_2$.

In another embodiment, an existing assembly A may be repurposed or adapted with a different functionality by changing one or more subcircuits included in the assembly A. In another example, a conventional PIC may be repurposed or reconfigured with a different functionality by adding one or more subcircuits to the PIC. In such a case, an adapter-type subcircuit may be coupled to the conventional PIC and one or more subcircuits may be coupled to the adapter-type subcircuit. In another embodiment, two or more assemblies may be coupled together by one or more subcircuits, e.g., forming a light path between the two or more assemblies.

One primary characteristic of an integrated photonics chip (or subchip) is its ability to guide light. In various embodiments, the subcircuits can be fabricated from one or more electro-optic crystals, polymers, and/or semiconductor materials. For example, this can be achieved in a CMOS-compatible sub-chip or so-called silicon photonics, silicon-on-silica, silicon nitride, aluminum oxide, glass, III/V based integrated photonics chips, lithium niobate, silicon-on-insulator, gallium arsenide (GaAs), indium phosphide (InP), nitride, glass, etc. In some embodiments, the subcircuit is a combination of subcircuits. For example, a silicon photonics subcircuit can be enhanced with a III/V chip to increase its functionality (e.g., optical detection and optical gain), thereby creating a subcircuit that includes two or more chips or subchips.

The example integrated photonics assemblies may be configured for one or more functionalities. The assemblies may be configured for communication, biomedical, chemical, research, computing, or other applications. A non-limiting list of applications include beamforming, beam-steering, LiDAR, biomedical instrumentation (OCT, spectrometers, diagnostics, etc), biophotonics (blood analysis, brain control, etc.), acousto-optics, astrophotonics, gyroscopes, metrology, optical clocks, magneto-optics (integrated magneto-optical devices, isolators, memory, switches, etc.), artificial intelligence, reconfigurable photonic processors, THz photonics, microwave photonics, fiber sensor interrogators, free-space optical communication (Li-Fi, satellite Internet, etc.), augmented reality, quantum optics (QKD, QRNG, etc.), etc.

Light Transfer Techniques

Light may be transferred and/or received between two or more subcircuits using one or more light transfer methods, as described in further detail below. Each subcircuit can transfer light to at least one other subcircuit. In some cases, electrical signals, microwave signals, and/or fluids may be transferred and/or received by the subcircuits. In various embodiments, the wavelength of the light can span from 100 nm to 20 microns. Light can be transferred and/or received over one or more channels. In some embodiments, a given channel transmits light in one or more wavelengths, one or more polarizations, and/or one or more modes.

In various embodiments, a subcircuit can be as close as zero (0) micron distance edge-to edge with another subcircuit. This can be true when two or more subcircuits are stacked horizontally, stacked vertically, or configured to be partially overlapping (e.g., negative distance edge to edge). In various embodiments, the maximum distance between light-transferring subcircuits can be as large as 10 cm. In some embodiments, the distance is between is 0 um and 2 mm.

In various embodiments, an integrated photonics assembly can include two or more photonic integrated subcircuits. FIG. 1 illustrates an example integrated photonics assembly 100 that includes multiple subcircuits 102. As depicted, the subcircuits 102 can be coupled to one another by one or more techniques. For example, light can be transferring between two or more subcircuits via butt-coupling 104, optical fiber(s) 106, photonic wirebond(s) 108, a free-space optical train 110, electrical wirebonds 112, adiabatic coupling, out-of-plane coupling, etc. In various embodiments, the integrated photonics assembly 100 can be optically connected to an external system (e.g., a subcircuit, another assembly, a conventional PIC, an electrical system, a computing system, a biomedical system, etc.) by an optical fiber 114. In various embodiments, a channel between two subcircuits can transfer light of one or more polarizations, one or more modes, and/or one or more wavelengths.

The example subcircuits may be arranged in various configurations, e.g., side by side, overlapping, etc. For example, one or more subcircuits can be connected on top of, under, or to the side of a host subcircuit. In some embodiments, a host-type subcircuit is larger in at least one dimension than at least one other type of subcircuit so as to provide sufficient space to "carry" a number of subcircuits. In some embodiments, a host-type subcircuits is smaller in at least one dimension than at least one other type of subcircuit so as to act as a "bridge" between two or more subcircuits. Note that, in the drawings, some subcircuits are distinguished by different patterned or colored surfaces to indicate different types or functionalities.

Light transfer can be accomplished by any one or more of the following techniques. In some embodiments, light is transferred by edge-to-edge coupling (also referred to as butt-coupling) between two or more subcircuits (refer to arrow 104). In this technique, light abruptly exits the subcircuit (e.g. via the end of a light path, waveguide, from an output port, etc.) from one side or edge of the subcircuit into air or any other bulk medium. Light can enter abruptly into the side or edge (e.g., via the beginning of a light path, waveguide, into an input port, etc.) of another subcircuit.

In some embodiments, light is adiabatically transferred between subcircuits by a taper system or method. In this technique, two subcircuits are configured to overlap at least partially (refer to arrow 116). In at least one of the subcircuits, the geometry of a waveguide can be configured such that light can be transferred adiabatically or near-adiabatically to another subcircuit.

In some embodiments, light is transferred between subcircuits via an optical guiding medium. Such optical guiding mediums can include an optical fiber 106, a polymer waveguide, a polymer fiber, etc. The light may be guided in the region or space between the subcircuits and may therefore bridge a larger distance with lower optical loss (as compared two subcircuits without the optical guiding medium). In some embodiments, light is transferred in free-space or in a medium via a crossing lens, a collimator, etc.

In some embodiments, light is configured to exit a subcircuit non-horizontally (e.g., near-vertically or vertically) and enter non-horizontally into another subcircuit. In one example, integrated mirrors or grating couplers can be used to accomplish this type of light transfer. In some embodiments, light exits one subcircuit non-horizontally and enter another subcircuit horizontally. In one example, this is achieved by a subcircuit, standing vertically on the surface of another sub-chip (illustrated by arrow 118).

The transfer of light between two or more subcircuits can involve any one or combination of the above-described light transfer methods. In some cases, light transfer can two or more methods (or combinations of methods) for two or more respective channels. Using two or more methods of transferring light can be particularly useful in some cases. In one scenario, butt-coupling of subcircuits may be preferred but a particular routing or direction of the light transfer path may be difficult or may require customization. Such a routing can be achieved by using a flexible connection, e.g., a polymer waveguide or a photonic wirebond. In some instances, some subchips may not be identically sized or shaped due to imperfect dicing or cleaving. Therefore, gaps between such subchips can be spanned using a flexible interconnection method.

Figure 2:
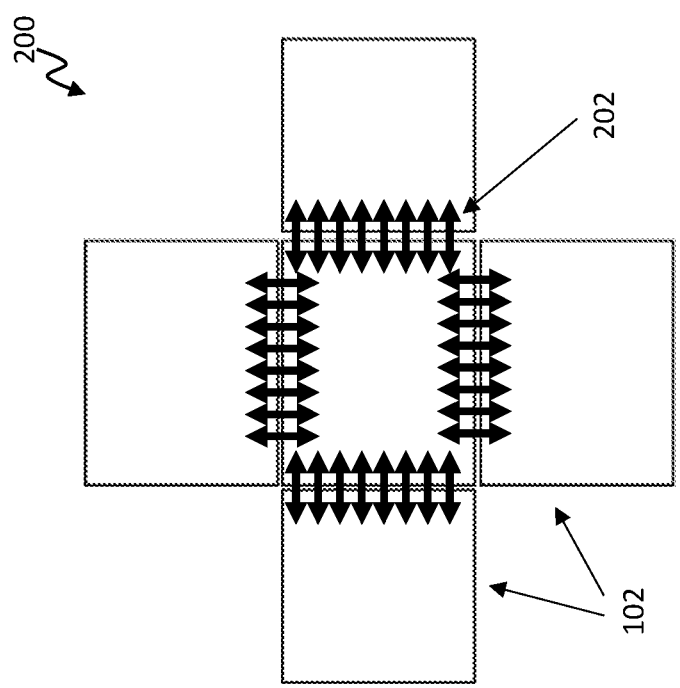
FIG. 2 is a diagram of a top view illustrating light transfer between example subcircuits of an integrated photonics assembly.

In some embodiments, transfer of light between subcircuits is multi-channel. One benefit of subcircuits that are closely spaced is that many light transfers can happen between the two subcircuits at the same time. As an example, a single subcircuits can transfer light to 10 or more other subcircuits with 100 light channels between each sub-chip. Other free-space components may be added in between the subcircuits and in between the optical path(s). FIG. 2 illustrates light transfer between subcircuits of assembly 200. The assembly 200 includes five (5) subcircuits 102, among which light is transferred and/or received. In the illustrated example, the subcircuits are butt-coupled, thereby making a large number of light transfer paths 202 feasible.

In some embodiments, some chips do not transmit light to a subcircuit and therefore be referred to as "non-photonic subcircuits" or "non-photonic subchips". For instance, such non-photonic subchips may only transmit and/or receive electrical signals from a photonic assembly of subcircuits. Accordingly, these may not be considered a part of the integrated photonics assembly. However, in some embodiments, these non-photonic subchips are part of a standardized package around the integrated photonics assembly.

In various embodiments, light can be transmitted from the integrated photonics assembly to an external or remote device or system. In some cases, this light may eventually reach other optical chips, though these other chips may not be considered part of the optical assembly. Subcircuits may have light paths to an external system by, for example, a fiber, fiber array or free-space connection. There is no lower bound or upper bound on the number of subcircuits that need to be connected from the assembly to outside world (e.g., an external system or device) and no limitation on which method is used.

Integrated Photonics Assemblies

As described above, subcircuits can be combined in many different assemblies and configurations. Subcircuits may be combined in a one-dimensional, two-dimensional, or three-dimensional assembly using any one or more of the techniques described herein.

FIGS. 3A-3C provide examples of integrated photonics assemblies, which each include multiple subcircuits 102. In particular, FIGS. 3A-3C illustrate the modularity properties of the subcircuits, including how the subcircuits can be arranged (e.g., coupled, connected, stacked, etc.) and how the photonics assembly can be standardized. Note that, in these examples, the subcircuits are configured to be the same size (in at least two dimensions) and shape.

FIG. 3A illustrates a one-dimensional (1D) array 300a (also referred to as 1D-stacking). In this case, light can be transferred left or right (indicated by arrow 302 and may be referred to as west or east) between at least a subset of the subcircuits 102. The array 300a may begin with a subcircuit 304a and/or end with a subcircuit 304b. In some cases, subcircuits 304a and/or 304b may be able to transfer light to one other subcircuit and/or from one edge of the subcircuit. To enable efficient light transfer between two or more subcircuits 102, the position of the light path within the subcircuits can be standardized to increase assembly permutations, as discussed in more detail herein.

FIG. 3B illustrates an example two-dimensional (2D) array 300b of subcircuits, which includes subcircuits configured with light transfer paths oriented up and down (indicated by arrow 306 and referred to as north and south). FIG. 3C illustrates an example "pseudo" 2D array 300c, which can be considered an extension of the 1D array. The example array 300c enables multiple parallel circuits to be connected together without requiring north and south light transfer capability on most subcircuits.

Figure 4:
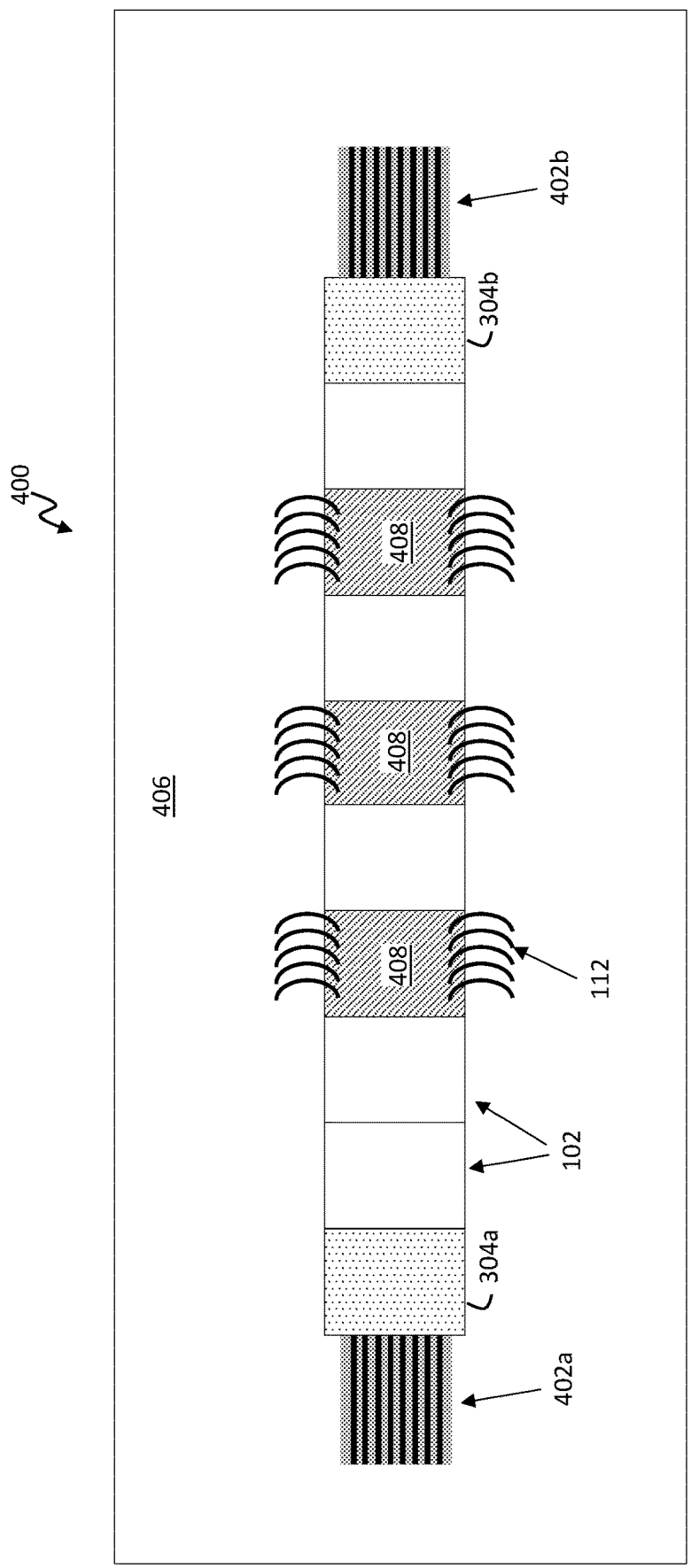
FIG. 4 is a diagram of a top view of an example packaged 1D integrated photonics assembly.

FIG. 4 illustrates an example of a packaged 1D integrated photonics assembly 400. The assembly 400 includes multiple subcircuits 102, a first fiber array 402a connected to the first subcircuit 304a, and a second fiber array 402b connected to the last subcircuit 304b, Note that a subset of the subcircuits are wirebonded via electrical conductors 112 to the printed circuit board (PCB) 406. Wirebonds 112 can be created during the fabrication and/or assembly process. The electrical wirebonds 112 may be standardized such that they can be connected to a particular type of subcircuit 408. Such subcircuits 408 may be configured to handle both light and electrical current.

Figure 5:
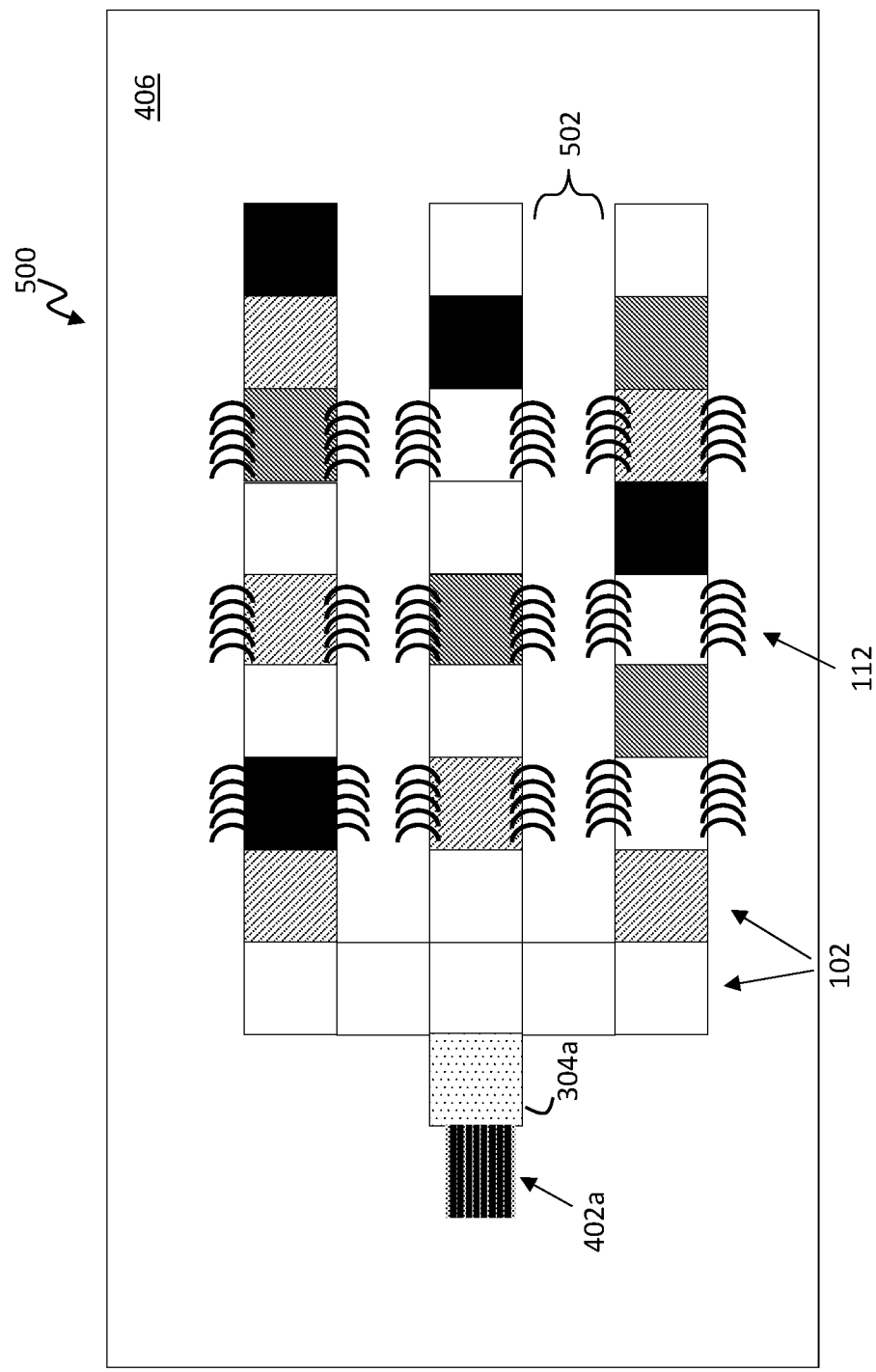
FIG. 5 is a diagram of a top view of an example packaged pseudo-2D integrated photonics assembly.

FIG. 5 shows an example of a packaged pseudo-2D integrated photonics assembly 500. A fiber array 402a is connected to the first subcircuit 304a. In this example, because there are empty spaces 502 between parallel rows of subcircuits, the subcircuits are accessibly wirebonded via wirebonds 404 to the PCB 406. Note that the empty spaces 502 can contribute to the standardization of the host PCB by providing space for electrical pads on the PCB via the empty spaces 502.

Figure 6:
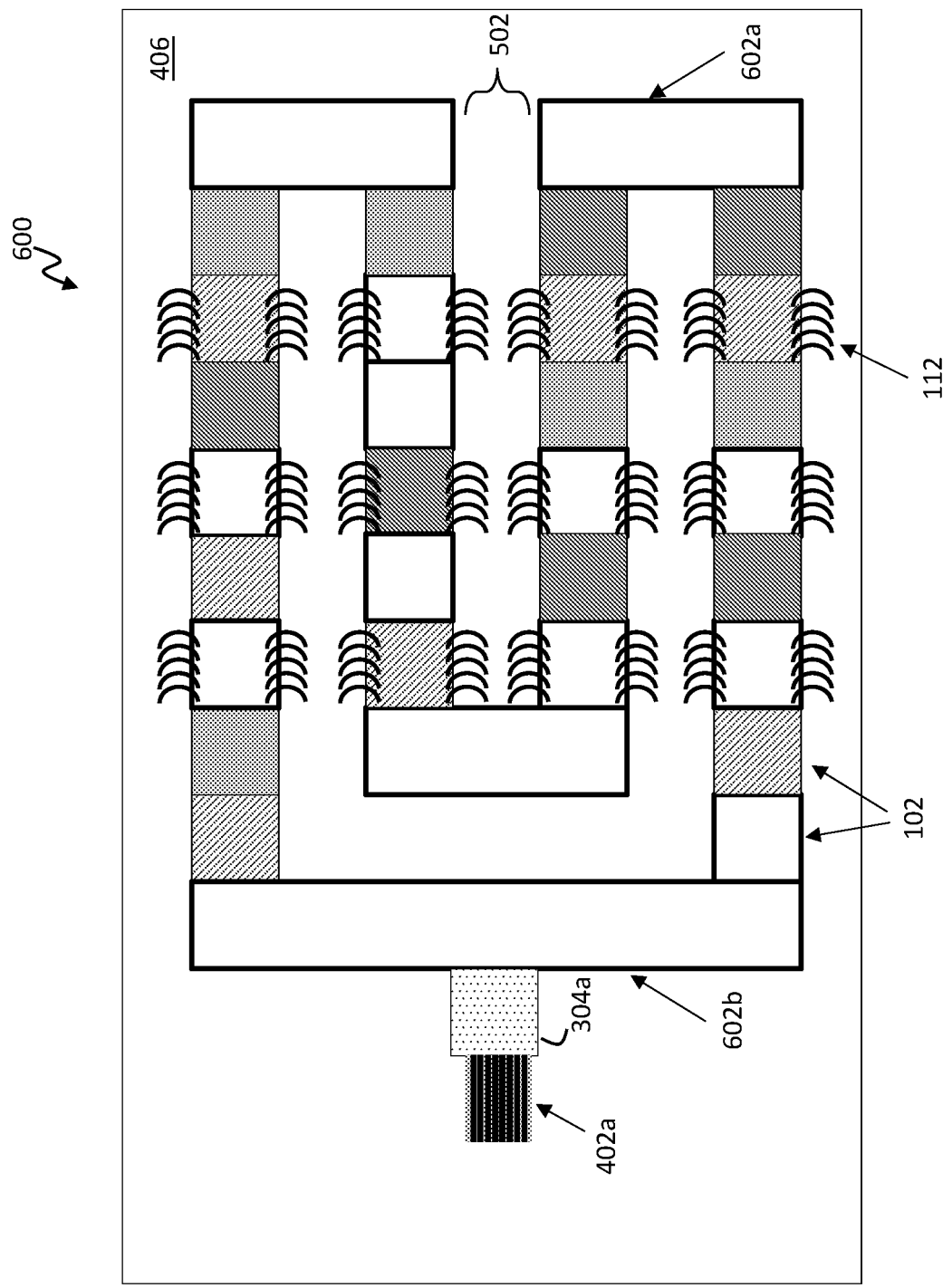
FIG. 6 is a diagram of a top view of an example packaged integrated photonics assembly formed in the shape of a closed-loop "snake".

FIG. 6 shows an example of a packaged integrated photonics assembly 600 which is formed in the shape of a closed-loop "snake". In other words, subcircuits can be connected to one another to form a snake shape. This type of assembly 600 may utilize at least two types of subcircuits, including some subcircuits 102 that connect left or right and some larger subcircuits 602a, 602b (collectively referred to as 602) that are larger than subcircuits 102. If the area of subcircuit 102 is taken as a single unit of measurement, larger subcircuits 602 may have an area equal to two units, three units (e.g., subcircuit 602a), four units, five units, six units, seven units (e.g., subcircuit 602b), and so on. In some embodiments, the larger subcircuits 602 have one or more dimensions that are 1.1 times, 1.2 times, 1.3 times, etc. the corresponding dimension of subcircuit 102. This type of assembly 600 can be beneficial when numerous subcircuits need to be cascaded, the footprint needs to be reduced, and/or occasional connections (e.g., via photonic wirebonds) need to be made. For example, cascading the subcircuits may be advantageous in some implementations and can include connecting one subcircuit to another in loops (instead of one long linear assembly) to reduce the overall footprint of the integrated photonics assembly. The empty spaces 502 between subcircuits 102 allow for ease of electrical wirebonding 112 to the underlying PCB 406.

Figure 7:
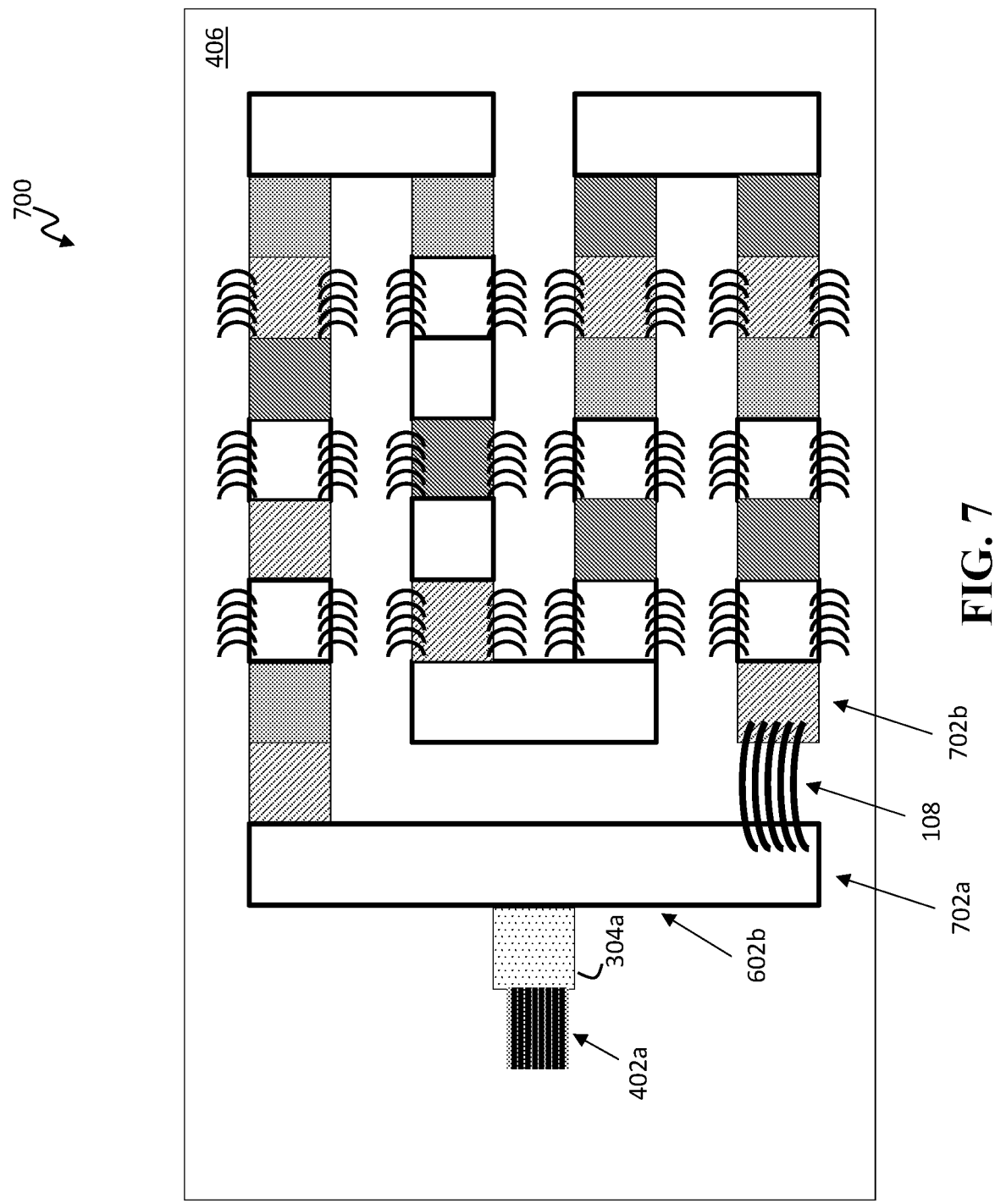
FIG. 7 is a diagram of a top view of an example packaged integrated photonics assembly formed in the shape of an open-loop "snake".

FIG. 7 shows an example of a packaged integrated photonics assembly 700 which is formed in the shape of an open-loop "snake". This type of assembly 700 can be useful when subcircuits vary slightly in size, leading to a mismatch in size in at least one portion of the assembly 700. This can occur, for example, when the subcircuits are diced during fabrication. Accordingly, a subcircuit connection (e.g., the last connection) can be performed using one or more photonic wirebonds 108 to connect the light paths between subcircuit 702a and subcircuit 702b. This can be used instead of coupling techniques, e.g., butt-coupling.

Figure 8:
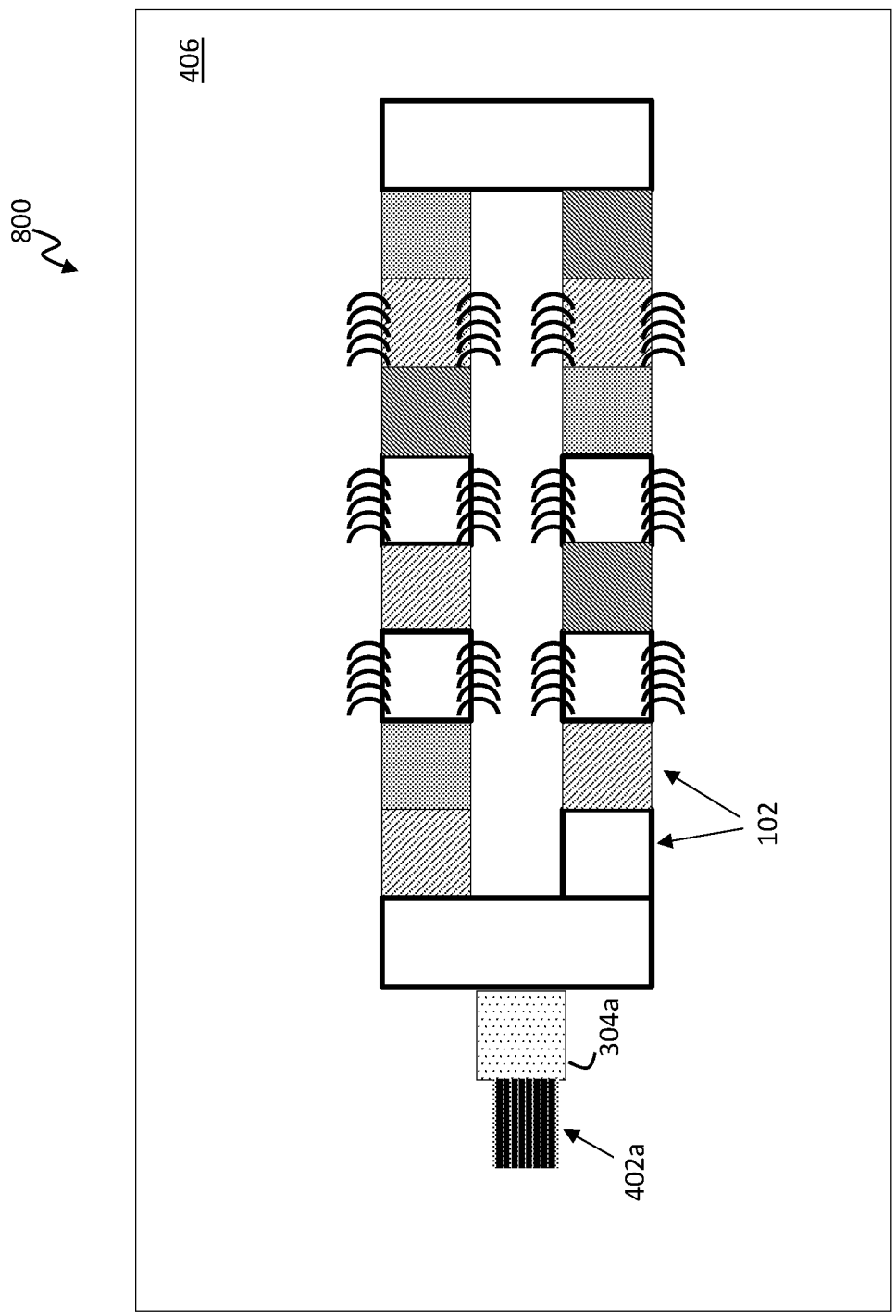
FIG. 8 is a diagram of a top view of an example packaged assembly, illustrating that the subcircuits can be standardized.

FIG. 8 shows an example of a packaged assembly 800, illustrating that the subcircuits can be standardized. In other words, the subcircuits 102 can be cut to a standard size (within a particular tolerance) such that they can form a closed loop when butt-coupled. For example, during dicing of the subcircuits during fabrication, a given dimension (e.g., width, length, height, etc.) of the subcircuits may vary +/− 10 microns. In some embodiments, the resulting variation depends on the particular fabrication process or type of subcircuit produced.

Figure 9:
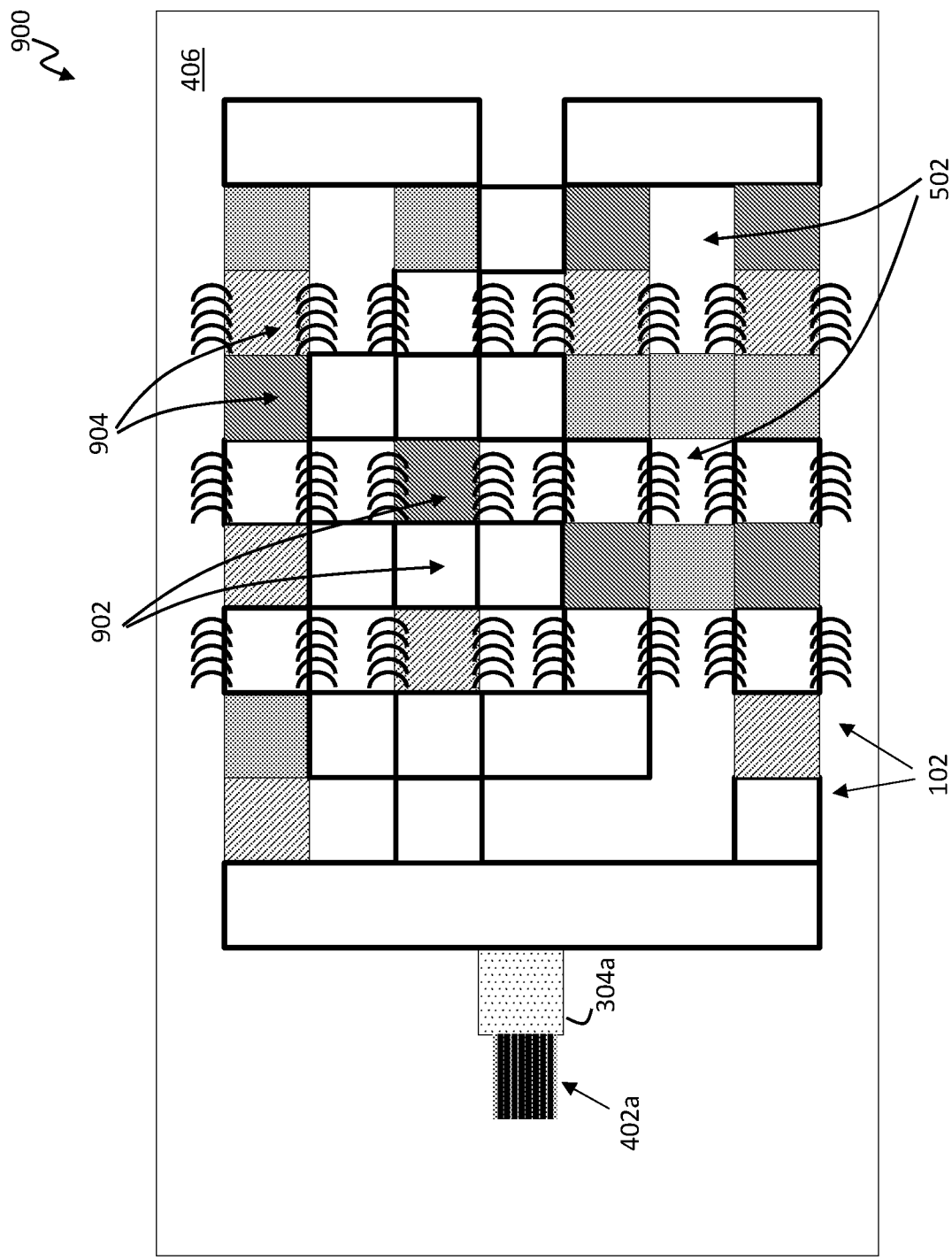
FIG. 9 is a diagram of a top view of an example integrated photonics assembly formed into a "checker" type assembly.

FIG. 9 shows an example of an integrated photonics assembly 900 that is formed into a "checker" type assembly. The checker-type assembly includes empty spaces or gaps 502 between subcircuits 102. These gaps 502 can permit the wirebonding of some or all subcircuits 102 to the host PCB 406 without needing to route electrical signals from the subcircuits (e.g., subcircuit 902) near the center of the assembly 900 to the outer subcircuits (e.g., subcircuits 904) and/or to external circuits.

Light Transfer in Photonic Integrated Subcircuits

FIG. 10A depicts an example implementation of a 1D integrated photonics assembly 1000. Referring to the subcircuits from left to right, the example assembly 1000 includes:

(i) a subcircuit 1002a including a fiber spot-size convertors;
(ii) a subcircuit 1004a including tunable splitters;
(iii) a subcircuit 1006a including a waveguide crossing;
(iv) a subcircuit 1004b including tunable splitters;
(v) a subcircuit 1006b including a waveguide crossing;
(vi) a subcircuit 1004c including tunable splitters; and (vii) a subcircuit 1008 including tap couplers and photodetectors 1009 configured to monitor the transmitted light. Subcircuit 1002a can be made from silicon nitride. Subcircuits 1002a, 1002b having fiber spot-size convertors can be made in a different platform which supports higher coupling efficiency to optical fibers. Subcircuit 102a may require a different oxide thickness in the interface 1001a (with fiber array 402a) than the oxide thickness in interface 1001b (with subcircuit 1004a) to efficiently couple light from the fiber array to subcircuit 1004a. Subcircuit 1004a (also referred to as subassembly 1010) can function as a 2×2 optical switch (in this case, including two 2×2 optical switches). Subassembly 1012 of assembly 1000 can function as a 4×4 optical switch. Portion 1014 of assembly 1000 can function as a non-blocking optical switch (e.g., a 4×4 non-blocking optical switch). Subcircuit 1008 can be used enable software control of the optical switch 1014.

Referring to FIGS. 10B-10C, in this example assembly 1000, a subset of the subcircuits is standardized such that these subcircuits (also referred to as standardized subcircuits 1016) have a standard width 1018a (e.g., 1 mm, 1.5 mm, 2 mm, etc.) and a standard length 1018b (e.g., 1 mm, 1.5 mm, 2 mm, etc.). For example, the standardized subcircuits 1016 includes subcircuits 1004a, 1006a, 1004b, 1006b, 1004c, and 1008. The standard subcircuit 1016 has optical and electrical ports are standardized to be in the same respective position for each standardized subcircuit 1016. For instance, in a given standardized subcircuit 1016, input ports 1020 are in the same position along one edge (e.g., the left edge) and output ports 1022 are in the same position along another edge (e.g., the right edge). In some cases, the standardized subcircuit can include electrical ports (e.g., pads) 1024 in the same positions along at least one edge (e.g., top and bottom edges), as indicated by the dashed-line box.

Figure 11A:
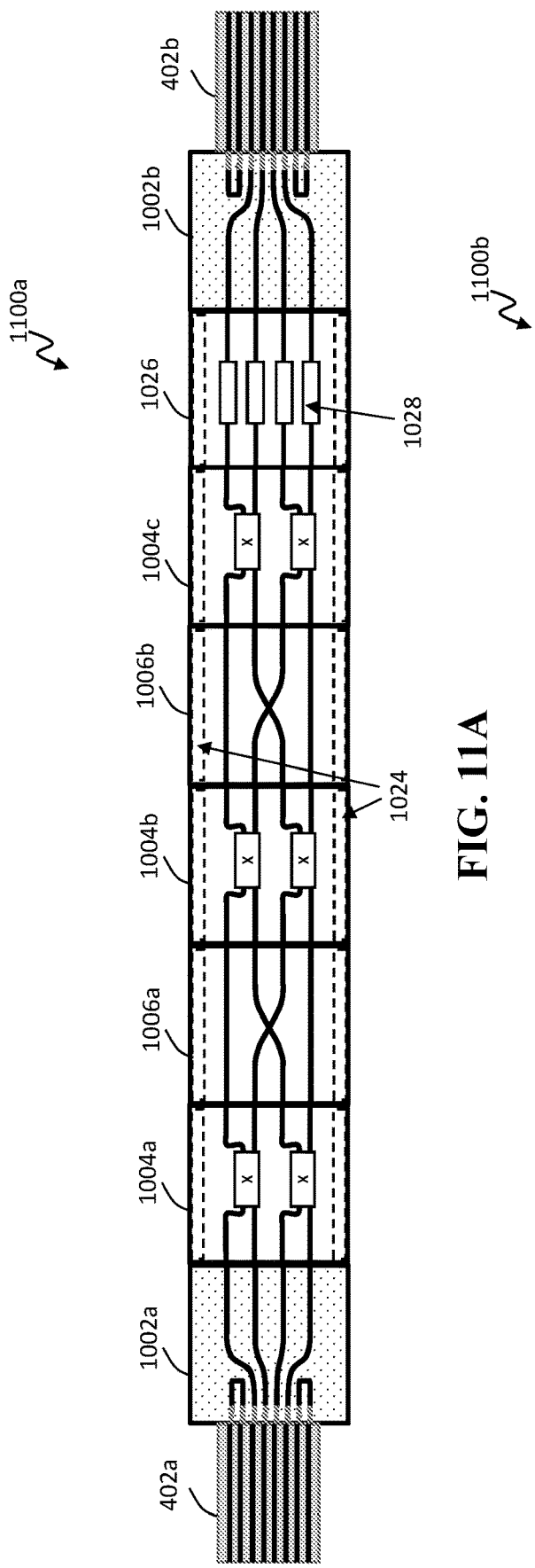
FIGS. 11A-11B are diagrams of top views of alternative examples of the assembly of FIG. 10A.
Figure 11B:
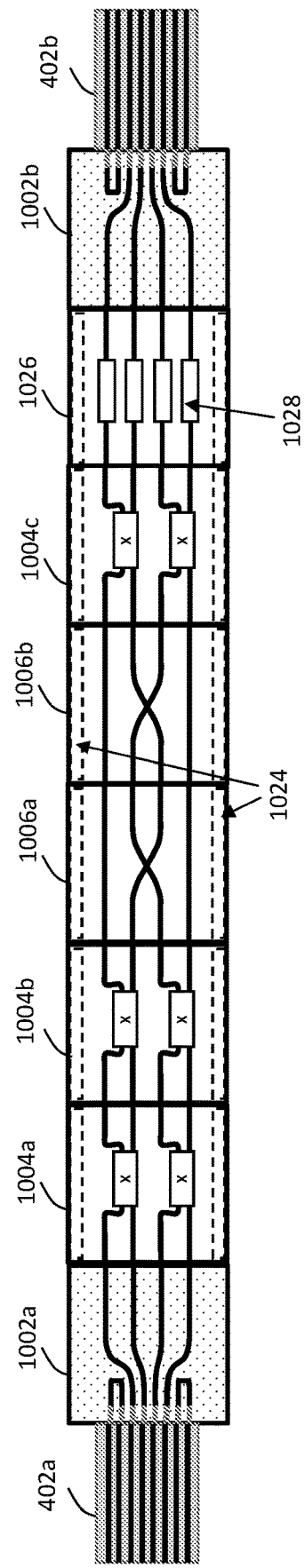

As previously discussed, a subcircuit can be swapped with another subcircuit in a given assembly. Accordingly, FIGS. 11A-11B provide alternative embodiments of the assembly 1000. FIG. 11A illustrates assembly 1100a in which subcircuit 1008 is swapped for subcircuit 1026. In effect, the monitor photodetectors (of subcircuit 1008) are interchanged for variable optical attenuators 1028 (of subcircuit 1026), thereby generating an assembly 1100a with a different functionality from assembly 1000.

In another example, FIG. 11B illustrates assembly 1100b in which subcircuits 1006a is swapped with subcircuit 1004b. This may be done to alter the functionality of the assembly. Alternatively, in example assembly 1100b, crossing-type subcircuit 1006a is swapped for a tunable splitter-type subcircuit and tunable splitter-type subcircuit 1004b is swapped for a crossing-type subcircuit, relative to the assembly 1100a. This may be helpful when subcircuit 1006a or 1004b is needs to be replaced (e.g., because it is faulty).

Assembly Monitoring

Described herein are systems, devices, and methods monitoring the integrated photonics assemblies. In some implementations, monitoring can include testing the subcircuits and/or using the subcircuits as disposable components in a sensor or other circuit. The monitoring of the assembly may be performed during assembly or post-assembly. The monitoring may be performed one or more times, periodically, intermittently, or continuously.

It can be beneficial to monitor the subcircuits to ensure alignment between two or more subcircuits. The alignment between two or more subcircuits can influence the optical coupling efficiency between the subcircuits. Alignment may be performed using passively and/or actively. In active alignment, a feedback signal may be used to determine whether the subcircuits are aligned. In various embodiments, a monitoring circuit can be configured to be attached to and/or be part of a subcircuit. The monitoring circuit may monitor light that couples into the subcircuit. A light path can be configured such that at least a portion of the received light can travel through the monitoring circuit. The light may then be transmitted back out of subcircuit.

An example monitoring system (e.g., including the monitoring circuit) can include a laser and a photodetector to determine optical loss within a subcircuit and/or among subcircuits. This arrangement may permit measurement of the quality of the optical coupling between the subcircuits. The measurement can be used to determine how well the subcircuits are aligned. In some embodiments, once the subcircuits are aligned and fixed in position (e.g., in an assembly), a monitoring circuit is used to determine the coupling efficiency between the subcircuits at any time.

In various embodiments, two subcircuits can be aligned such that there is less than 1 dB, less than 0.5 dB, less than 0.1 dB, less than 0.5 dB, or less of optical loss in light transfer between the two subcircuits. In various embodiments, two subcircuits can be aligned such that there is greater than 75%, greater than 80%, greater than 85%, greater than 90%, greater than 95%, greater than 97%, greater than 99%, or more coupling efficiency.

Passive alignment techniques can include aligning the subcircuits by visual inspection and/or self-alignment techniques. A monitoring circuit may be used to determine the degree of alignment between subcircuits based on passive alignment.

In some embodiments, the monitoring circuit for each subcircuit is individually configured. The subcircuit may have a wavelength dependence and, based on this wavelength dependence, the monitoring circuit may monitor the response of the respective subcircuit. If, for example, the wavelength dependence of the subcircuit has changed, then the monitoring circuit may isolate the single subcircuit response to align or monitor the subcircuit further. In some embodiments, monitoring circuits include photodetectors to monitor light emitted by the subcircuits through grating couplers. Such a monitoring circuit may benefit from a detection method above the subcircuits, which can be used by a camera configured to detect light from photonic circuits to distinguish between the light emitted from the top of each subcircuit. In some embodiments, the monitoring circuit is configured to access the metal pads of each subcircuit to monitor the response of the respective subcircuit.

Figure 12A:
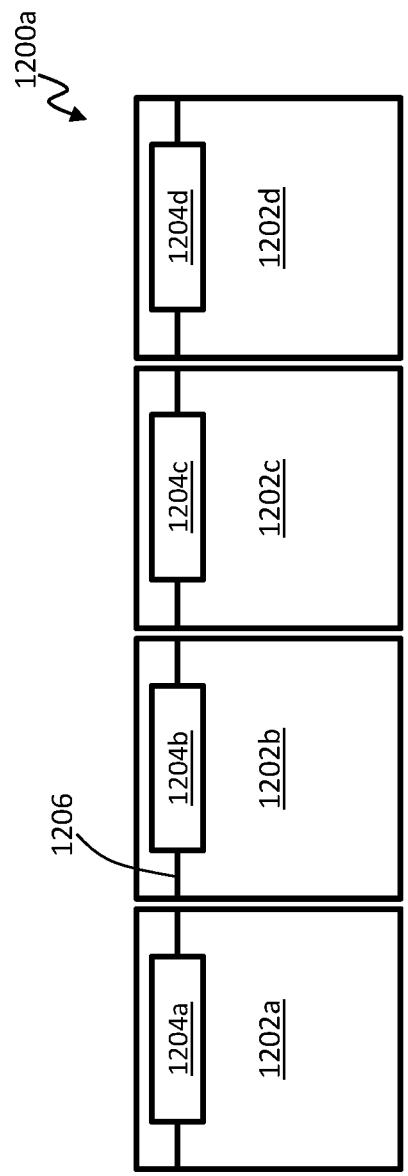
FIGS. 12A-12B are diagrams of top views of example assemblies of four integrated photonic subcircuits, in which each subcircuit is configured to transfer light to an adjacent subcircuit.

FIG. 12A depicts an assembly 1200a of four integrated photonic subcircuits 1202a, 1202b, 1202c, 1202d (collectively referred to as 1202), in which each subcircuit is configured to transfer light to an adjacent subcircuit. Each subcircuit 1202 is coupled to and/or includes a respective monitoring circuit 1204 (including circuits 1204a, 1204b, 1204c, 1204d). The monitoring circuit 1204 can determine (e.g., measure) the optical coupling efficiency between two subcircuits by monitoring the light traveling in the light path 1206. In some embodiments, these circuits are configured such that the coupling efficiency of a particular subcircuit-to-subcircuit interface may be distinguished from one another (refer to FIGS. 16A-16B for an illustrative example). The monitoring circuit may enable subcircuits to be added or optically coupled to a base subcircuit one-by-one while maintaining a high coupling efficiency.

Figure 12B:
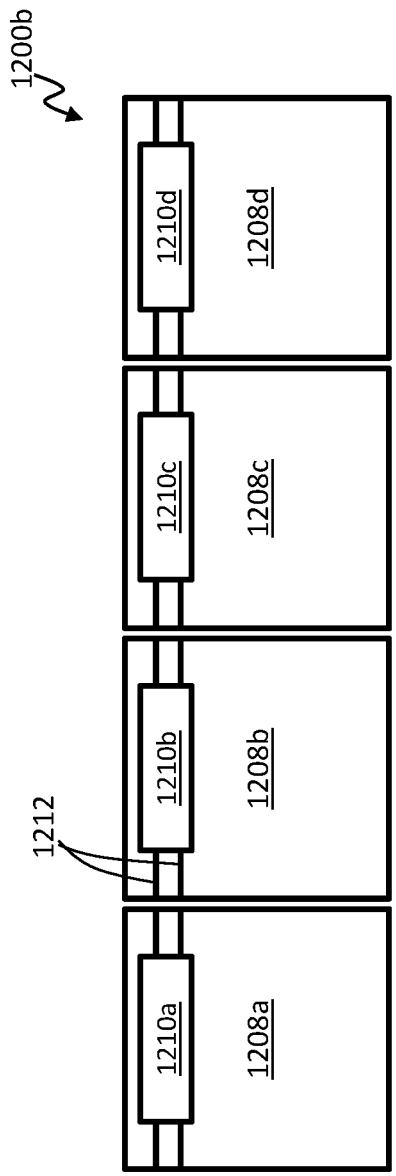

In some cases, each monitoring circuit may include multiple input and/or output waveguides. For example, with two waveguides, light may be transmitted and received. This may reduce the need for additional external components and, in some cases, reduce ambiguity of where the light originates. Additionally or alternatively, a single light path or more than two light paths may be used. FIG. 12B shows four integrated photonic subcircuits 1208a, 1208b, 1208c, 1208d (collectively referred to as 1208), in which each subcircuit is configured to transfer light to an adjacent subcircuit. Each subcircuit 1208 is coupled to and/or includes a respective monitoring circuit 1210 (including circuits 1210a, 1210b, 1210c, 1210d). In this case, two light transfer paths 1212 are used between each subcircuit to determine respective optical coupling. The two light paths may be useful for determining optical coupling efficiency in both directions (e.g., the two opposite directions). In some embodiments, more than two light paths are monitored.

To enable facile alignment monitoring, two monitoring circuits may be placed on opposite sides of the subcircuits. This may increase angular alignment accuracy. For example, this double optical coupling monitoring may increase the rotation alignment accuracy for various optical coupling methods. As described below, in the space on a subcircuit between the two monitoring circuits (e.g., 1304a and 1304b), a "useful" circuit may be placed such that the monitoring circuits and useful circuit do not interfere with each other. The useful circuit may have independent functionality and/or purpose. For example, by bringing together the useful circuits may the function of the overall assembly be realized.

FIG. 13A shows four integrated photonic subcircuits 1302a, 1302b 1302c, 1302d (collectively referred to as 1302), in which each subcircuit is configured to transfer light to an adjacent subcircuit. In this case, for each subcircuit 1302, two respective monitoring circuits 1304 with light paths 1303 are used between each subcircuit to determine optical coupling. Therefore, subcircuit 1302a has monitoring circuits 1304a, 1304b; subcircuit 1302b has monitoring circuits 1304c, 1304d; subcircuits 1302c has monitoring circuits 1304e, 1304f; and subcircuit 1304g, 1304h. The two monitoring circuits may be positioned on opposite sides of a subcircuit. FIG. 13B illustrates a similar set of photonic subcircuits 1306a, 1306b 1306c, 1306d (collectively referred to as 1306), in which each subcircuit has two respective monitoring circuits. For example, subcircuit 1306a has monitoring circuits 1308a, 1308b and each monitoring circuit monitors a respective two light paths 1310.

Figure 14B:
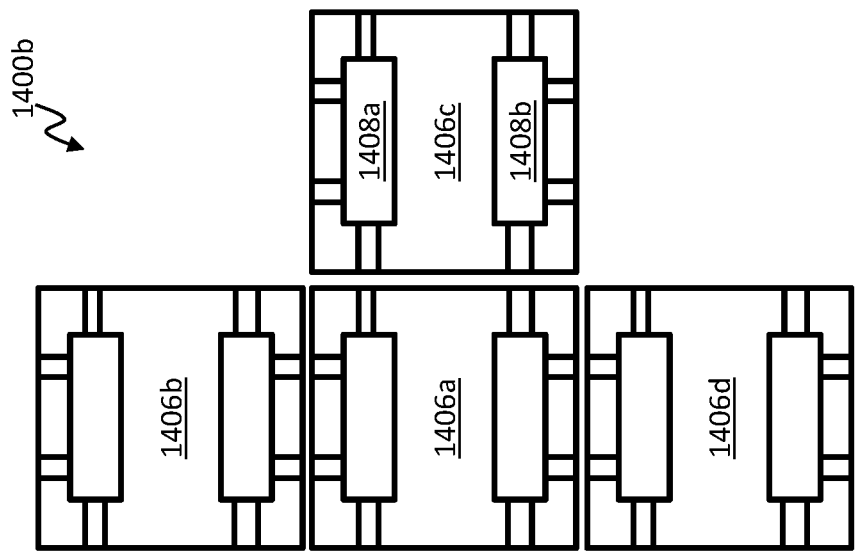
FIGS. 14A-14B are diagrams of top views of example assemblies including four subcircuits each.
Figure 14A:
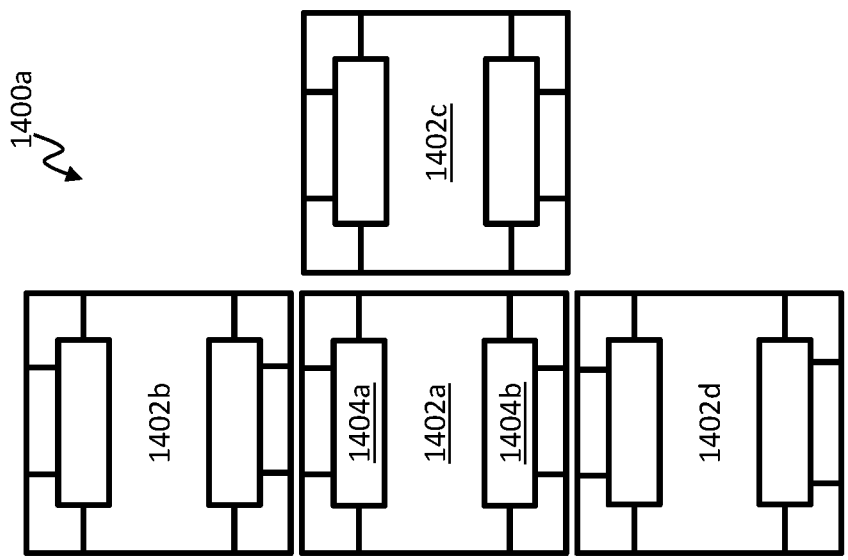

FIGS. 14A-14B illustrate example assemblies 1400a, 1400b of four subcircuits each. In this case, the subcircuits are assembled in two dimensions. For example, assembly 1400a includes subcircuit 1402a coupled to each of subcircuit 1402b, 1402c, and 1402d. Each subcircuit has a monitoring circuit configured to monitor light in two dimensions. For example, subcircuit 1402a has a first monitoring circuit 1404a and a second monitoring circuit 1404b. Assembly 1400b includes subcircuits 1406a, 1406b, 1406c, 1406d in which each subcircuit includes two respective monitoring circuits (e.g., 1408a, 1408b), in which each monitoring circuit has two respective light paths.

Figure 15A:
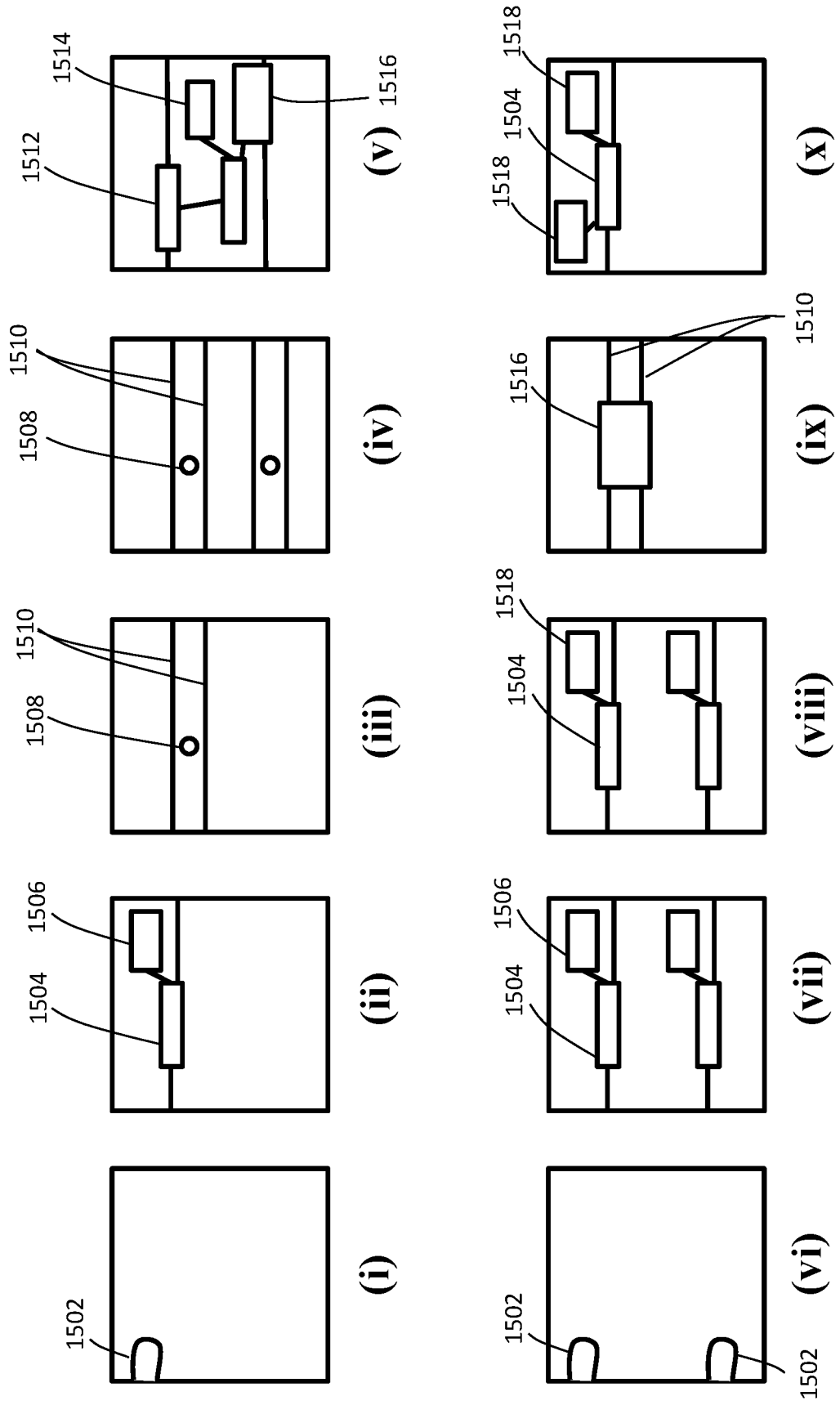
FIGS. 15A-15B are diagrams of top views of examples photonic monitoring circuits for photonic integrated subcircuits.
Figure 15B:
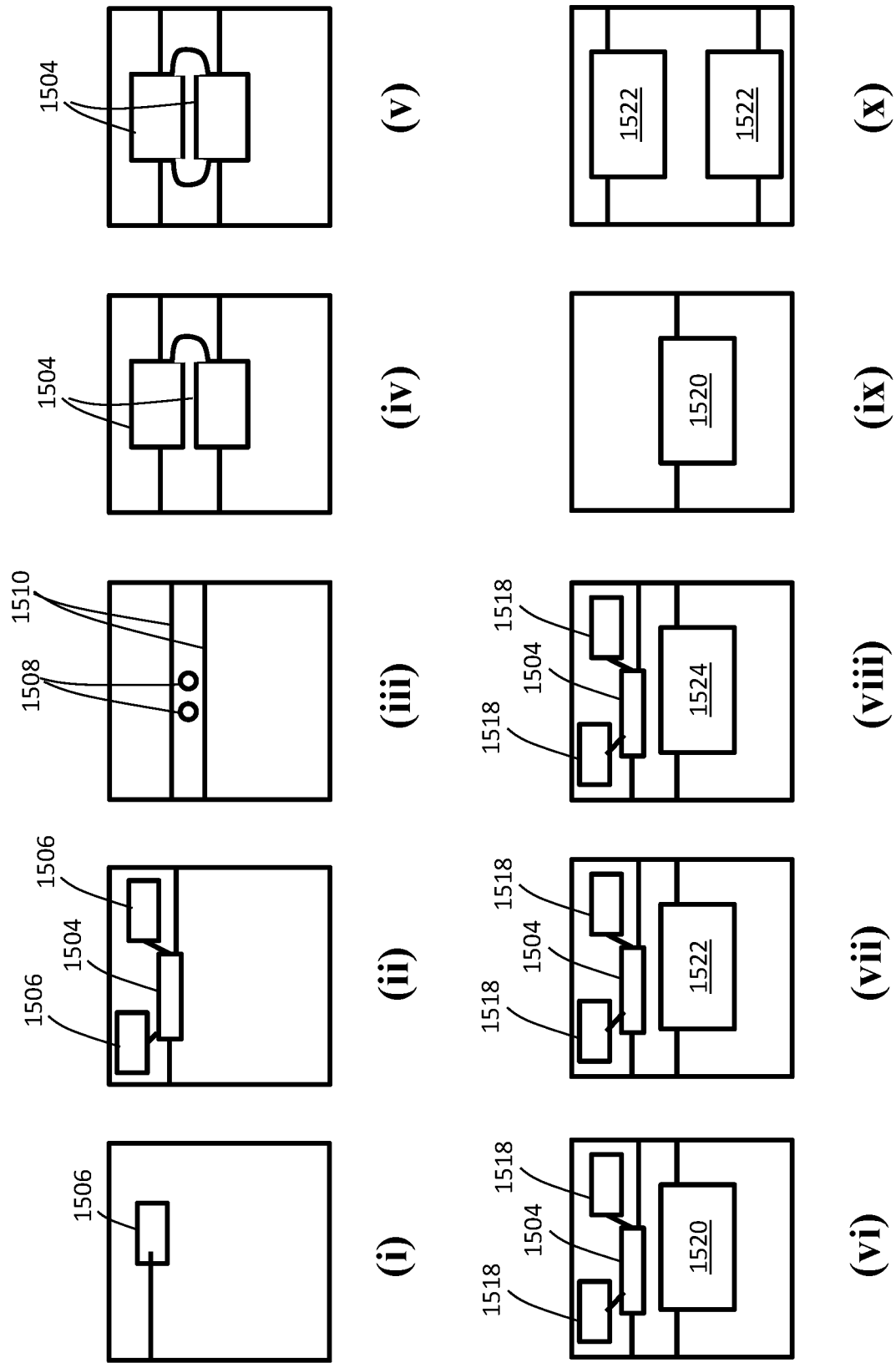

FIGS. 15A-15B provide several examples of photonic monitoring circuit implementations, e.g., configured to determine whether two or more subcircuits are aligned. FIG. 15A(i) depicts a waveguide loopback 1502. This waveguide 1502 receives and returns the light. A photodetector coupled directly or indirectly to this type of subcircuit can determine the degree of alignment (with an adjacent subcircuit) based on the determined optical loss in the returned light. FIG. 15A(ii) depicts a splitter 1504 coupled to a monitoring photodetector 1506. The splitter 1504 is configured to split the received light and send to the photodetector 1506 to determine how well light was received from an adjacent subcircuit.

FIG. 15A(iii) depicts an add-drop ring resonator 1508 which is positioned between two waveguides 1510 and configured to resonate based on the light wavelength in the waveguides 1510. The resonator 1508 may return one or more particular wavelengths. For example, if a given subcircuit has a slightly different add-drop ring, then the monitoring circuit may distinguish the coupling efficiencies for each subcircuit interface. FIG. 15A(iv) depicts a circuit similar to (iii) but with two ring resonators 1508 (each between two waveguides 1510), one situated towards the top and one towards the bottom of the subcircuit. FIG. 15A(v) depicts a double power splitter 1512, followed by a module 1514. The module 1514 can be a photodetector (PD) or out-of-plane coupler (e.g., a grating coupler (GC). The lower splitter (of the double power splitter 1512) can be coupled to a wavelength demultiplexer (WDM)) 1516.

FIG. 15A(vi) depicts a double waveguide loopback 1502. FIG. 15A(vii) depicts two replicas of the circuits of FIG. 15A(ii). FIG. 15A(viii) is similar to FIG. 15A(vii) but employs grating couplers 1518 instead of photodetectors 1506. In this circuit, the out-of-plane emitted light may be detected using a free-space photodetector, a lens system, or a fiber. FIG. 15A(ix) depicts a WDM 1516 coupled between two waveguides. Examples of such circuits include a ring resonator, a WDM having a flat top to make it temperature independent, or a contra-directional coupled Bragg grating reflector. The WDM can be configured to reflect back light at a particular wavelength. FIG. 15A(x) depicts a power splitter with grating couplers 1518 on both sides. Note that most if not all circuits in FIGS. 15A-15B may be configured to monitor light transferred from any side of the subcircuit.

FIG. 15B(i) depicts a waveguide ending in a photodetector 1506, FIG. 15B(ii) depicts a power splitter 1504 with photodetectors 1506. FIG. 15B(iii) depicts a double ring resonator 1508 (e.g., having a flat top), both between waveguides 1510. FIG. 15B(iv) depicts a power splitter 1504 followed by another power splitter 1504. FIG. 15B(v) depicts a circuit similar to FIG. 15B(iv) but useful in both directions. FIG. 15B(vi) depicts a circuit similar to FIG. 15A(viii) but including a separate channel with a wavelength dependent reflector 1520. This can helpful for subcircuits having wavelength-dependent properties, as described herein. FIG. 15B(vii) is similar to circuit of FIG. 15B(vi) but includes a Bragg reflector 1522. FIG. 15B(viii) is similar to the circuit of FIG. 15B(vi) but with a unique wavelength reflector 1524 configured for the particular subcircuit. FIG. 15B(ix) depicts a wavelength dependent reflector 1520 as the sole alignment circuit. FIG. 15B(x) depicts two Bragg reflectors 1522 to measure the alignment accuracy at two different points using the reflected light.

In the above-described monitoring circuits of FIGS. 15A-15B, the following features may be included. The splitters may have any splitting ratio or implementation. The grating couplers (GC) may emit light out-of-plane, configured at a specific angle. The monitoring circuit may utilize one or more GCs that emit at different angles to distinguish between subcircuits. The wavelength demultiplexer (WDM) may have any implementation including, e.g., ring resonators, echelle gratings, Bragg gratings, arrayed waveguide gratings, counter-directional coupling Bragg gratings, etc. In some embodiments, the WDM is configured such that its response is temperature independent, i.e., a flat-top response over a certain wavelength band. This can help ensure that the alignment accuracy monitoring does not change as a function of temperature but only as a function of misalignment. This may be important when monitoring the alignment accuracy during fabrication (e.g., during UV or thermal curing epoxy).

FIG. 16A shows an example one-dimensional assembly 1600 of three subcircuits 1602a, 1602b, 1602c (collectively 1602), in which each subcircuit has at least one monitoring circuit 1604 and a useful circuit 1606. Together, the useful circuits 1606 of two or more subcircuits 1602 may form a larger useful circuit. One of the subcircuits 1602 may be coupled to a fiber array 402a. The fiber array 402a can include multiple optical fiber. The outer fibers 1608 of the fiber array 402a may be used for monitoring the optical coupling efficiency between subcircuits 1602. A laser 1610 may be coupled to the fiber array to provide the light source, e.g., for monitoring the alignment between subcircuits. In some cases, a photodetector 1612 can be coupled into the fiber array and used to monitor light externally.

As discussed above, the subcircuits and/or their respective interfaces can be configured to be wavelength dependent. FIG. 16B provides a simplified representation of FIG. 16A to illustrate an example of wavelength dependence of the interfaces 1614a, 1614b, 1614c between the subcircuits. In this example, interface 1614a is between fiber array 402 and subcircuit 1602a and responds to light with wavelength 1616a; interface 1614b is between subcircuit 1602a and subcircuit 1602b and responds to light with wavelength 1616b; interface 1614c is between subcircuit 1602b and subcircuit 1602c and responds to light with wavelength 1616c. Based on the response from an interface, the photodetector(s) 1612 coupled to the front of the fiber array 402a is able to determine how well aligned two adjacent subcircuits are. In some embodiments, the laser 1610 is tunable to tune the wavelength of the inputted light to the specific WDM of the particular subcircuit (e.g., subcircuit 1602b and not 1602a) in the assembly 1600. In this example, each monitoring circuit can include a WDM to enable the PD 1612 to determine the coupling efficiency between subcircuit 1602a and 1602b, not between 1602b and 1602c.

Figure 17:
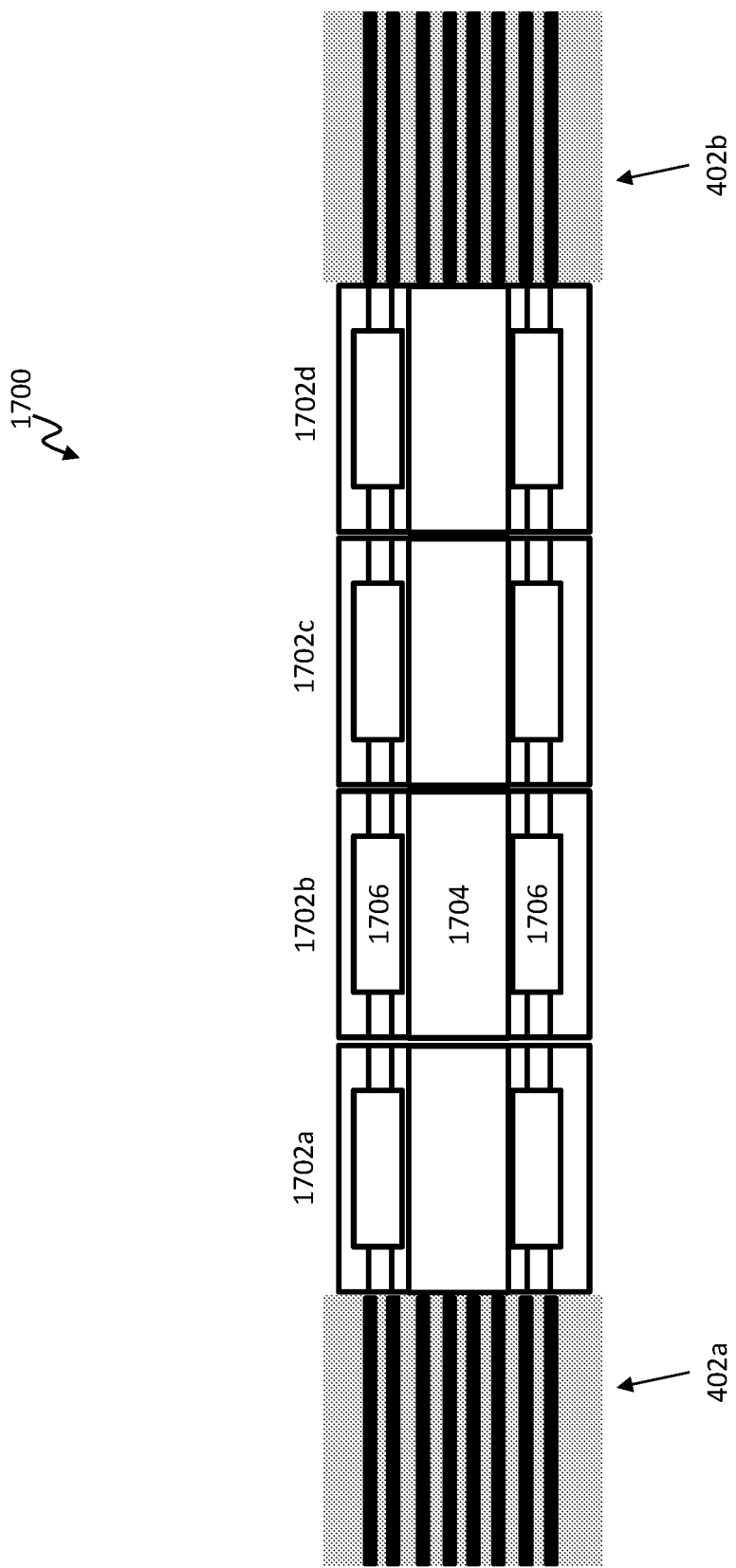
FIG. 17 is a diagram of a top view of an example 1D integrated photonics assembly including four subcircuits.

FIG. 17 illustrates a one-dimensional assembly 1700 of four subcircuits 1702a, 1702b, 1702c, 1702d (collectively referred to as 1702). In this case, light can be coupled to fibers on the left and/or right through a first fiber array 402a and a second fiber array 402b. It can be beneficial for monitoring circuits to monitor light bi-directionally. In particular, there are many ways to build this assembly 1700. For example, the assembly 1700 may be initiated from the left by coupling the fiber array 402a to subcircuit 1702a. Alternatively, the assembly may be initiated from the right by coupling fiber array 402b to subcircuit 1702d. In some embodiments, the assembly 1700 is constructed in two or more portions (e.g., partly from the left and partly from the right). In some embodiments, the subcircuits 1702 is assembled before adding the fiber arrays 402a, 402b. As subcircuits 1702 are added to the assembly, the monitor circuits are used as a feedback mechanism to monitor alignment.

Assembly Alignment and Packaging

Described herein are example systems and methods for passive alignment and/or active alignment of subcircuits. In various embodiments described herein, the alignment systems and methods may feature a receptacle configured with complementary alignment features that can be used to assemble and optically connect many subcircuits at a given time. Further, the subcircuits may be configured to interact with the receptacles to achieve alignment.

As previously discussed, for some subcircuits, the transfer of light is in-plane and by butt-coupling the facet of one subcircuit is positioned adjacent to the facet of the other subcircuit. The input and output optical modes of the subcircuits are configured such that the output(s) match as closely as possible to the input(s) in order to enhance the coupling efficiency. In some embodiments, the mode at the output of the first subcircuit is configured to match the mode at the input of the second subcircuit, adjacent to the first. The modes may be configured even if the waveguide output and input cross-sections themselves are different sizes.

The mode can be configured to be significantly large in order to increase the alignment tolerance of the subcircuits with respect to each other. For example, a mode size can be 3 um, which translates into a 300 nm alignment accuracy for 0.2 dB insertion loss. One way to create such a large mode is to use an optical spot-size convertor on the subcircuits which adiabatically converts a small optical mode from a waveguide to a large mode at the edge of the subcircuit. For example, an implementation of a spot-size convertor is an inverted taper.

Furthermore, the input/output waveguide may be angled in-plane with respect to the facet of the subcircuit in order to reduce back reflections. Anti-reflection coatings may be applied to the subcircuit facets in order to reduce reflections further. In order to get efficient optical coupling between the subcircuits, it is beneficial for all six axes of the subcircuits to be optimized accurately. For instance, two subcircuits can be aligned in the x, y, z axes and all three angles (pitch, roll, and yaw) such that the optical input and output modes of the subcircuit travel along the same axis and to make sure that the subcircuits may be attached with a minimal gap in between.

One way to align subcircuits in six degrees of freedom is to use a hexapod and actively monitor the coupling efficiency between the subcircuits. This method is very cumbersome and slow because light needs to be coupled in and out of the subcircuits while aligning, or an infrared camera needs to be used, etc. It is also a serial process where one may only align one subcircuit at a time, which is not cost-effective when combining, for example, 10 or 20 subcircuits.

Figure 18:
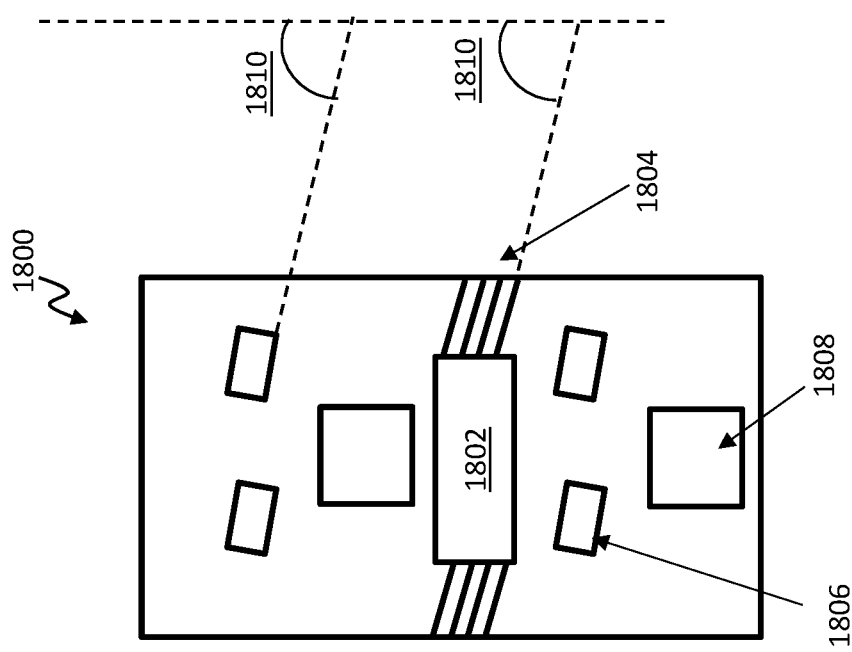
FIG. 18 is a diagram of a top view of an example embodiment of a subcircuit.

One aspect of the present disclosure is a method to align or pre-align optical subcircuits by passive alignment techniques. The subcircuits can be placed on a receptacle that is fabricated separately. FIG. 18 illustrates the top view of an example embodiment of a subcircuit 1800. The subcircuit 1800 includes a photonic circuit 1802, input and output waveguides 1804, and features 1806, 1808 for passive and/or semi-passive alignment. The deep trench features 1806 may be angled having the same angle 1810 as the waveguides 1804. The oxide open 1808 may be rectangular without a rotation relative to the subcircuit. These alignment features are configured to mate with the complementary features of the appropriate receptacle.

In FIG. 18, the alignment features can be formed by etching in the subcircuit a so-called oxide open 1808, which etches up to the core layer of the waveguide, and a deep trench 1806, which etches to more than 50 um deep. Other alignment features may be used including pyramids, inverted pyramids, v-grooves, features that 3D-printed of any shape, features that are formed using nano-imprint, features that are formed using photo-sensitive resist or polymer (SU8), etc. Each alignment feature is responsible for the passive alignment of at least one degree of freedom. Multiple alignment features may have the same functionality and be redundant or create an elastic averaging effect which increases the alignment accuracy.

The subcircuit can be fabricated on a wafer-scale. The wafer can then be diced to create the subcircuits. An important boundary condition is that the size of the subcircuits may vary since the dicing positional accuracy is typically +/− 15 um. In some cases, this boundary condition can be compensated for in the alignment features.

It is beneficial for the edge of the subcircuit where light transfer occurs be in ideal or near ideal condition. The edge may have a side wall angle of 90 degrees. In some embodiments, the edge of the subcircuit has another angle such that two adjacent subcircuits have complementary angles or angles that are negative such that the input and output points of the waveguides may be aligned very close together in order to reduce the diffraction efficiency loss. The subcircuit facet may be smoothed using mechanical polishing or stealth dicing to create a smooth optical facet.

The degree of freedom along the x-direction, i.e., the direction along the width or along the direction of the input/output waveguides as in FIG. 18, is fixed by pushing the two subcircuits against each other until the two subcircuits physically touch. This can be important because the subcircuit dimensions may not be accurately fabricated due to dicing variations. One or more degrees of freedom may be aligned using the alignment features. In the alignment feature implementation of FIG. 18, the vertical alignment (z-axis) is fixed using an oxide etch feature. This etch removes the oxide from the top of the waveguide. The height reference is then the top of the waveguide which is close to the middle of the mode-size. The height reference may be anywhere in the subcircuit stack as long as it results in height matching of mode-sizes of the adjacent subcircuits. Not all subcircuits may be fabricated in the same process and have the same stack-up, so the height reference etch may be different.

When the subcircuits have the exact same distance from the core waveguide layer to the top of the subcircuit, then the top of the subcircuit may be used as height reference. However, this is may be atypical since even wafer-to-wafer or intra-wafer variations of the top layer may occur. FIG. 18 illustrates two oxide etches for the vertical alignment but typically at least three positions are needed with these height reference features which then constrains the height, tip and tilt at the same time. The y degree of freedom or the degree of freedom perpendicular to the waveguide direction can be fixed using the deep trench etch features. The x direction or waveguide direction is not constrained using alignment features because the chips may be pushed against each other and physically touch. The rotational degree of freedom can be constrained due to the fact that there is more than 1 lateral alignment feature.

In some embodiments, two or three lateral alignment features are used for a given subcircuit but more features may be in order to leverage elastic averaging. This is particularly true when the subcircuit and/or receptacle alignment features are made of a non-rigid material. Rotational alignment may be attained using the pick and place tool by referencing the edges of the subcircuit or by pushing the subcircuit edges to each other thereby constraining the rotation. Note that the deep trench etch in FIG. 18, which acting as a lateral alignment feature, can be rotated with respect to the subcircuit edge. In some embodiments, this angle of rotation is the same as the angle of the input and output waveguides relative to the edge of the subcircuit. The rotated lateral features thus creates a free degree of freedom along the waveguide direction.

Figure 19:
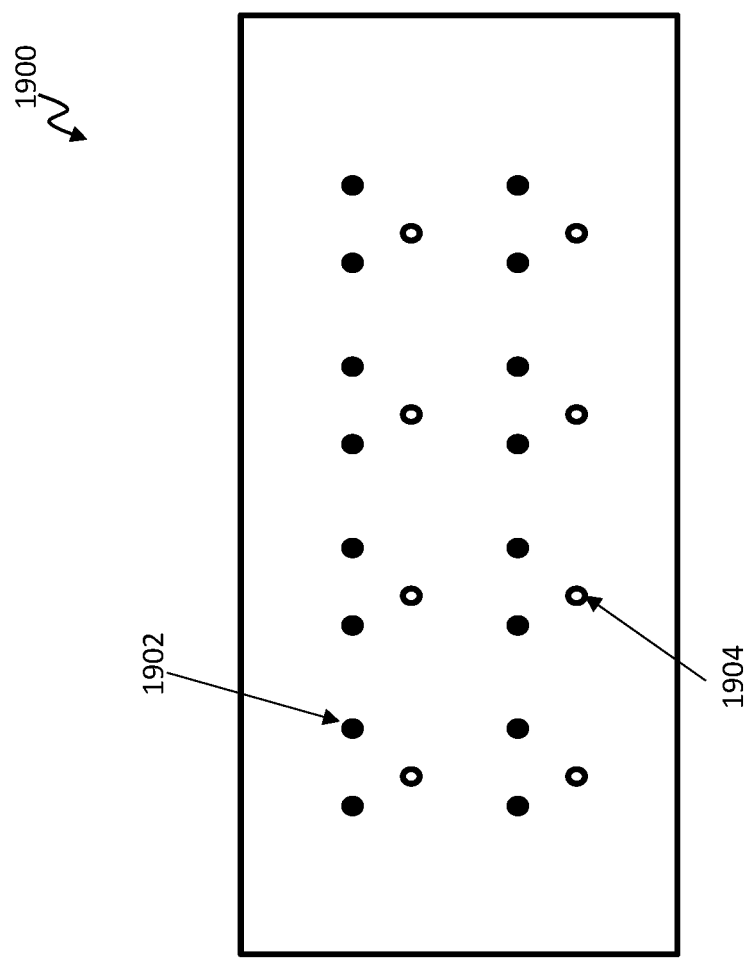
FIG. 19 is a diagram of a top view of an example receptacle configured to be complementary to the subcircuit of FIG. 18 and configured to align two subcircuits of FIG. 18.

FIG. 19 illustrates the top view of a receptacle 1900 configured to be complementary to the subcircuit 1800. The receptacle includes alignment features with different heights that can mate with the subcircuit. Note that the alignment features can be used to align the subcircuits laterally or vertically. For example, lateral alignment features 1902 can be used to align a subcircuit 1800 laterally relative to the receptacle 1900 and/or to adjacent subcircuits. The lateral alignment features 1902 may be any shape as long as they fit in the deep trench etch hole of the subcircuit 1800 and do not touch the bottom of the deep trench (which would constrain the vertical direction). Vertical alignment features 1904 can be used to align a subcircuit 1800 vertically relative to the receptacle 1900 and/or to adjacent subcircuits. The vertical alignment feature may be any shape as long as it does not touch the edges of the oxide etch of the subcircuit. For example, the lateral or vertical features may have a circular, semi-circular, elliptical, rectangular, or other shape.

Figure 20:
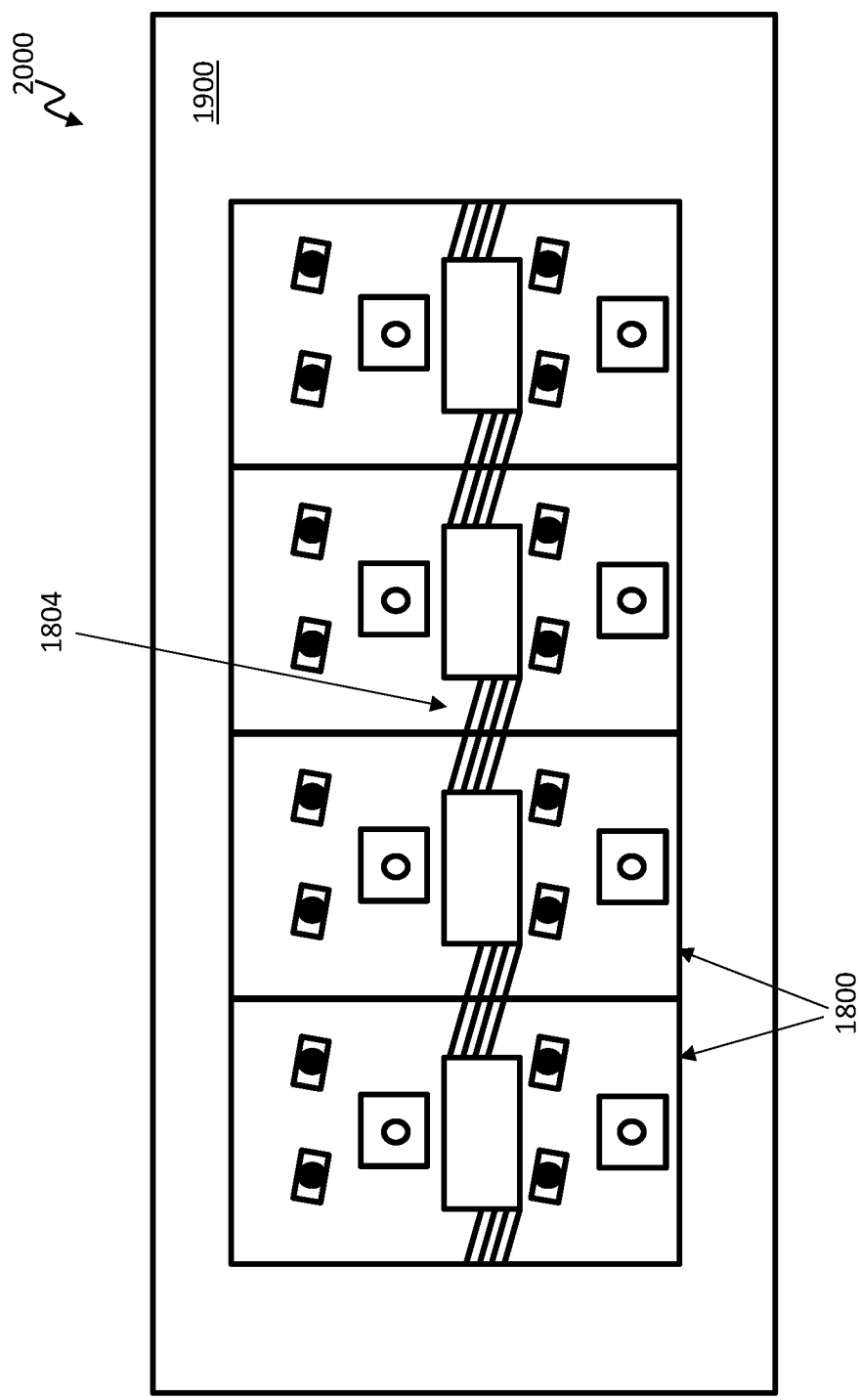
FIG. 20 is a diagram of a top view of multiple subcircuits of FIG. 18A positioned on the receptacle of FIG. 19.
Figure 23:
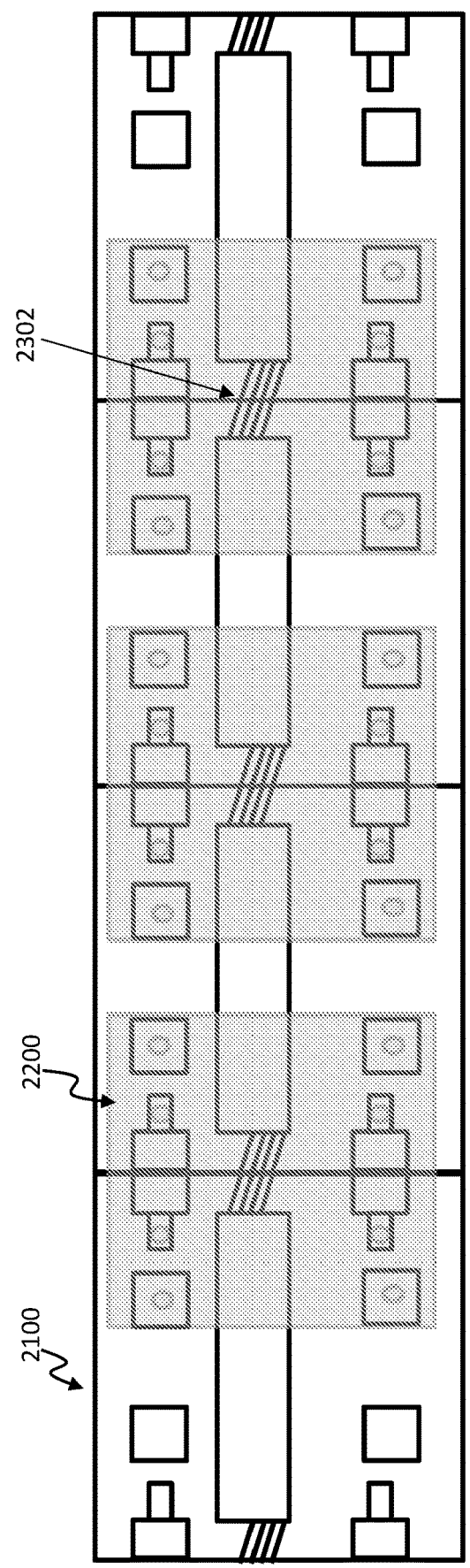
FIG. 23 is a diagram of a top view of an example assembly of subcircuits.
Figure 24A:
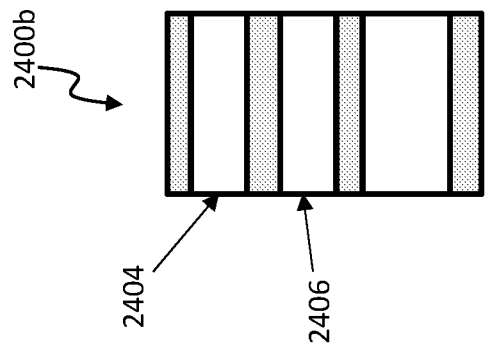
FIGS. 24A-24D are diagrams of top views of example variations of subcircuits.
Figure 24B:
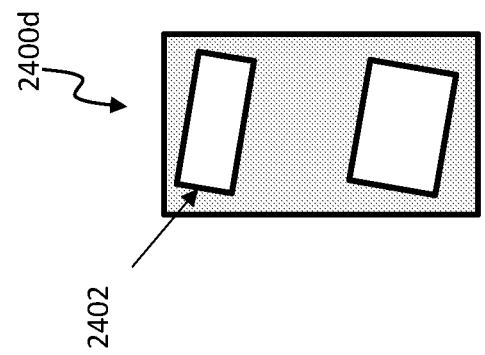
Figure 24C:
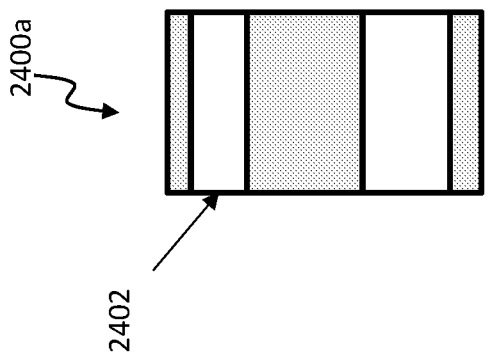
Figure 24D:
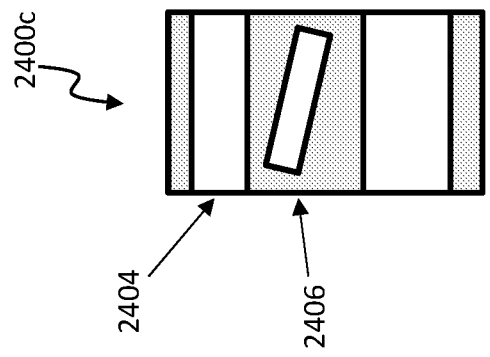

FIG. 20 illustrates the top view of multiple subcircuits 1800 positioned on the receptacle 1900. The complementary alignment features of the subcircuits 1802 and receptacle 1900 are configured such that the waveguides 1804 line up perfectly or near perfectly. This can be true even when the width of the subcircuit varies due to dicing.

In some embodiments, between the facets of the subcircuits, an index matching epoxy (e.g., ultraviolet epoxy, thermal epoxy, two-part epoxy, etc.) are added to glue the two subcircuits together. One issue with attaching subcircuits with epoxy is that it takes time to cure the epoxy. Therefore, it may be beneficial if first all or most of the subcircuits are aligned, epoxy is added, and the epoxy between the facets of the subcircuits is cured all at once outside of the pick and place machine. For this, the chips may need to be mechanically held in place in order to not lose alignment. The alignment features contribute to the mechanical stability of the subcircuits relative to the receptacle. However, further reinforcement may be used, e.g., mechanical clamps or vacuum using vacuum holes or lines in the receptacle. After epoxy curing, the epoxy may glue the subcircuits to the receptacle. The subcircuits may be removed from the receptacle by for example treating the receptacle with and anti-adhesive layer before use. The receptacle may then be used multiple times, thereby decreasing assembly cost. One beneficial factor of using a receptacle temporarily and not permanently is that the top of the subcircuit assembly is now accessible and the subcircuits assembly may be packaged (e.g., by wirebonding, fiber array attachment, PCB board mounting, etc.) in a regular fashion with the top side face up.

FIG. 21 shows the top view of an example subcircuit 2100 including photonic circuit 2102 and input and output waveguides 2104. The subcircuit 2100 is configured with two types of etches, a shallow-type etch (e.g., oxide open) 2106 and a deep-type etch (e.g., deep trench) 2108. In this case, the waveguides are straight, e.g., the angle of the lateral alignment features is zero. The alignment features may have a specific shape such as a funneling shape to guide the alignment process. In this case, many receptacles are used with each receptacle aligning two subcircuits. This has the benefit of having more versatility in terms of chip sizes and process differences. Furthermore, the receptacle does not to be removed since one has access to the top of subcircuits in regions where there is no receptacle.

FIG. 22 illustrates a top view of an example connector chip 2200 that may be used in assembling two subcircuits 2100. The connector chip 2200 can be configured with lateral alignment features 2202 and/or vertical alignment features 2204.

FIG. 2.3 depicts a top view of an example assembly of subcircuits 2100. The subcircuits 2100 are assembled using connector chips 2200. Each connector chip 2200 combines two subcircuits 2100 such that the input waveguides 2104 of one subcircuit are aligned to the output waveguides 2104 of the other subcircuit (at position 2302).

FIGS. 24A-24D shows top views of example variations for subcircuits 2400a, 2400b, 2400c, 2400d (collectively referred to as 2400). The subcircuits 2400 are configured with etches 2402 that may extend or not extend to the edge of the subcircuit. The etches can include oxide open 2404 or a deep trench 2406. The etches 2402 may be non-angled or angled (relative to the subcircuit 2400). The etches 2402 may be used for either vertical or lateral alignment or both.

Figure 25A:
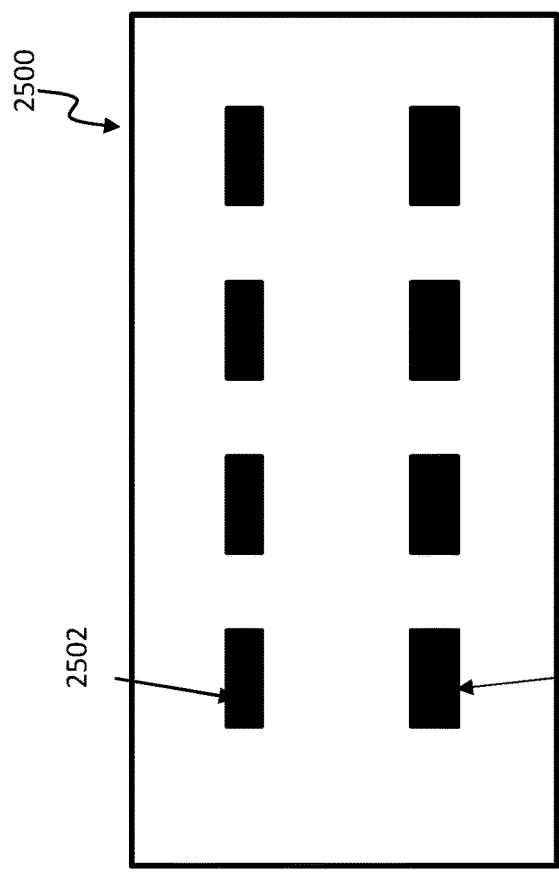
FIG. 25A is a diagram of a top view of an example receptacle configured to receive subcircuits of FIGS. 24A-24D.
Figure 25B:
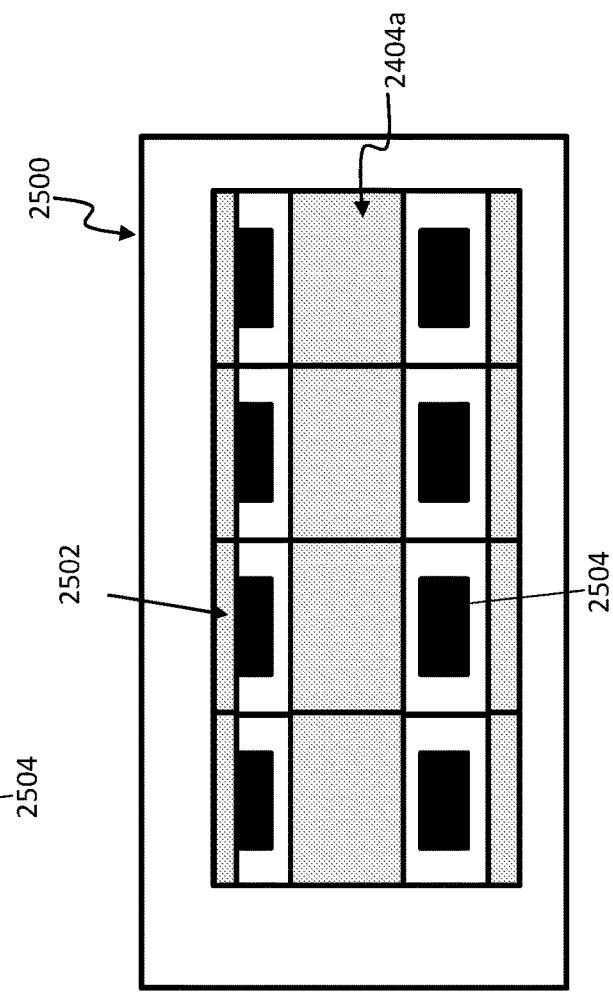
FIG. 25B is a diagram of a top view of the receptacle of FIG. 25A connected to four subcircuits of FIG. 24A.

FIG. 25A illustrates a top view of a receptacle 2500 configured to receive subcircuits 2400a, 2400b, and/or 2400c. The receptacle 2500 includes vertical and/or lateral alignment feature 2502 and a vertical alignment feature 2504. FIG. 25B illustrates the top view of the receptacle 2500 connected to four subcircuits 2400a. In this case, the alignment features are more rectangular and the receptacle alignment features are also rectangular, touching with a plane of points instead of a vertical line (compare to FIGS. 18-20). The oxide open etch can be used for both vertical and lateral alignment features. The edge of the northmost alignment feature can be used for lateral and rotational alignment.

Figure 26A:
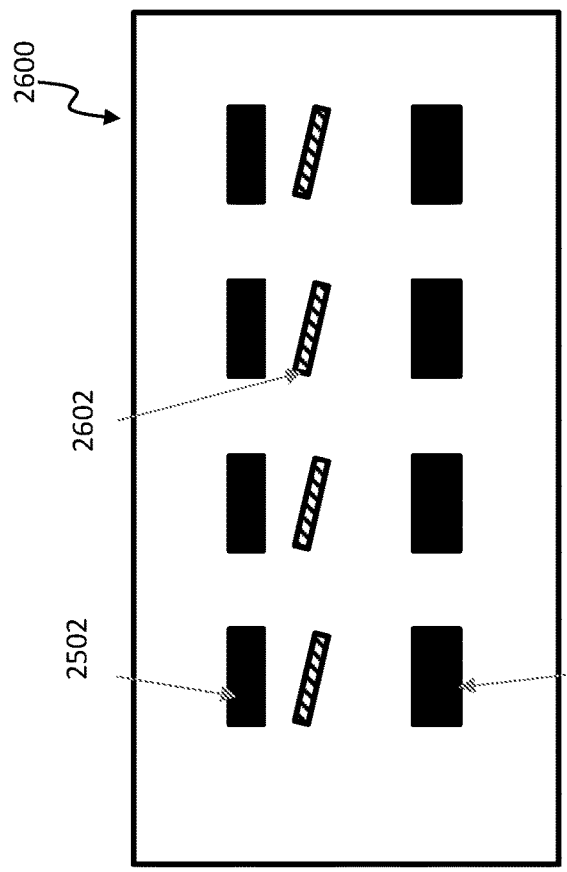
FIG. 26A is a diagram of a top view of an example receptacle configured to receive subcircuit of FIG. 24A.
Figure 26B:
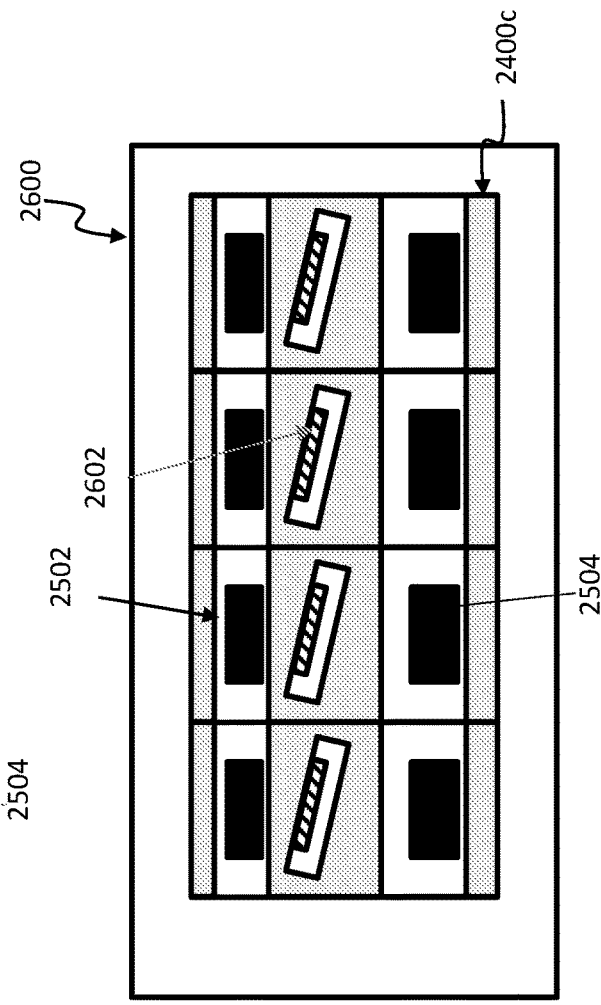
FIG. 26B is a diagram of a top view of an example receptacle connection to four subcircuits of FIG. 24A.

FIG. 26A illustrates a top view of receptacle 2600 configured to receive subcircuit 2400c. In receptacle 2600, the lateral alignment feature 2602 is angled and, once mated with the subcircuit 2400c, only touches one side or edge of subcircuit 2400c. FIG. 2613 illustrates the top view of the receptacle 2600 connection to four subcircuits 2400c. The receptacle 2600 features angled lateral alignment features that are rectangular in shape. In this case, the middle alignment features constrain the chip alignment in the lateral and rotational dimensions.

Figure 27:
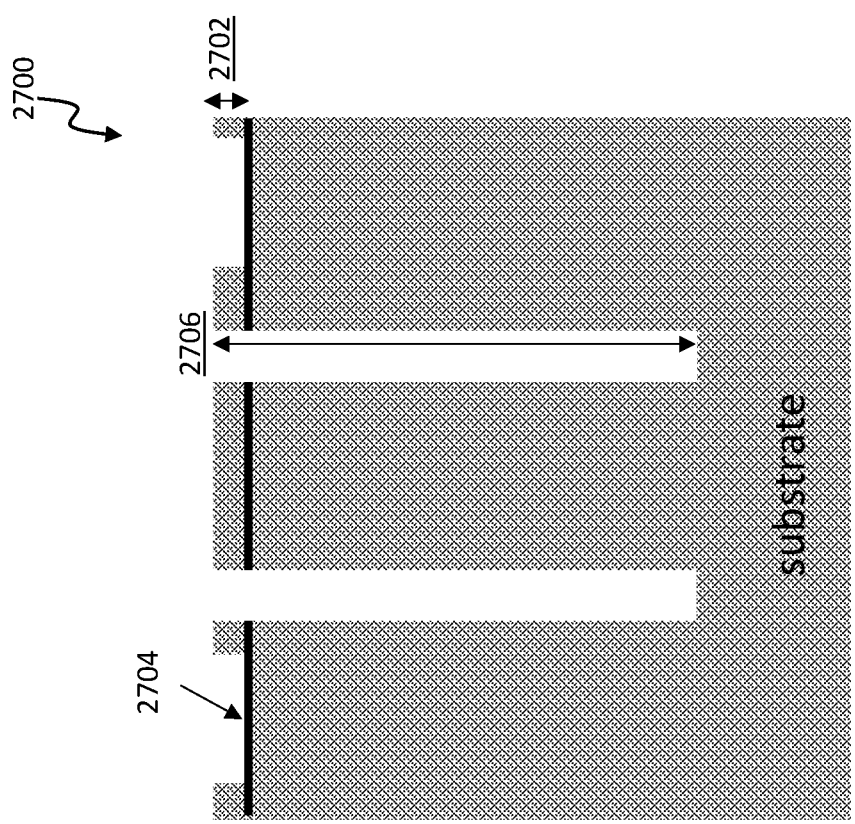
FIG. 27 is a diagram of a cross-sectional view of an example subcircuit.

FIG. 27 is a cross-sectional view of an example subcircuit 2700. The subcircuit 2700 has a shallow etch 2702 (e.g., oxide open) of 5 um which stops at or is close to the waveguide layer 2704 and a deep trench etch 2706 of 80 um. The subcircuit 2700 has a waveguide layer 2704 which guides light and may be used to form input and output couplers and photonic circuits. In some embodiments, the generation of alignment features for subcircuit 2700 takes advantage of processes available in every or most of the fabs. Therefore, the deep trench etch and oxide etch can be useful because they are both options that are available in many fabs and may in some cases be fabricated on the same wafer.

The deep trench is typically used for creating a smooth facet for horizontal fiber coupling. Since a standard single mode cleaved fiber has a 125 um diameter, the deep trench is typically more than 62.5 um deep (half of the fiber diameter). As long as the lateral alignment features on the receptacle (blue in FIG. 9) are not taller than 62.5 um they will not touch the bottom of the deep trench and thus not confine the subcircuit in the vertical direction. This is desirable since the depth of a deep trench is typically difficult to accurately control. The oxide open on the other hand may be controlled with nanometer precision. Another benefit of using the deep trench is that the area that is used for lateral alignment is comparatively large and thus pretty robust to mechanical damage and wear and tear.

Figure 28:
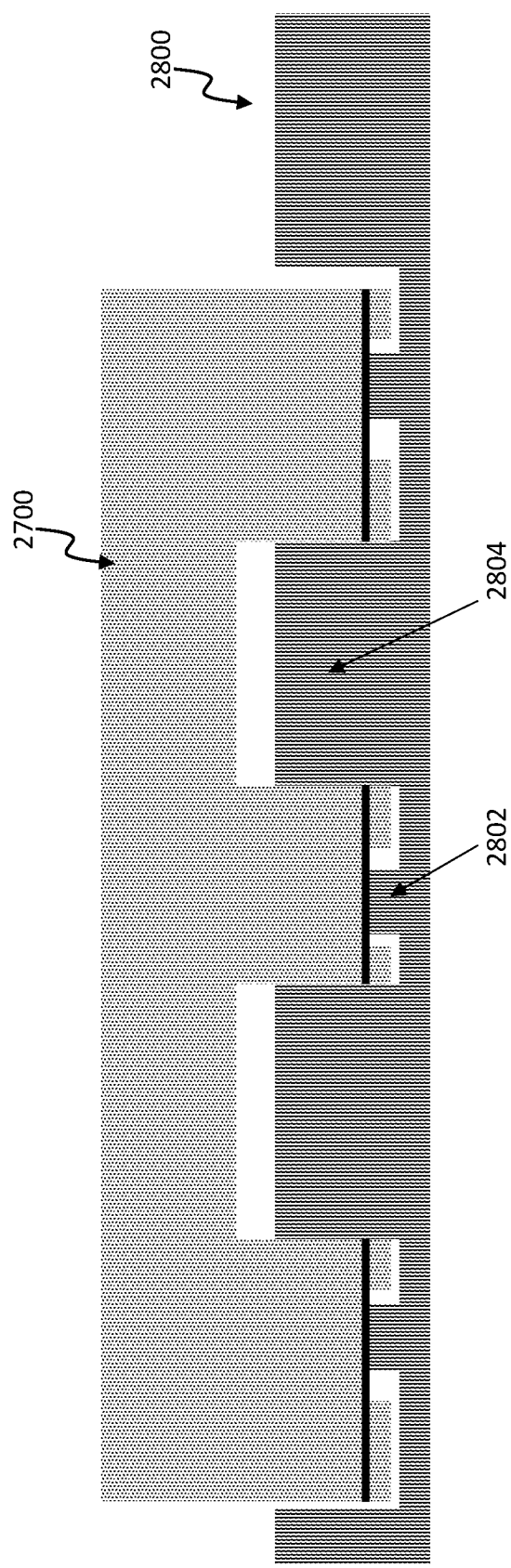
FIG. 28 is a diagram of a cross-sectional view of the subcircuit of FIG. 27 in combination with the receptacle.

FIG. 28 is a cross-sectional view of the subcircuit 2700 in combination with the receptacle 2800. The example receptacle 2800 includes vertical alignment features 2802 configured to mate with the shallow etch 2702 of the subcircuit 2700 and lateral alignment features 2804 configured to make with the deep features 2706.

Figure 29:
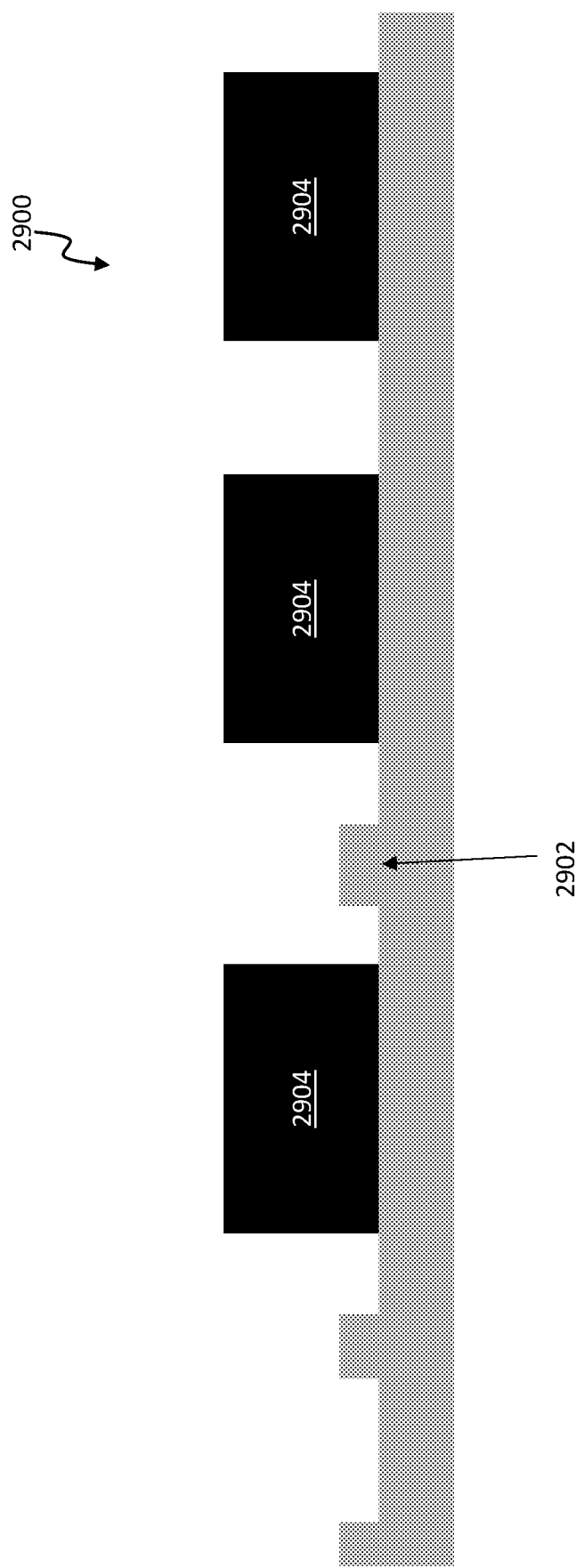
FIG. 29 is a diagram of a cross-sectional view of an example receptacle.

FIG. 29 is a cross-sectional view of an example implementation of a receptacle 2900. The lower profile alignment features 2902 are in glass and are used for vertical alignment. The higher profile alignment features are made of a polymer 2904 and used for lateral alignment.

Figure 30:
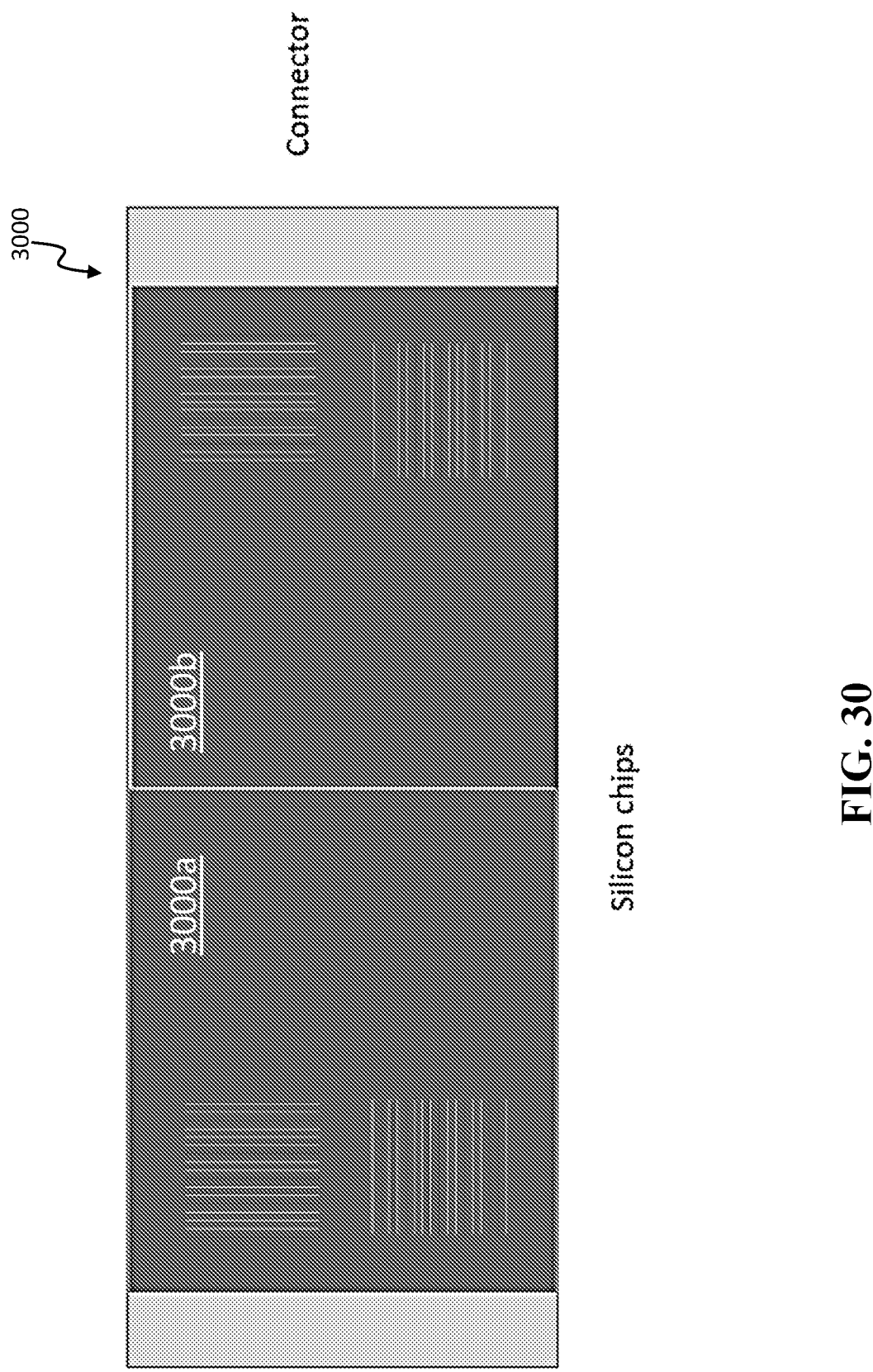
FIG. 30 is a diagram of a top view of example subcircuits aligned to an example receptacle.

FIG. 30 shows a top view example subcircuit(s) 3000a, 3000b aligned to a receptacle 3002. In this case, the alignment features are designed to be a grating of several slits. Note also that the subcircuit(s) 3100a, 3100b are aligned in mirror-image positions relative to one another. In this case, the alignment features are configured as gratings (e.g., repetitive structure) which may give more freedom to configure elastic averaging for the combination.

Figures 31A, 31B, 31C:
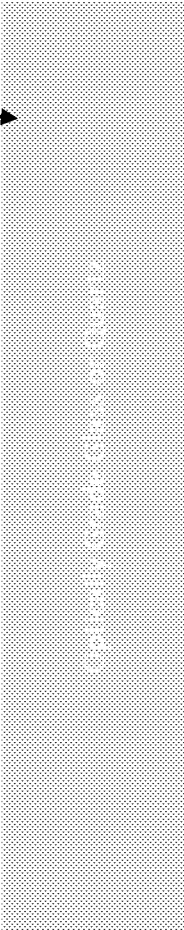
FIGS. 31A-31D are diagrams of cross-sectional views of example fabrication steps for fabricating a receptacle wafer.
Figure 31D:
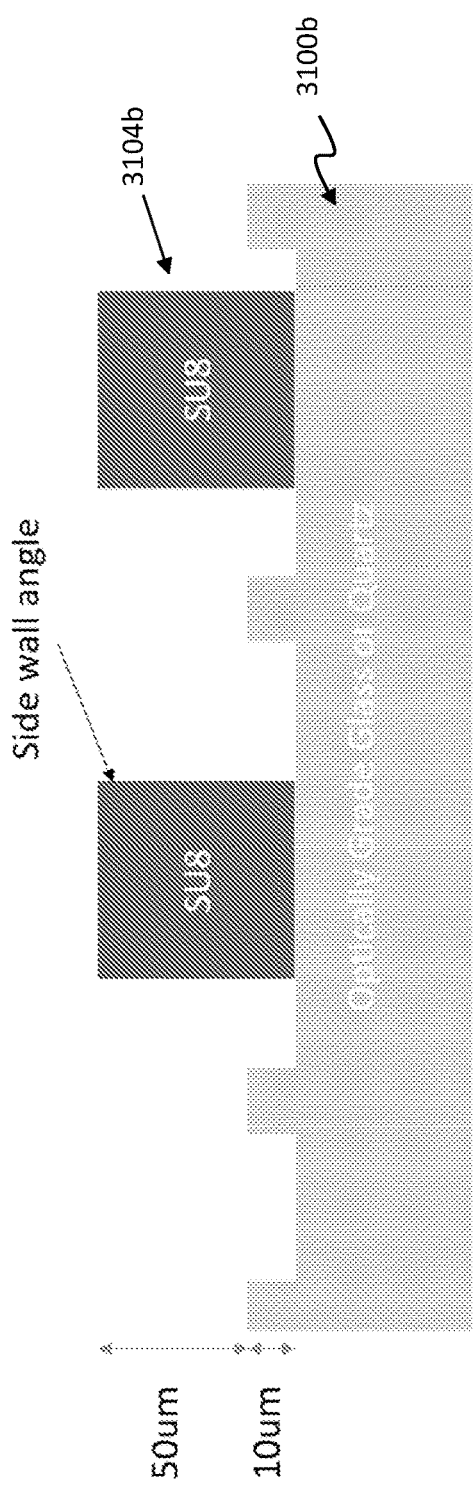
Figure 31E:
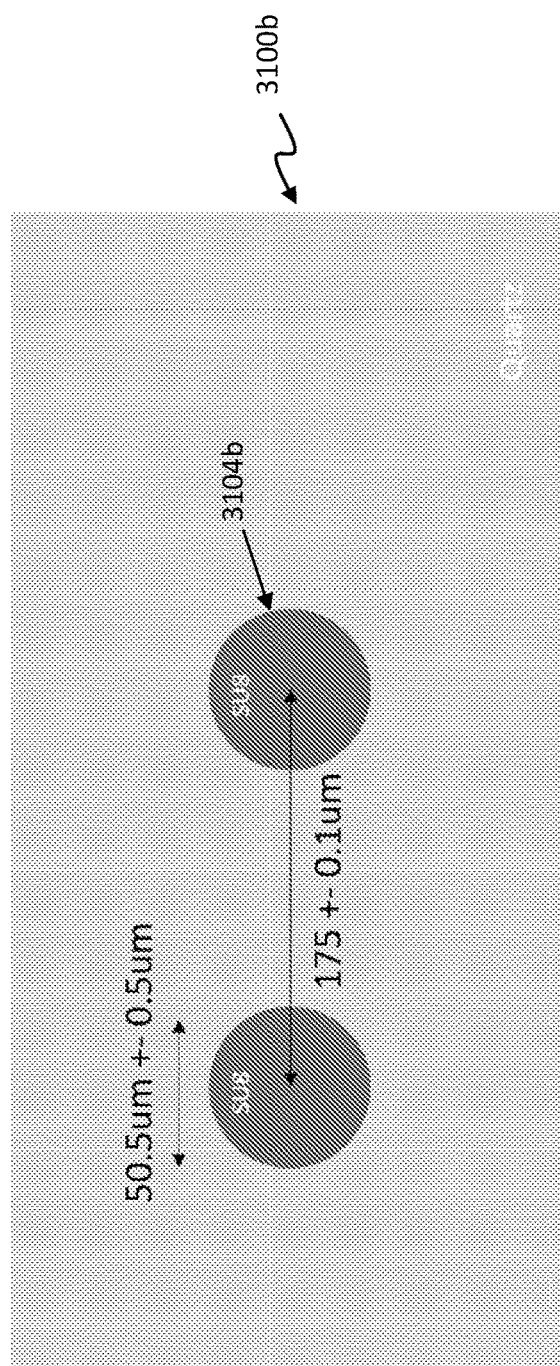
FIG. 31E is a diagram of a top view of FIG. 31D.

FIGS. 31A-31E illustrate example fabrication steps for fabricating a receptacle wafer. FIGS. 31A-31D provide a cross-sectional view while FIG. 31E provides a top view. Referring to FIG. 31A, optical-grade glass or quartz can be used as a starting substrate 3100a. A flat, transparent substrate can make it easy to visually inspect the alignment. Referring to FIG. 31B, a shallow etch (e.g., of 10 um) is performed to define vertical alignment features 3102 in etched substrate 3100b. The vertical alignment features can be etched (for example, a 10 um etch) with an etch that is deeper than the oxide open etch on the subcircuit (typically ranging from 2 um to 9 um). The top of the glass substrate 3100b now acts as the vertical alignment reference point. This may be beneficial since the glass was mechanically polished to be completely flat (e.g., optically grade flat).

In FIG. 31C, the lateral alignment features can be formed in an epoxy or polymer (which is elastic). For instance, a polymer (e.g., SU8) 3104a is spin coated onto the substrate 3100b. In FIG. 31D, the SU8 3104b is patterned to define lateral alignment features. In FIG. 31E, the lateral alignment features are provided in a top view. In this example, each lateral alignment feature is substantially circular with a diameter of 50.5 um+/- 0.5 um. These features are separate by 175 um+/- 0.1 um.

Figure 39:
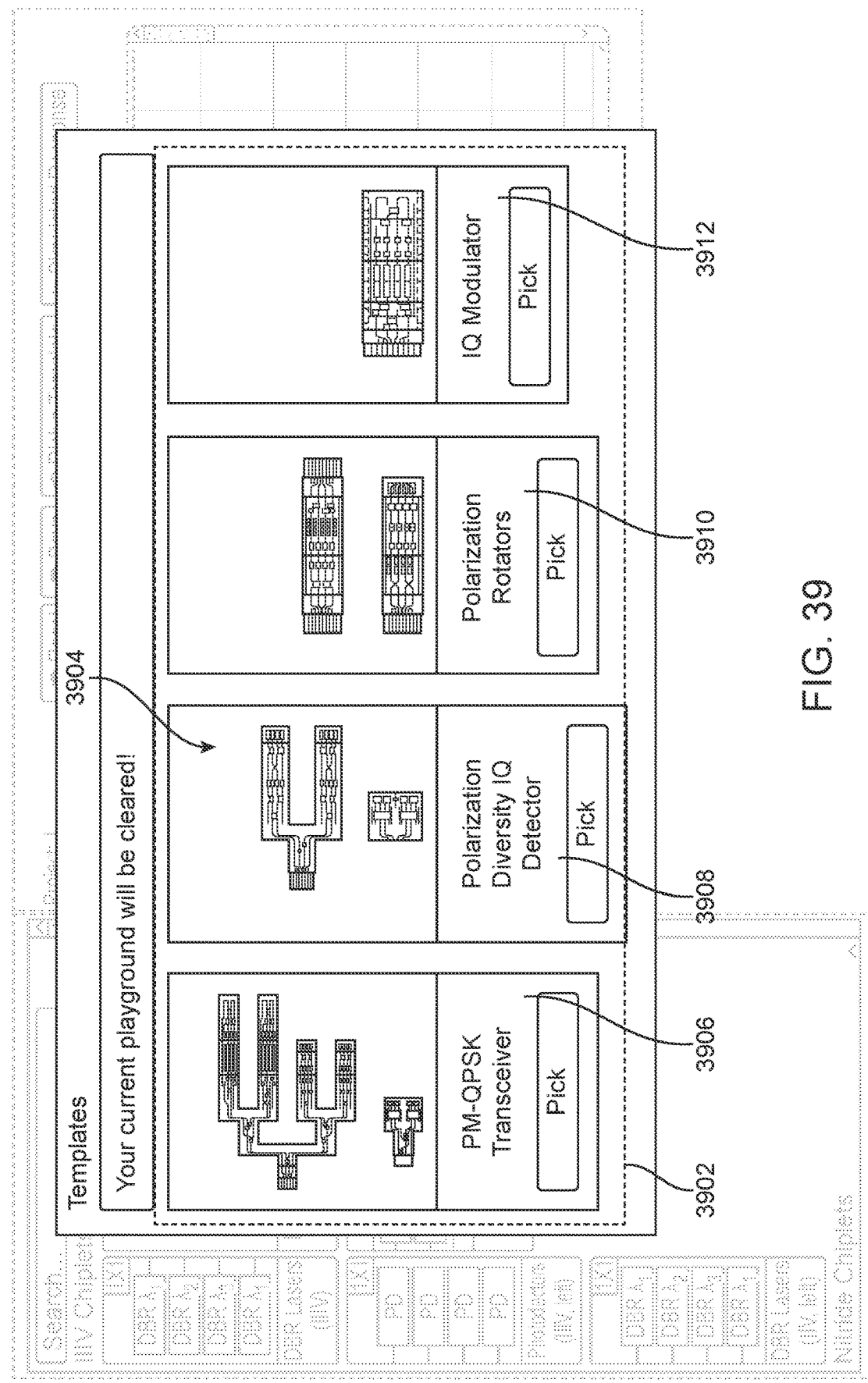
FIG. 39 is a graphical representation of an example menu of the user interface of showing a plurality of virtual templates received from a template library module.

The side wall angle of these features may be configured for easy insert (positive angle) or for better mechanical stability (negative angle). The width of the lateral alignment feature 3104b may be either the same size, a bit narrower or a bit wider than the pit in the subcircuit. Exactly the same size may be ideal but may not be perfectly achieved. If the lateral alignment feature is a bit wider on the receptacle, then it may need to compress a bit to match the trench width in the subcircuit. Another strategy is to make the receptacle features a bit narrower and offset them from the center position. The latter is shown in FIG. 39 in which the left alignment feature touches the right edge of the sidewall of the subcircuit trench and the right alignment feature touches left edge of the sidewall of the subcircuit. More complex elastic averaging strategies may be implemented. In some embodiments, instead of a quartz or glass substrate, a silicon substrate is used. Other materials and substrates may be used for the substrate. In one example, the receptacles may be 3D printed, given the printer has sufficient accuracy.

Figure 32A:
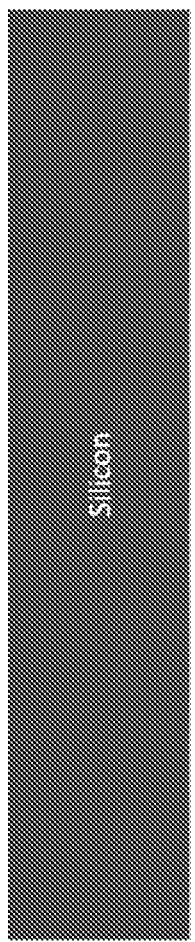
FIGS. 32A-32E are diagrams of cross-sectional views of an example alternative method to fabricate a receptacle.
Figure 32B:
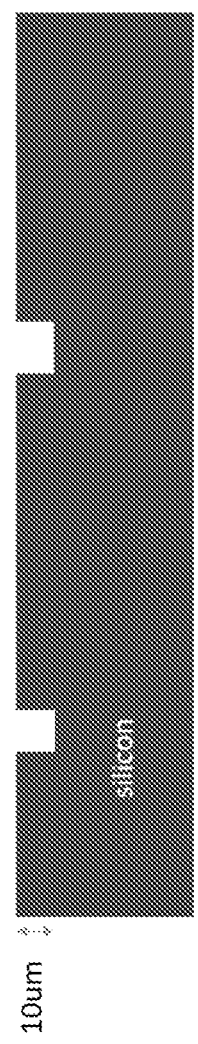
Figure 32C:
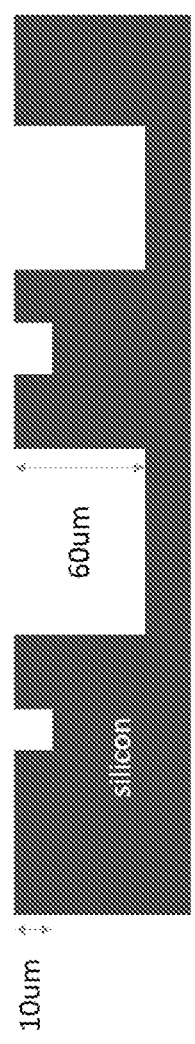
Figure 32D:
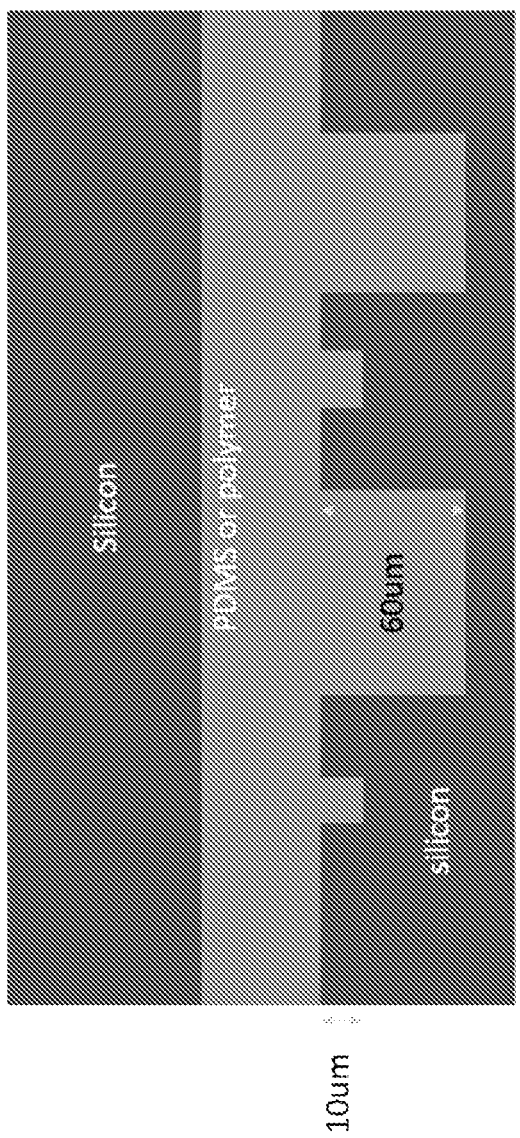
Figure 32E:
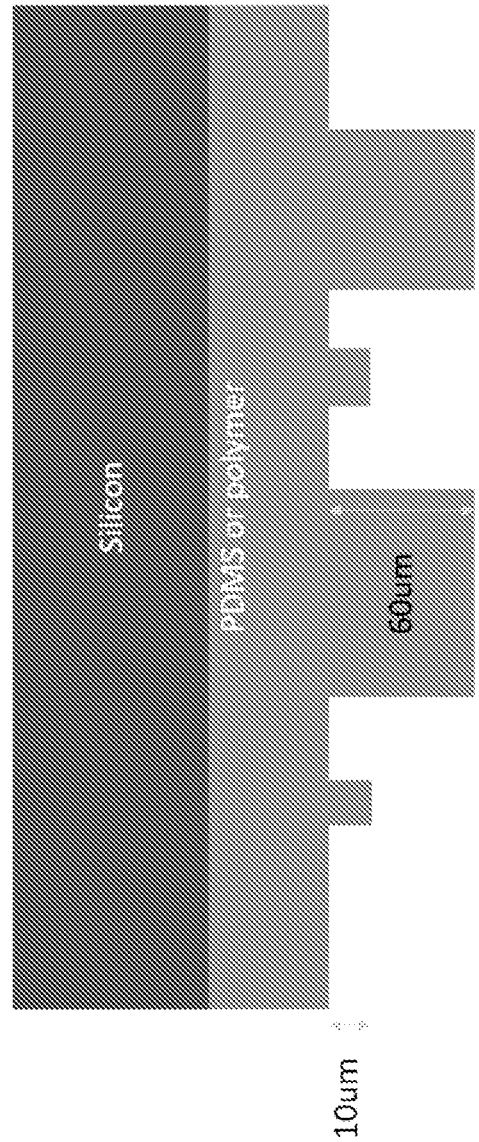

FIGS. 32A-32E illustrate an example alternative method to fabricate a receptacle. FIGS. 32A-32D provide a cross-sectional view while FIG. 32E provides a top view. In FIGS.

32B-32C, the inverse (or mold) is first patterned in a silicon substrate using two etch steps. In FIGS. 32D-32E, using a nanoimprint method, the receptacle is fabricated using the silicon as a mold in PDMS or polymer. One benefit of this approach is that it may reduce the cost of the receptacle itself.

Figure 33A:
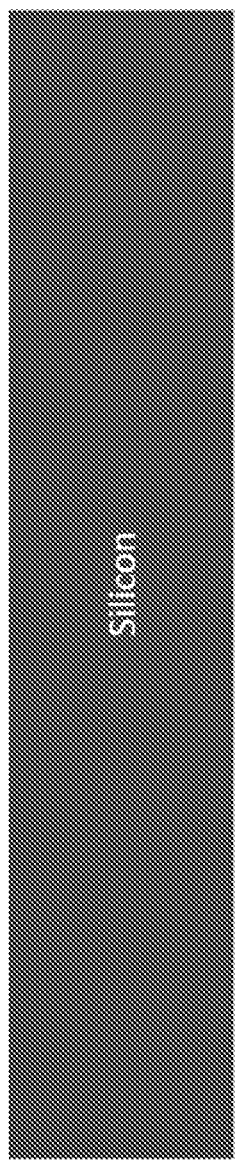
FIGS. 33A-33C are diagrams of cross-sectional views of an example method to fabricate the receptacle directly on a silicon wafer.
Figure 33B:
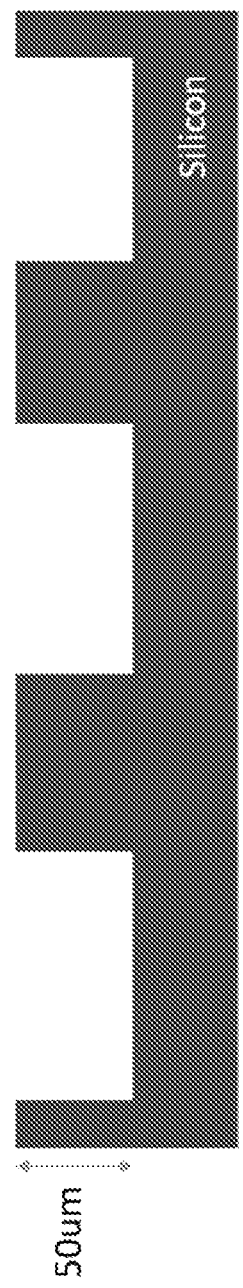
Figure 33C:
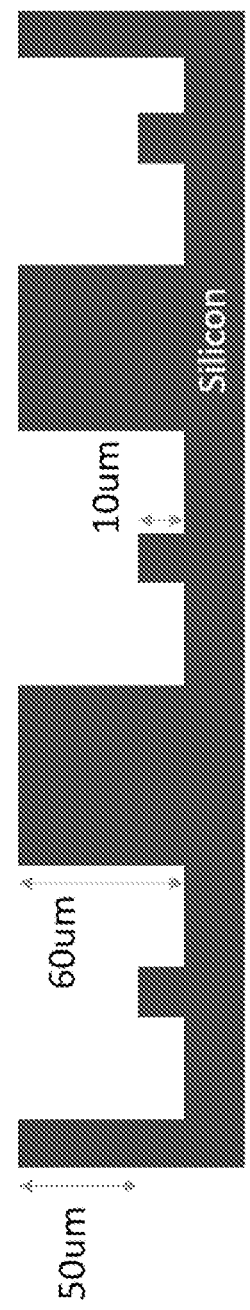

FIGS. 33A-33C illustrate an example method to fabricate the receptacle directly on a silicon wafer. The first etch is then the deepest etch and a second etch is performed to define the vertical alignment features. In FIG. 33B, a deep etch (e.g., of 50 um) is performed. In FIG. 33C, a shallow etch (e.g., of 10 um) is performed into the deep etched pits.

Figure 34:
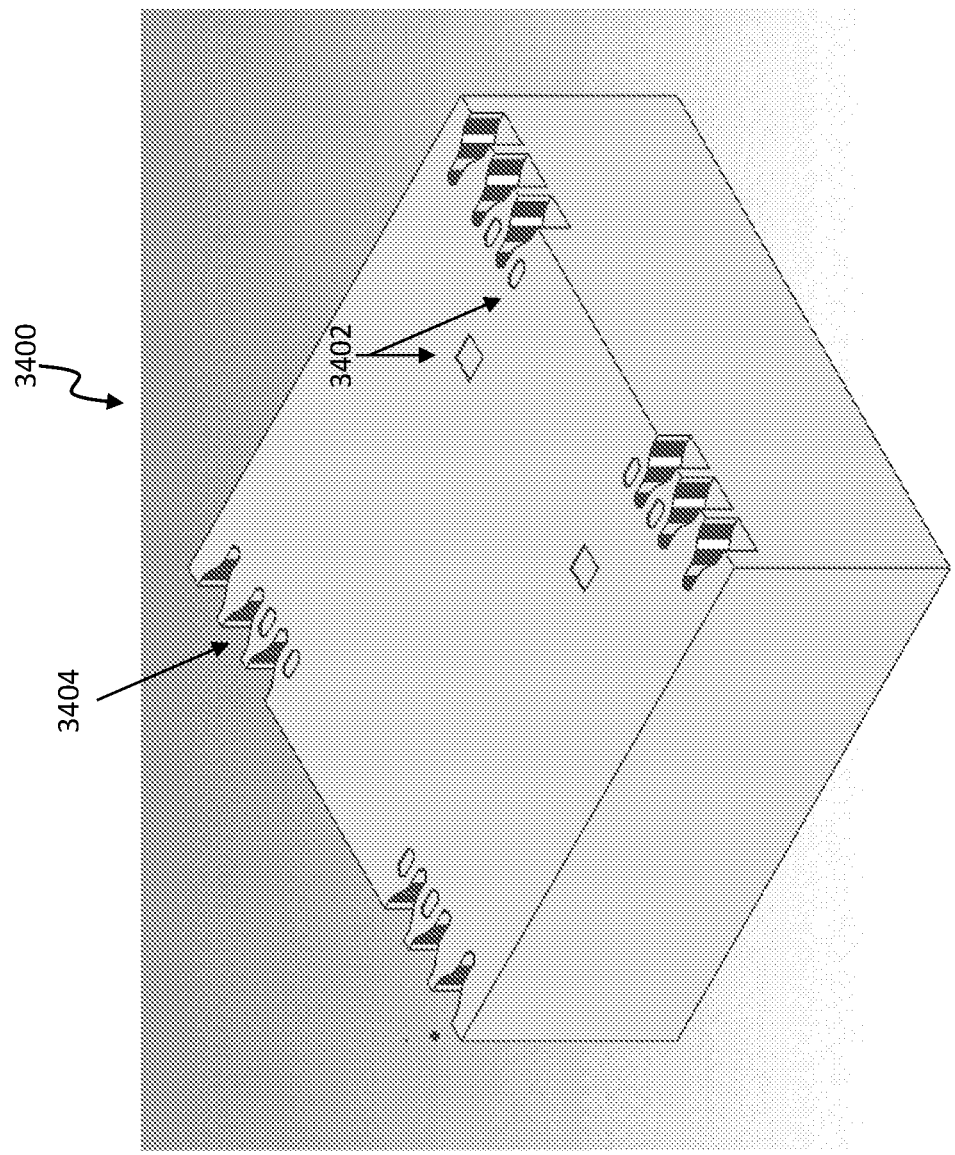
FIG. 34 is a diagram of a perspective view of an example 3D drawing of a subcircuit having shallow-etched vertical alignment features and deep-etched lateral alignment features.
Figure 35:
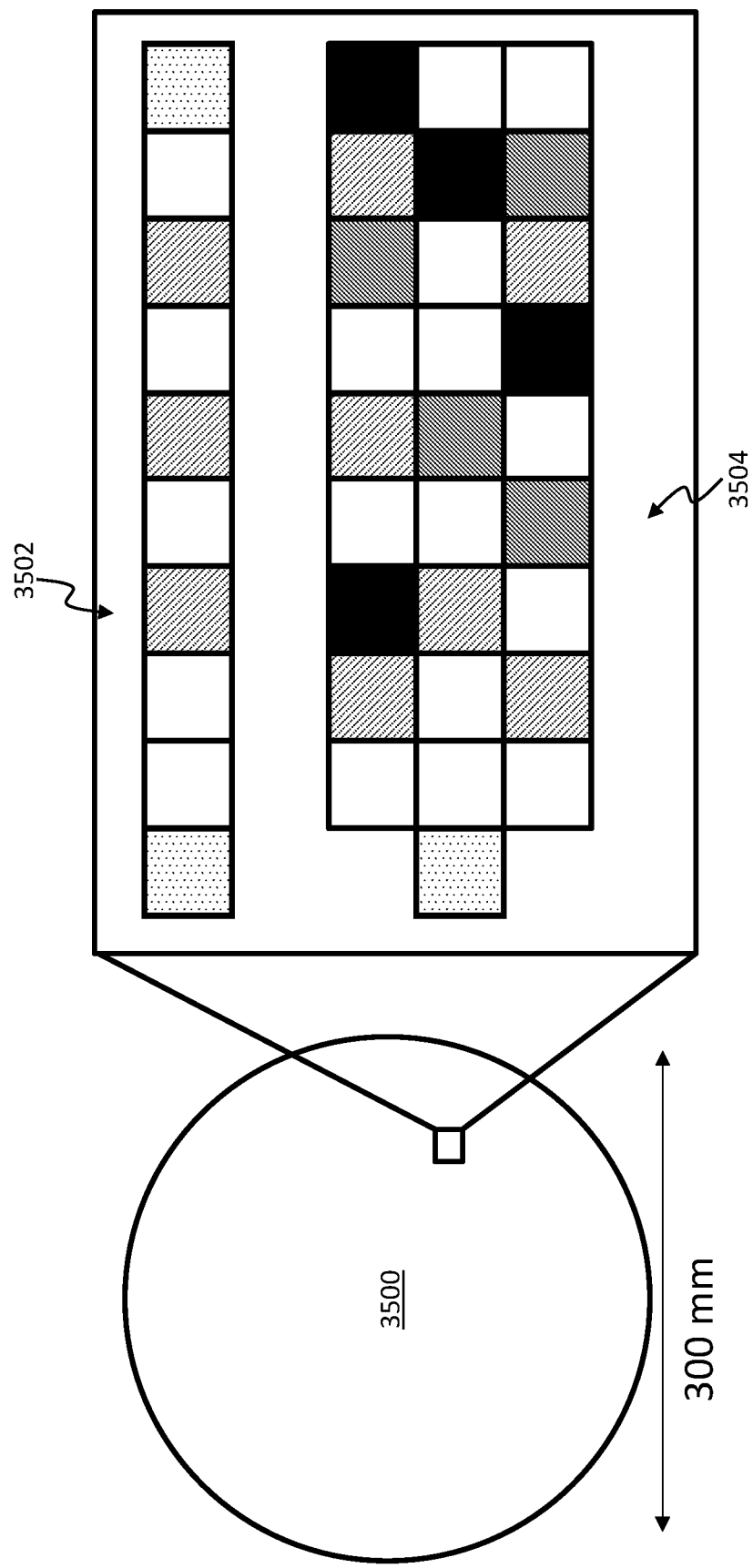
FIG. 35 is a diagram of a top view of an example receptacle water including example assemblies of subcircuits.

FIG. 34 illustrates an example 3D drawing of a subcircuit 3400 having shallow-etched vertical alignment features 3402 and deep-etched lateral alignment features 3404. The example subcircuit is 2 mm×2 mm with 790 um in thickness. The 3D rendering better illustrates the aspect ratio of the alignment features (deep versus shallow) and the etch depths with respect to the subcircuit thickness, FIG. 35 illustrates the assemblies 3502, 3504 of subcircuits on a receptacle silicon wafer 3500 which may be either 1-dimensional, 2-dimensional, or 1.5-dimensional. The wafer has a approximately 300 mm diameter. The subcircuits have different colors indicating subcircuits from different processes or technologies.

Figure 36:
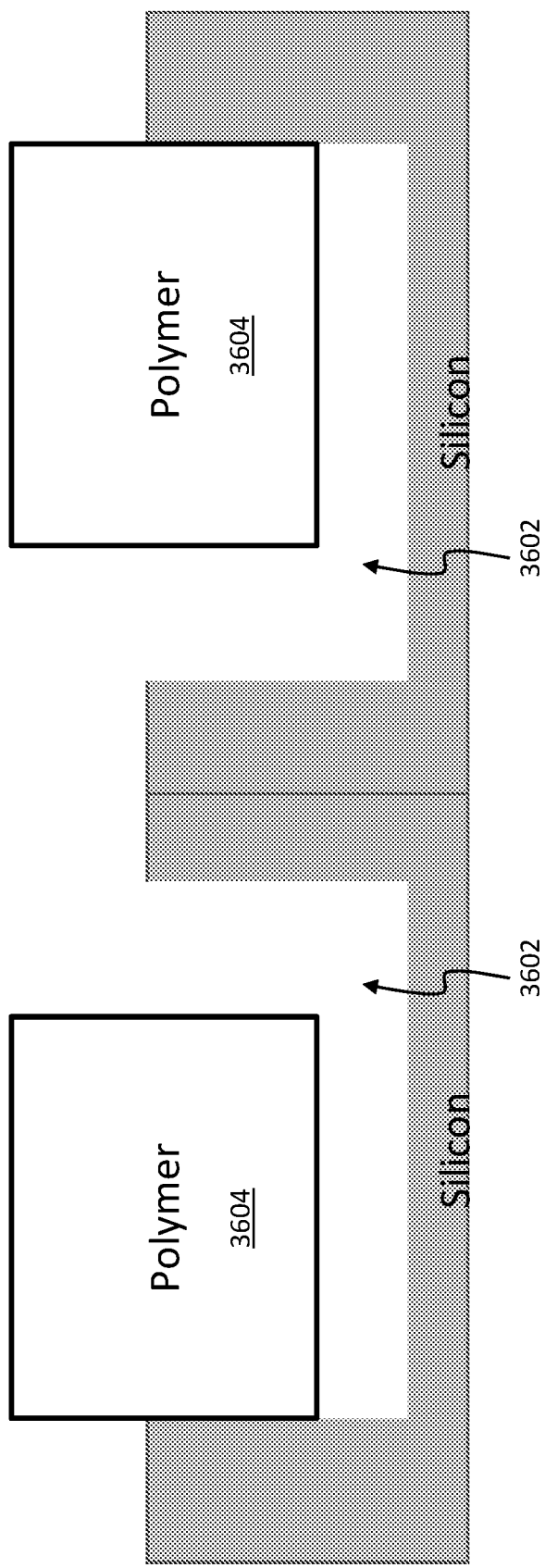
FIG. 36 is a diagram of a cross-sectional view of portions of a receptacle and portions of subcircuits for illustrating a method for elastic averaging.

FIG. 36 illustrates a method for aligning two or more subcircuits by using elastic averaging. As described above, subcircuits and receptacles may have lateral alignment features. For instance, in FIG. 36, the receptacle may have cavities 3602 for receiving lateral alignment features 3604 of subcircuits. For example, the use of a polymer for a lateral alignment feature may be beneficial for elastic averaging. By making the lateral alignment features slightly offset, high lateral alignment accuracy may be achieved. In some embodiments, the subcircuits and receptacles each have multiple (e.g., 10 or less, 20 or less, 30 or less, 50 or less, 100 or less) alignment features, which when offset relative to one another, can create accurate positioning and/or connections by averaging the error inherent to the lateral alignment features.

In some embodiments, the coarse alignment is performed passively while the fine final alignment may be performed actively in one or more degrees of freedom, using either optical feedback or vision feedback using alignment marks. One such implementation is to perform a quick final alignment of one of the lateral axes while the height, tip and tilt are passively constrained. The benefit of this is that alignment stage only needs to be able to move in one of the degrees of freedom and does need to be a hexapod type of device.

Figure 37:
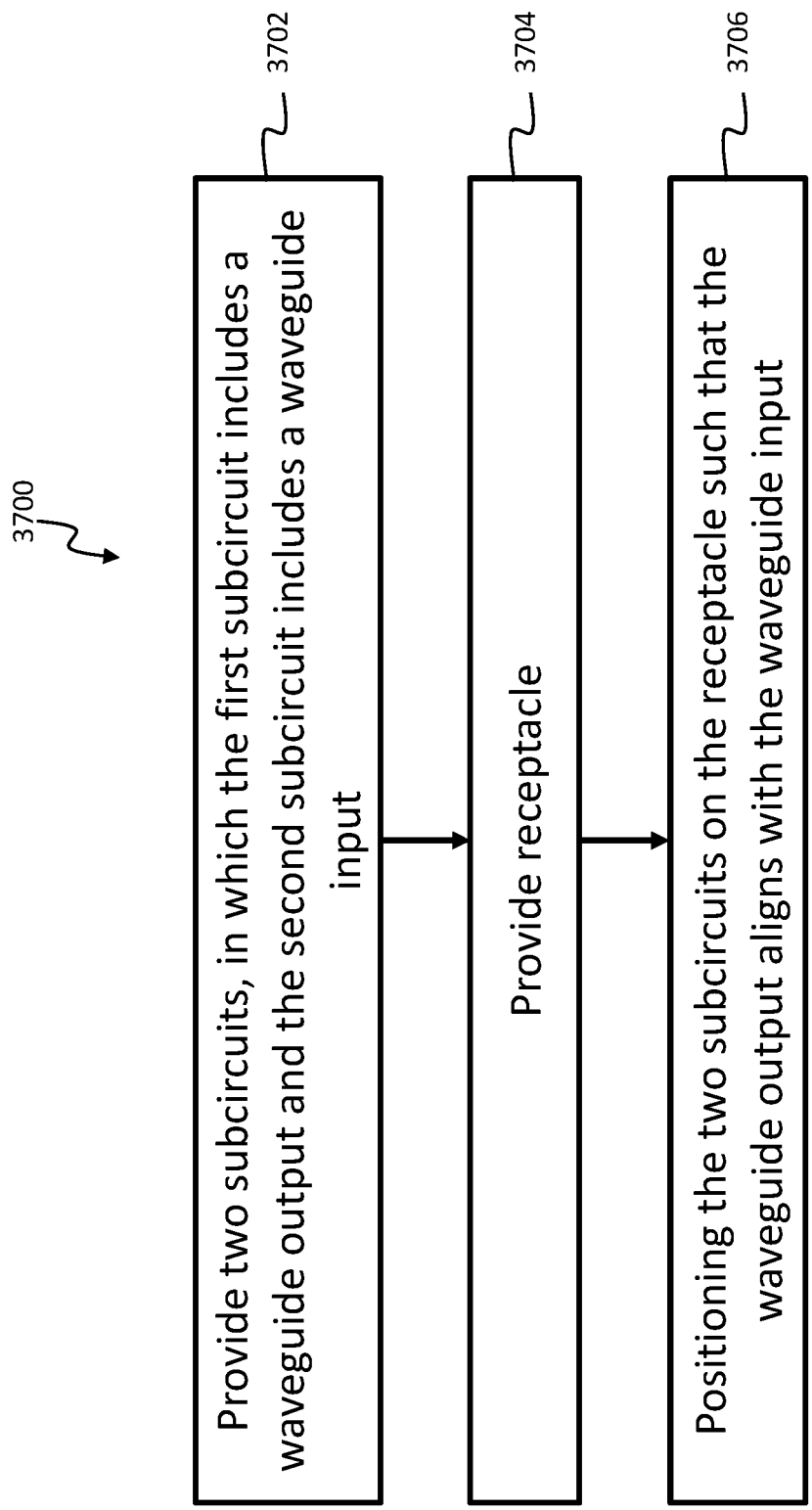
FIG. 37 is a flowchart of a method for aligning two or more subcircuits to a receptacle.

FIG. 37 is a flowchart of an example method 3700 for aligning two or more photonic integrated subcircuits. In step 3702 of method 3700, two or more subcircuits are provided. A first subcircuit may include a waveguide output (e.g., along a first edge) and the second subcircuit can include a waveguide input (e.g., along a second edge). The subcircuit may include at least one subcircuit vertical alignment feature and/or at least one subcircuit lateral alignment feature. In step 3704, at least one receptacle is provided. In some cases, one receptacle is provided for two or more subcircuits. The receptacle may include at least one receptacle vertical alignment feature and/or at least one receptacle lateral alignment feature. The subcircuit vertical alignment feature can be configured to be complementary to the receptacle vertical alignment feature. The subcircuit lateral alignment feature can be configured to be complementary to the receptacle lateral alignment feature. In step 3706, the two subcircuits can be positioned on the receptacle (or the receptacle can be positioned on the two subcircuits) such that the waveguide output of the first subcircuit matches the waveguide input of the second subcircuit. It is understood that the example 3700 method may leverage any embodiment or feature described herein. The subcircuits may be any example embodiment of a subcircuit described herein and/or may include one or more subcircuit features described herein.

Web-Based Tool for Modular Circuitry Design and Simulation

Methods and systems for implementing an application (e.g., a web-based tool, a hosted software tool, etc.) for developing, configuring and testing of an integrated photonics assembly are described herein. The web-based tool described herein enables a user to configure, test and order a unique integrated photonics assembly based on a user-created virtual integrated photonics assembly. In one example, the web-based tool can enable a user to design and purchase a unique user-created circuit, a given pre-designed template circuit, or some combination thereof.

In an example, a physical integrated photonics assembly can be implemented via a virtual environment by deploying one or more virtual photonic integrated subcircuits within the virtual environment. At least two virtual photonic integrated subcircuits can be coupled together to form a virtual integrated photonics assembly within the virtual environment. Subsequently, after the formation of a virtual integrated photonics assembly, performance characteristics of the virtual integrated photonics assembly can be generated within the virtual environment, where the performance characteristic of the virtual integrated photonics assembly can represent a real-world performance characteristic of the physical integrated photonics assembly corresponding to the virtual integrated photonics assembly. Once acceptable performance characteristics of the virtual integrated photonics assembly are determined, a user can submit an order for the physical integrated photonics assembly corresponding to the virtual integrated photonics assembly. Additionally, virtual templates of pre-configured integrated photonics assemblies can be generated, stored and provided to a user for selection and/or use. The virtual templates can include pre-determined combinations of virtual photonic integrated subcircuits and/or integrated photonics assemblies ready for implementation in a user's project or application.

One benefit of the example systems and methods is that a virtual chiplet represented in the virtual environment can correspond to a physical chiplet. For example, each virtual chiplet or set of chiplets may have an identifier (e.g., serial number, batch number, etc.) that correspond to a physical chiplet or set of physical chiplets. In some embodiments, some components (e.g., some types of chiplets) are highly standardized and/or robust; therefore, the transfer function of the virtual component matches that of the physical component. In some embodiments, for the components (e.g., some types of chiplets) that vary from wafer-to-wafer or area on the wafer, the transfer function and/or performance characteristics of the virtual component is expected to match the physical component on a batch basis. In such a case, user interface is configured to provide the performance of the virtual chiplet (and/or the associated virtual assembly) with an error bar indicating a range of performances associated with the batch. For more sensitive components, the transfer function and/or performance characteristics of the virtual component is expected to match the physical component on a component-to-component (e.g., chiplet-to-chiplet) basis.

Overall, this can impart the benefit of the user being able to specify and/or select, in the virtual environment, the performance of the exact physical chiplet to be used for the physical assembly. The physical chiplet can have certain characteristics that are the result of the real-world fabrication process, including a certain optical transmission, coupling efficiency to other chiplets, size, weight, cost, etc. By interacting with one or more of these characteristics in the virtual environment, the user of the virtual environment can attain exactly or near exactly the circuit the user wishes to implement in real life. Further, as described above, the physical characteristics of the chiplets can be leveraged so as to increase the yield of the chiplets and/or assemblies.

Furthermore, the web-based tool can be implemented using a server-based computer program and/or software tools via a web browser installed on a user device. In an example, the web-based tool can access a server-based computer program and software tools using a web browser installed on a user device. The server-based computer program and software tools can be configured to generate a file of the virtual integrated photonics assembly. The file of the virtual integrated photonics assembly can be saved for future use, transferred to another computer or a storage medium, edited via the virtual environment, and/or shared via electronic communication (e.g., over a computer network through a wired or a wireless electronic file transfer). One benefit of this system is that the server-based computer program and software tools may be implemented to generate a file which is an editable, e.g., "soft" version of a circuit design. In a further example, the "soft" implementation of circuits containing virtual photonic integrated subcircuits, e.g., also referred to as modular chiplets or virtual chiplets, may decrease cost and increase production efficiency of physical circuits. As used herein, virtual photonic integrated subcircuits can also be referred to as a subcircuit, chiplet, modular chiplet, virtual chaplet, virtual modular chiplet, among other terms. The underlying programming code used for the web-based tool can include, but is not limited to, e.g. JavaScript, Python, C, C++, among other programming languages.

The implementation of the integrated photonics assembly in a virtual environment can speed up the development of integrated photonics assembly by reducing the time for prototyping and/or decreasing the cost for development. In an example, a user can implement a plurality of integrated photonics assemblies within the virtual environment and compare performance characteristics between each corresponding virtual integrated photonics assembly without having to order and/or interact with a physical integrated photonics assembly. Thus, the user can reduce overhead costs associated with purchasing a physical integrated photonics assembly purely for prototyping and development, and can instead save time and resources by ordering the physical integrated photonics assembly based on the performance characteristics of a virtual integrated photonics assembly. Therefore, the implementation of the integrated photonics assembly in a virtual environment can increase the production efficiency of the physical integrated photonics assemblies by replacing and/or supplementing the development and testing of physical integrated photonics assemblies with the development and testing of virtual integrated photonics assemblies in a virtual environment.

The web-based tool can include a user interface module for deploying one or more virtual photonic integrated subcircuits within the virtual environment. The virtual environment can be configured to enable coupling of at least two virtual photonic integrated subcircuits, where the coupling of the virtual photonic integrated subcircuits can form a virtual integrated photonics assembly. In some embodiments, the user interface module can provide a user with a graphical depiction of the virtual environment, e.g., a graphical depiction of the virtual integrated photonics assembly and/or the virtual photonic integrated subcircuits that make up the virtual integrated photonics assembly within the virtual environment. In some embodiments, the user interface module can include the example user interfaces shown in FIGS. 38-40 and described in further detail below.

Deploying one or more virtual photonic integrated subcircuits can dynamically alter the virtual environment. For example, one aspect of the web-tool can include a user interface that enables a user to insert various circuit chiplets into an overall assembly project. Such a user interface is described in further detail in FIG. 38 below. In the same example, the user interface can present a graphical depiction of the circuit and the chiplets that make up the circuit. In some embodiments, the virtual environment can be dynamically altered by the deployment and/or insertion of virtual photonic integrated subcircuits or the re-arrangement of virtual photonic integrated subcircuits, where the position and/or orientation of the virtual integrated photonics assembly reflects the position and/or type of deployed virtual photonic integrated subcircuits. In some embodiments, a graphical depiction can be dynamically altered by the insertion and/or re-arrangement of new virtual photonic integrated subcircuits into the virtual environment, changing the appearance of the virtual integrated photonics assembly based on the position and type of the inserted and/or re-arranged virtual photonic integrated subcircuits. In an example, the graphical depiction is dynamically altered by the insertion of new chiplets or re-arrangement of chiplets. The appearance of the circuit can reflect the position and type of one or more inserted circuit chiplets. In some embodiments, the underlying programming code can be dynamically updated to reflect the virtual integrated photonics assembly that is graphically depicted within the virtual environment by the user interface module and as created by the user. In an example, the underlying programming code, e.g., JavaScript and Python, is dynamically updated to reflect the circuit that is graphically depicted and as created by the user.

Figure 38:
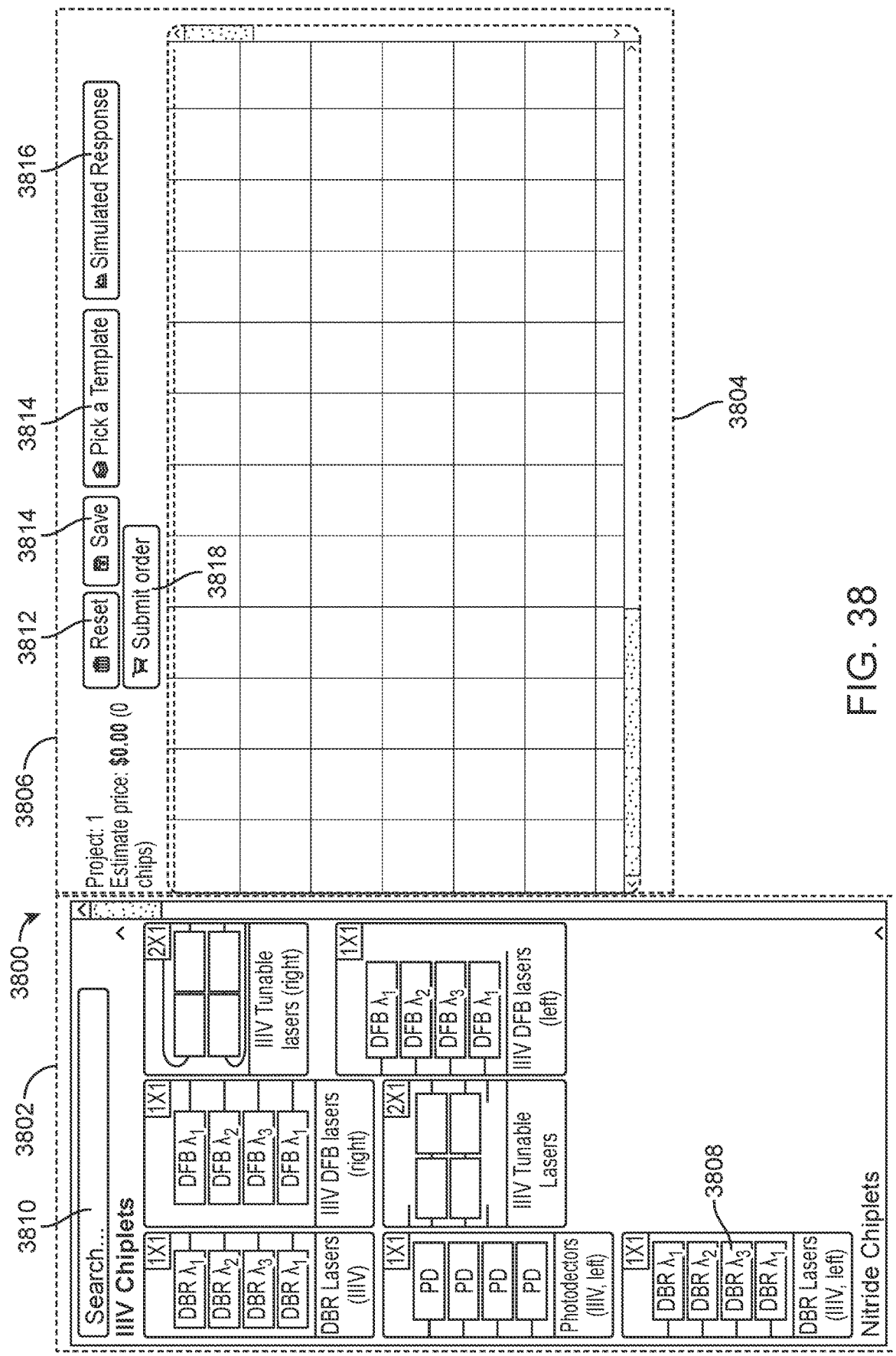
FIG. 38 is a graphical representation of an example user interface configured to enable a user to implement an integrated photonics assembly in a virtual environment.

Referring to FIG. 38, a user interface configured to enable a user to implement an integrated photonics assembly in a virtual environment is presented, according to some embodiments. In some embodiments, the graphical user interface 3800 can include a selection panel 3802, a workspace 3804 and a control bar 3806. As used herein, the control bar 3806 is also be referred to as a control panel. The user can add any combination of pre-configured virtual photonic integrated subcircuits to the workspace 3806 from the selection panel 3802. As used herein, the workspace 3804 is also be referred to as a design canvas. In some examples, the user can deploy one or more virtual photonic integrated subcircuits 3808 from the selection panel 3802 onto the workspace 3804. When deploying one or more virtual photonic integrated subcircuits 3808, the user can place one virtual photonic integrated subcircuit adjacent to another virtual photonic integrated subcircuit such that at least one coupling mechanism (e.g., port, light path, etc.) of the virtual photonic integrated subcircuits are aligned.

In one particular example, the user may add any number and/or combination of pre-defined virtual photonic integrated subcircuits, e.g., chiplets, 3808 to the workspace 3804. In the same example, the user may drag-and-drop one or more chiplets 3808 from the selection panel 3802 onto the workspace 3804. In a further example, this exemplary implementation can allow a user to visualize an entire integrated photonics assembly implemented within a virtual environment as it is created. In the event or instance that one or more virtual photonic integrated subcircuits 3806 are placed incorrectly or misaligned, e.g., so as to form a malfunctioning integrated photonics assembly, the web-based tool can provide a notification to the user. In one example, the notification can include an alarm, a warning display, and/or a pop-up notification, among other notification implementations.

In some examples, graphical feedback is given to the user to highlight proper circuit construction based on the library of modular circuitry chiplets (e.g., virtual photonic integrated subcircuits). Furthermore, the web-based tool can enable a user to manipulate and/or change the orientation of the virtual photonic integrated subcircuits 3808. The example workspace 3804 may include a grid to aid the user in positioning and/or aligning the chiplets relative to one another. Note that some chiplets 3808 may be represented by a shape and/or size corresponding to the grid unit size. In particular example, the chiplets 3808 may be selected and/or deployed onto the workspace 3804 and subsequently rotated and/or deleted. The web-based tool also enables a user to refresh or restart a user interface 3800 and/or just the workspace 3804 as required by the user.

In a particular example, the workspace 3804 (e.g., design canvas) may be reset to a blank workspace 3804. Additionally, the user can search for a specific virtual photonic integrated subcircuit 3808 using a search bar which is part of the selection panel 3802, as shown. In some embodiments, the control bar 3806 can be configured to enable a user to reset 3812 the virtual environment, save 3814 the virtual integrated photonics assembly in the memory, select a virtual template 3814, simulate 3816 a performance characteristic, and/or submit an order 3818 for the physical integrated photonics assembly. In an example, the control bar 3806 can include a button for saving 3814 the virtual integrated photonics assembly in the memory, picking a virtual template 3814, simulating 3816 a performance characteristic, and/or submitting an order 3818 for the physical integrated photonics assembly In some embodiments, the web-based tool described herein can include an ever-increasing library of more than 60 different virtual photonic integrated subcircuits that may be combined in numerous ways. In some examples, the virtual photonic integrated subcircuit categories can include but are not limited to a III-V semiconductor subcircuit, a nitride-based semiconductor subcircuit, a graphene subcircuit, a hybrid subcircuit, a subcircuit with heterogeneous or hybrid integration of other materials such as III-V materials, a lithium niobite subcircuit, an optical fibers subcircuit, an active subcircuit, a garnet subcircuit, a silicon photonic subcircuit, glass based subcircuit, a subcircuit that are fabricated using electron beam ("ebeam") technology, an optimized subcircuit for fiber-to-chip coupling, a MEMS-photonic subcircuit, subcircuit with phase change material, a passive subcircuit, among other subcircuits and discussed in further detail below. In an example, the library of virtual photonic integrated subcircuits may be searchable by name and divided into various categories. In further example, a user can search for a virtual photonic integrated subcircuit using the search bar 3810 of the selection panel 3802 in FIG. 38.

FIG. 39 illustrates an example menu of the user interface 3800 of showing a plurality of virtual templates received from a template library module, according to some embodiments. In some embodiments, the web-based tool can include a template library module having a plurality of virtual templates 3902, in which each virtual template includes at least two virtual photonic integrated subcircuits coupled together to form a pre-configured virtual integrated photonics assembly 3904. In one example, FIG. 39 can refer to a library of pre-designed circuit templates which are provided to aid a user's efficient use of the virtual environment. In some embodiments, selected virtual templates 3902 may be added by the user to the workspace of the user interface 3800. The virtual templates 3902 can include, but are not limited to, a virtual photonics laser assembly, a virtual modulator photonics assembly, a virtual switch photonics assembly, a virtual transceiver photonics assembly, a virtual polarization photonics assembly, among other templates. As shown in FIG. 39, the user interface can display virtual templates received from the template library including a polarization-multiplexed quadrature phase-shift keying (PM-QPSK) transceiver 3906, a polarization diversity in-phase and quadrature (IQ) detector 3908, a polarization rotator 3910 and an IQ modulator 3912. One or more of these virtual templates 3902 may be combined with one or more other virtual templates or an individual virtual photonic integrated subcircuits.

Figure 40:
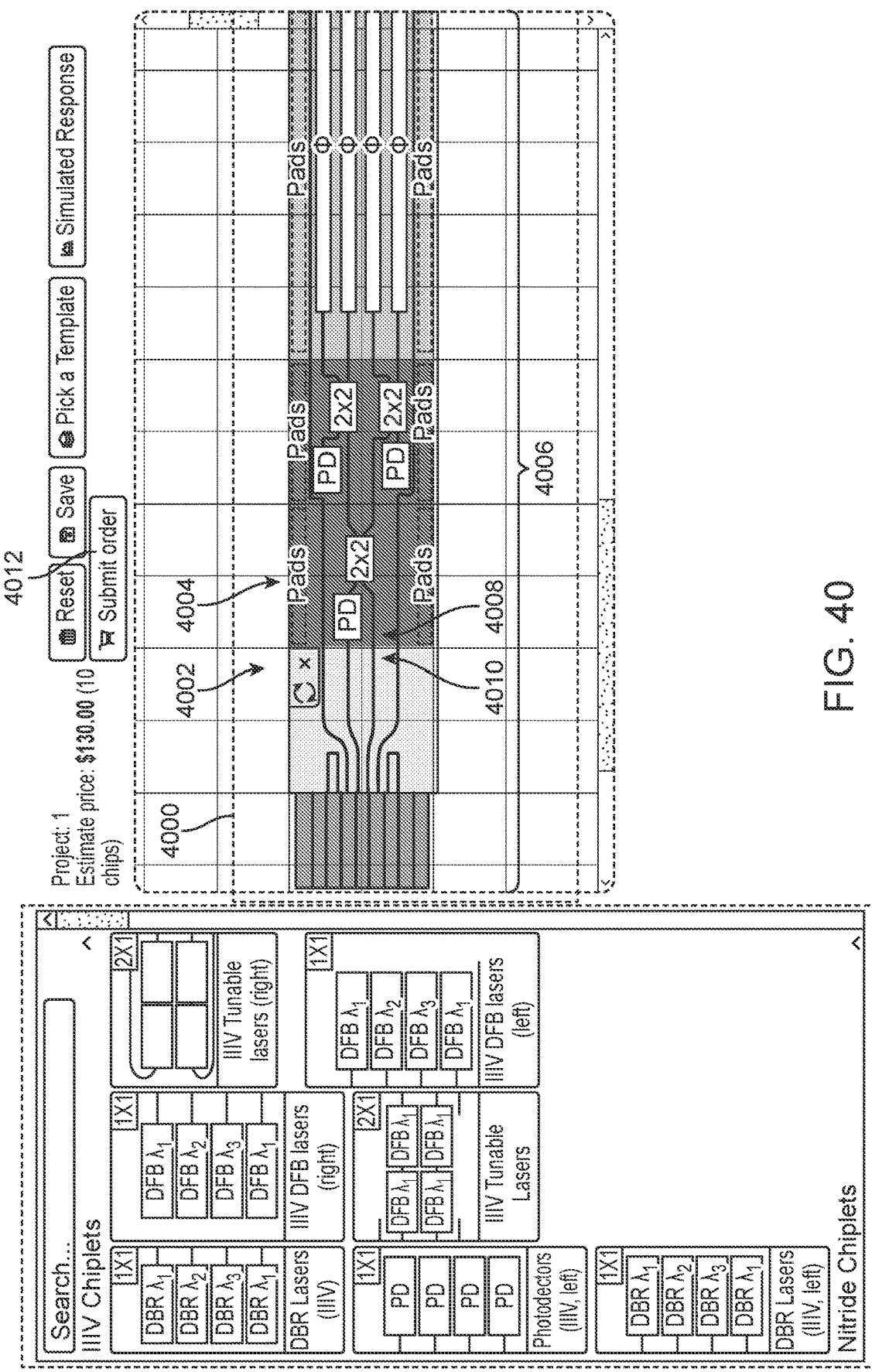
FIG. 40 is a graphical representation of an exemplary user-designed virtual integrated photonics assembly.

FIG. 40 illustrates an exemplary user-implemented virtual integrated photonics assembly, according to some embodiments. In an embodiment, the exemplary user-implemented virtual integrated photonics assembly 4000 is a non-blocking switch. In some embodiments, different virtual photonic integrated subcircuits 4002, 4004 from different virtual photonic integrated subcircuit categories within the library module may be combined into a single virtual integrated photonics assembly 4006. In an example, one virtual photonic integrated subcircuits 4002, 4004 can be placed adjacent to one another such that at least one input port 4008 and output port 4010 of the virtual photonic integrated subcircuits 4002, 4004 are aligned. The implemented virtual integrated photonics assembly 4004 may be tested (e.g., by a testing service that receives data from the system having the user interface). Provided the testing of the virtual integrated photonics assembly 4004 are satisfactory and/or meet the criteria of the user, a physical integrated photonics assembly based on the virtual integrated photonics assembly 4006 can be purchased, and/or ordered using the "submit order" button 4012 on the user interface. Subsequently, the physical integrated photonics assembly can be manufactured, packaged, implemented, combined and/or delivered to the user. In one such example, different chiplets from different chiplet categories can be combined into a single circuit that may be tested, purchased, and manufactured based on this "soft" graphical design.

Figure 41:
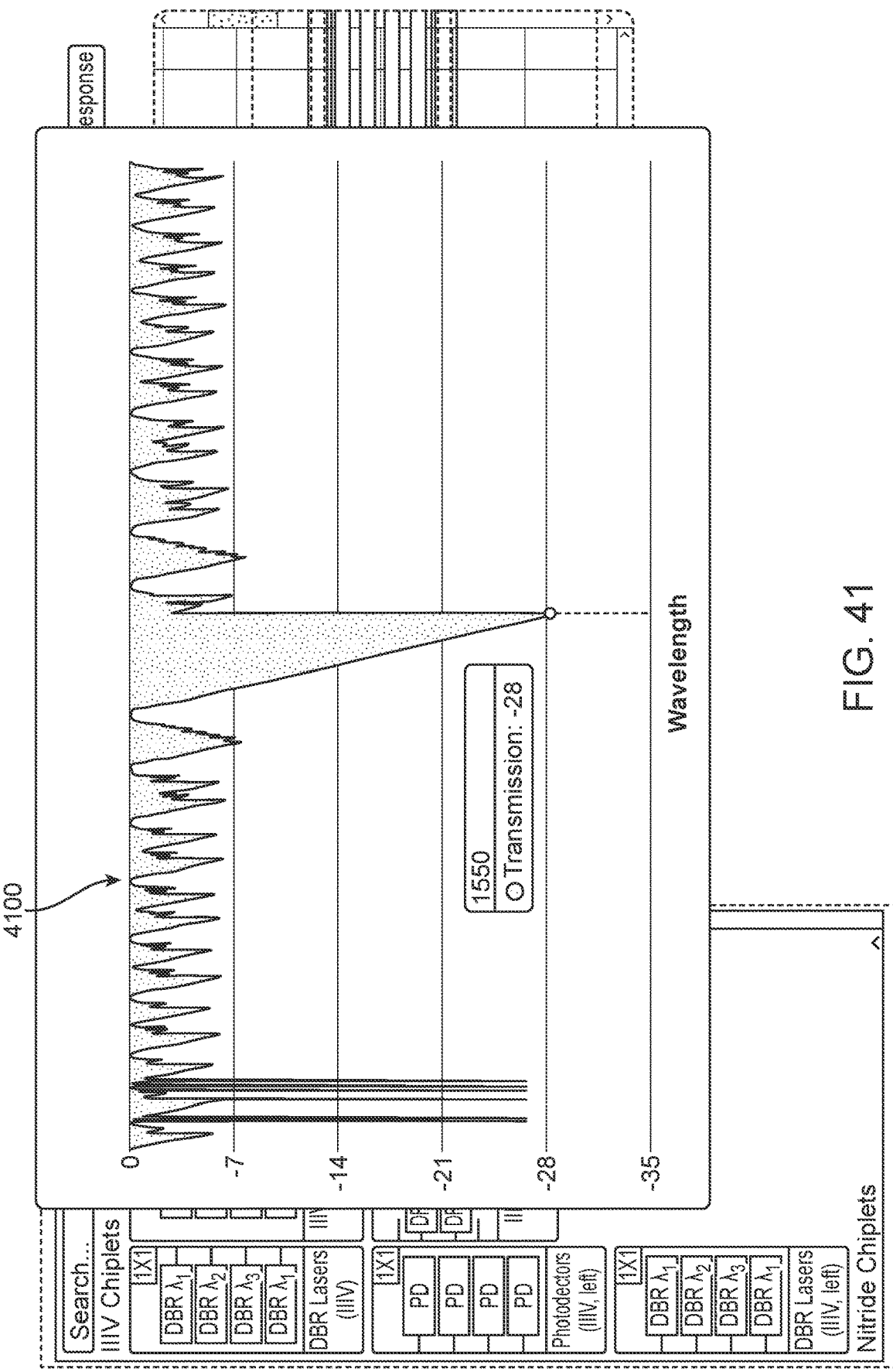
FIG. 41 is a graphical representation of an example plot of the performance characteristic of a virtual integrated photonics assembly.

FIG. 41 illustrates a performance characteristic of a virtual integrated photonics assembly, according to some embodiments. The example web-based tool can include a simulation module configured to generate a performance characteristic 4100 of the virtual integrated photonics assembly. In an example, the web-based tool can enable the user to generate performance characteristic 4100 of one or more virtual integrated photonics assemblies. In some embodiments, the web-based tool can include a built-in simulation implementation that may enable the user to readily determine one or more performance characteristics of any combination of virtual integrated photonics chiplets. Thus, in a particular example, the user may estimate overall circuit performance characteristic(s) 4100 (e.g., optical transmission as a function of wavelength as shown) without having to understand the performance characteristic of each individual virtual photonic integrated subcircuit or of the physical photonic integrated subcircuit which the virtual photonic integrated subcircuit represents. In an example, performance characteristics can include, but are not limited to, an optical transmission as a function of wavelength, a transmission and reflection as a function of wavelength between different input and output optical waveguides (e.g., two or more waveguides), transmission and reflection as a function of wavelength and polarization, an S-matrix and/or a scattering matrix e.g., a transfer matrix similar to the above), an optical scattering matrix (e.g., as a function of different electrical signals applied to the chip), an optical scattering matrix including non-linear effects (e.g., different scattering matrix coefficients dependent on the intensity of the light), a scattering matrix as a function of packaging alignment tolerances, an optical input to electrical output (e.g., in case of a photodetector), an electrical input to optical output (e.g, in case of a laser), and/or a scattering matrix including, in one example, insertion loss, phase information, wavelength and/or polarization information.

Performance characteristics of a single virtual photonic integrated subcircuit, virtual integrated photonics assembly and virtual templates may be pre-calculated to conserve computing resources and yield quick results (e.g., for the benefit of the user of the system). In some examples, the simulated response of the circuit may be performed in the background and updated as the user modifies the circuit implementation within the user interface. The transfer matrix of virtual photonic integrated subcircuits can be determined by theory, simulation, measurement or a combination thereof. In a further example, physical photonic integrated subcircuits can be tested and the results included in each of the virtual photonic integrated subcircuits for a user to review. The user can subsequently browse through the different measurement results (e.g., performance characteristics) of each virtual photonic integrated subcircuit. This can enable 'cherry-picking' of the characterized virtual photonic integrated subcircuits by a user, e.g., picking a virtual photonic integrated subcircuits with a specific frequency response that varies between identical virtual photonic integrated subcircuits. Additionally, this enables a user to select a virtual photonic integrated subcircuits that has not yet been fabricated, e.g., but can be quickly fabricated using, in one example, electron-beam lithography.

Figure 42:
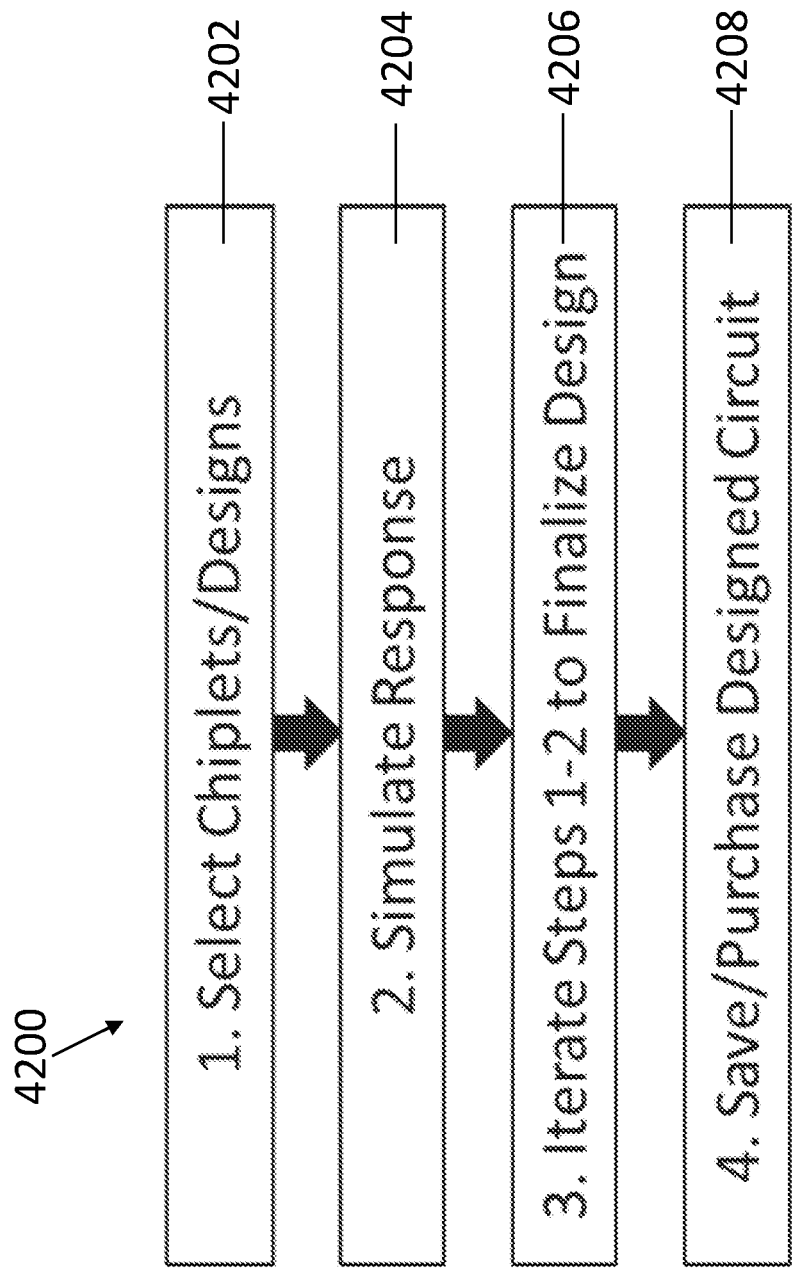
FIG. 42 is a flowchart of an exemplary method for implementing an integrated photonics assembly within a virtual environment.

FIG. 42 represents an exemplary method for a user to implement an integrated photonics assembly within a virtual environment, according to some embodiments. At a first step 4202 of the flowchart 4200, the user can selects one or more virtual photonic integrated subcircuits or a virtual template and can then place the subcircuits in the workspace. In a second step 4204, the user may simulate the response of the generated virtual integrated photonics assembly. Based on the results of the simulation, in a second optional step 4206, the user may iterate virtual integrated photonics assembly implementations until satisfied with the resulting virtual integrated photonics assembly. Subsequently, at step 4208, the user may save the virtual integrated photonics assembly and/or purchase a physical integrated photonics assembly corresponding to the virtual integrated photonics assembly using the web-based tool's user interface. In an example, the user can use the control bar to save their work or make the purchase.

Modular Silicon Photonics Circuitry Implementations

This disclosure features example systems and methods for generating an integrated photonics assembly using two or more separate modular photonic integrated subcircuits which can be implemented in a virtual environment. In an example, light can be transferred between modular photonic integrated subcircuits to extend and/or combine other modular photonic integrated subcircuits into a larger integrated photonic assembly. Additionally, in one example, not only can light be transferred between modular photonic integrated subcircuits but also electrical signals, microwave signals, fluids, etc. In some embodiments, the modular photonic integrated subcircuits are not limited to one particular type of integrated photonics assembly. Because the main characteristic of an integrated photonics assembly is the capability to guide light, many types of integrated photonics assemblies can be achieved. For example, assemblies can include a CMOS compatible chiplet or in silicon photonics assembly, silicon-on-silica photonics assembly, silicon nitride photonics assembly, aluminum oxide photonics assembly, glass photonics assembly, III/V based integrated photonics assembly, etc. Therefore, the integrated photonics assemblies can also be a combination of two or more modular photonic integrated subcircuits or even two or more integrated photonics assemblies.

Integration of photonic assemblies from different technologies may permit new functionalities and/or superior performance. When an integrated photonic assembly is comprised of many modular photonic integrated subcircuits, it may become very beneficial to standardize the configuration of the modular photonic integrated subcircuits. For example, the light transfer locations, coupling mechanisms, ports, electrical connections, connection methods, etc. can be defined and/or standardized. Also, the modular photonic integrated subcircuits dimension and/or size can be standardized. The standardization can provide the benefit that any of the modular photonic integrated subcircuits can be switched and/or interchanged with other modular photonic integrated subcircuits, thereby creating a different integrated photonics assemblies which can be a variation from the originating modular photonic integrated subcircuits and/or integrated photonics assembly.

Each modular (e.g., physical) photonic integrated subcircuit can be represented by a virtual (e.g., software representation) photonic integrated subcircuit, as described above. Furthermore, as described above, a physical integrated photonics assembly can be implemented via a virtual environment by deploying one or more of the virtual photonic integrated subcircuits within the virtual environment. At least two virtual photonic integrated subcircuits can be coupled together to form a virtual integrated photonics assembly within the virtual environment. Different combinations and/or configurations of the virtual photonic integrated subcircuits and/or the virtual integrated photonics assemblies, which correspond directly to at least one physical photonic integrated subcircuits and/or at least one physical integrated photonics assemblies respectively, are described herein. It is understood that the description of the virtual photonic integrated subcircuits can apply directly to at least one modular (e.g., physical) photonic integrated subcircuit and the description of the virtual integrated photonics assembly can apply to at least one physical integrated photonics assembly. For ease of discussion, presented herein are multiple examples and configurations of virtual photonic integrated subcircuits, virtual integrated photonics assemblies, and virtual templates, the descriptions of which apply to at least one corresponding physical photonic integrated subcircuits, at least one physical integrated photonics assembly, and at least one physical template, respectively. Therefore, the descriptions of a virtual photonic integrated subcircuit, virtual integrated photonics assembly, and/or virtual template also apply to the modular photonic integrated subcircuit, an integrated photonics assembly, and/or template.

FIGS. 43A-43D and FIGS. 44A-44D illustrate exemplary libraries of virtual photonic integrated subcircuits. One or more of these libraries may be displayed on a menu of the user interface, in whole or in part, according to some embodiments. Each virtual photonic integrated subcircuits described can correspond to at least one photonic integrated subcircuit that is modular, pre-fabricated, and/or wafer-scale tested. A subcircuit-to-subcircuit coupling mechanism and/or alignment method may be utilized to assemble virtual integrated photonics assemblies and/or virtual templates. In one example, a low-loss chiplet-to-chiplet coupling and/or alignment method may be utilized to assemble circuit templates.

Figure 43A:
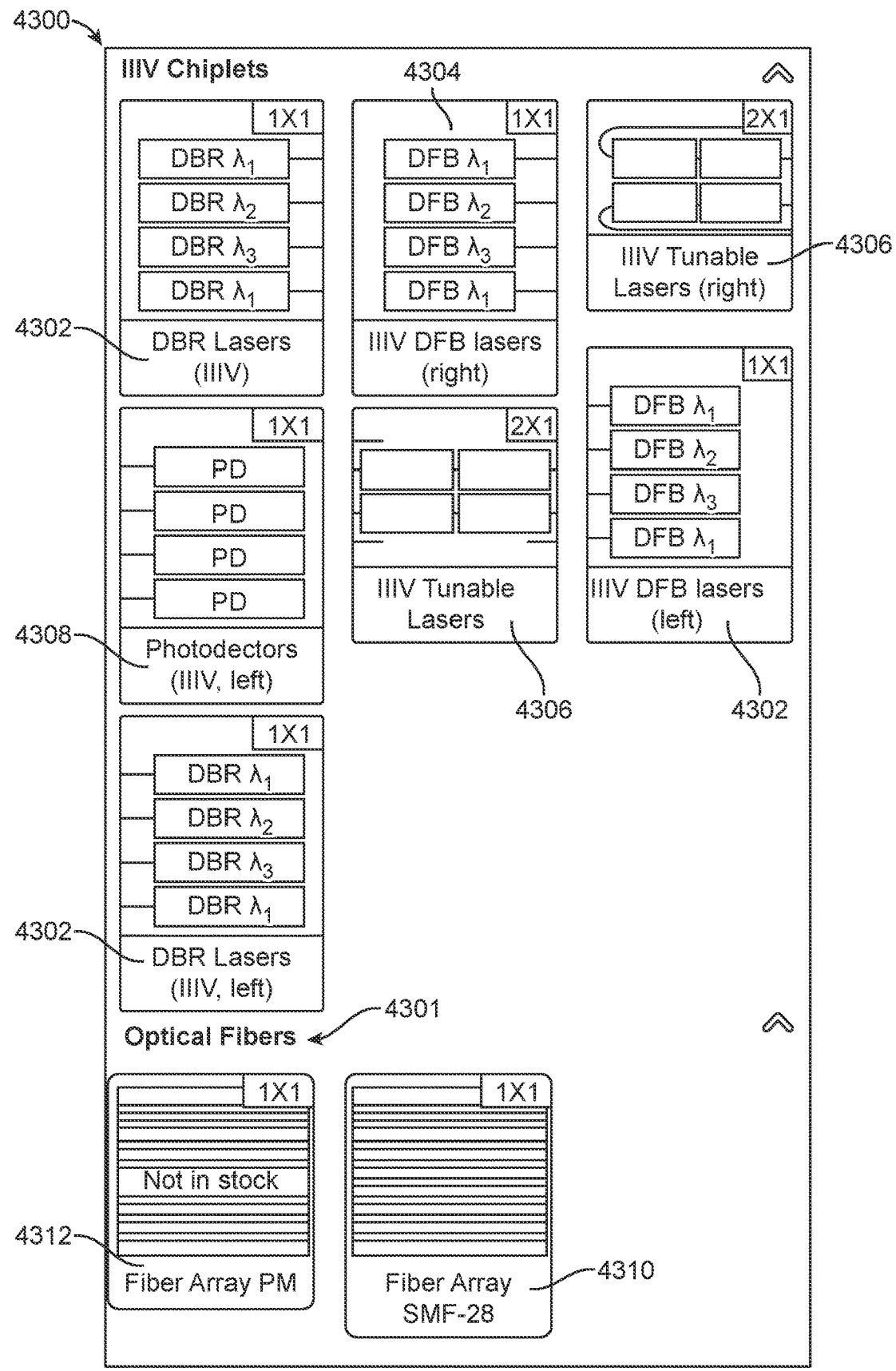
FIGS. 43A-43D are graphical representations of various example virtual photonic integrated subcircuits as displayed on a menu of the user interface.
Figure 43B:
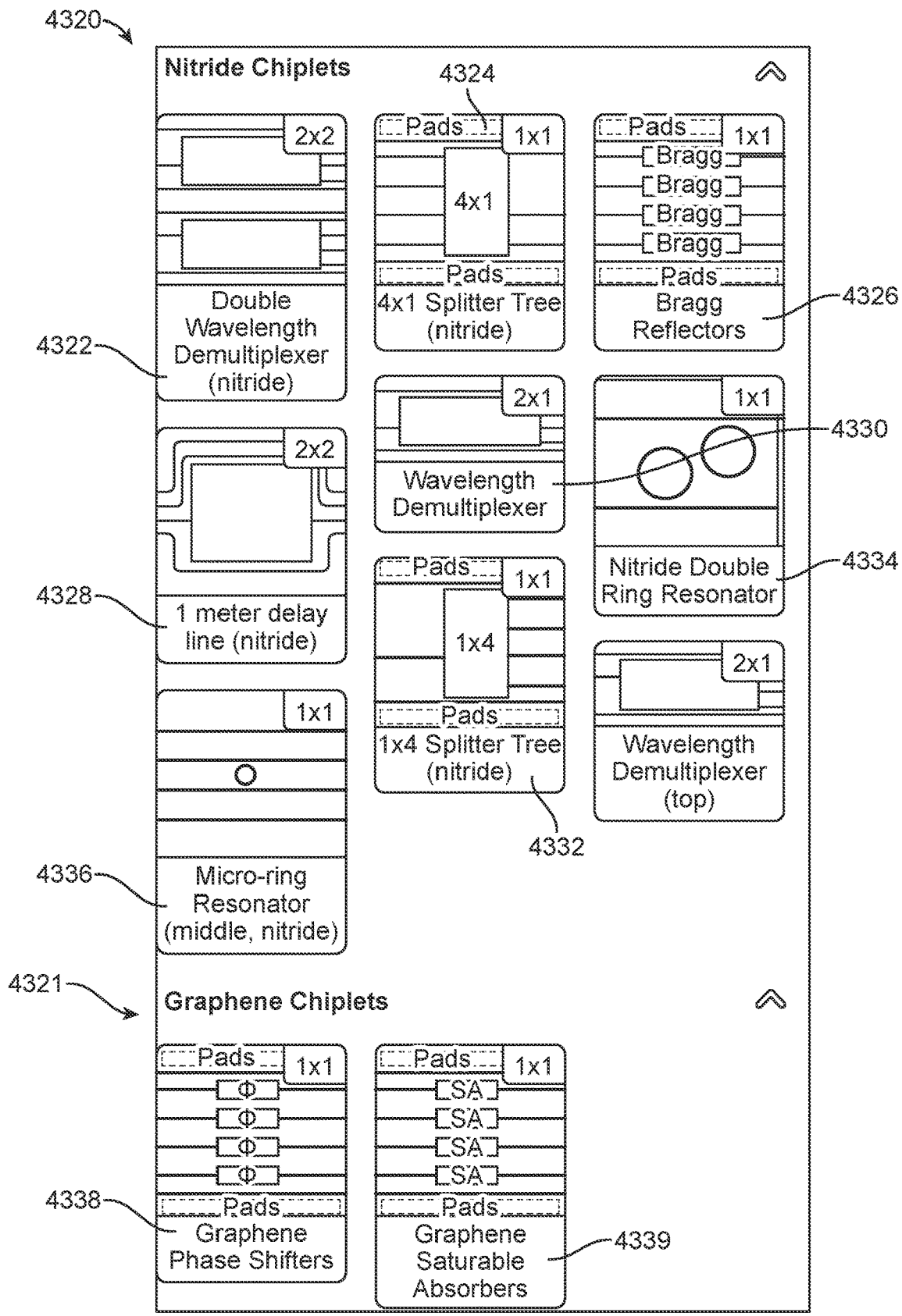
Figure 43C:
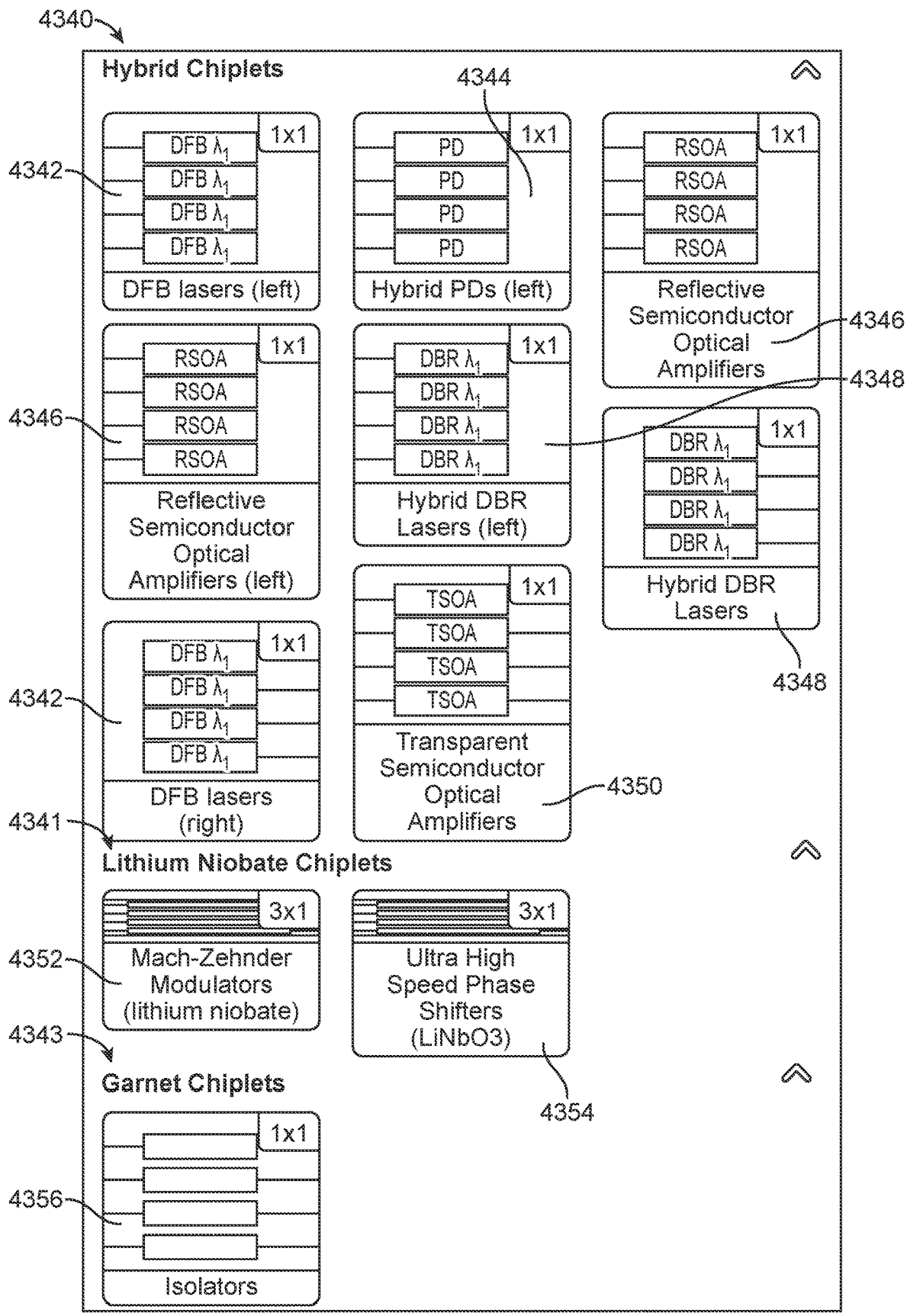
Figure 43D:
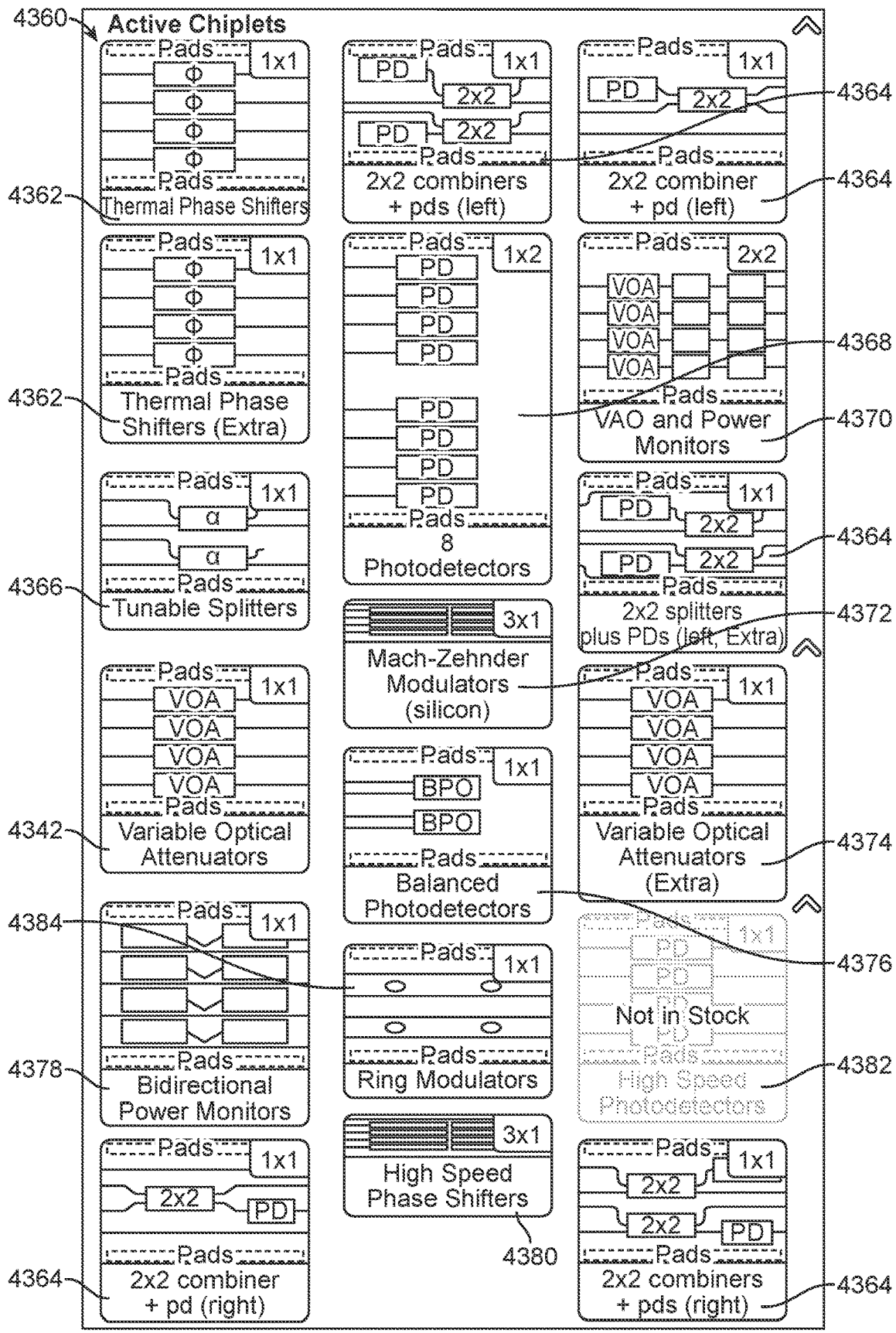
Figure 44A:
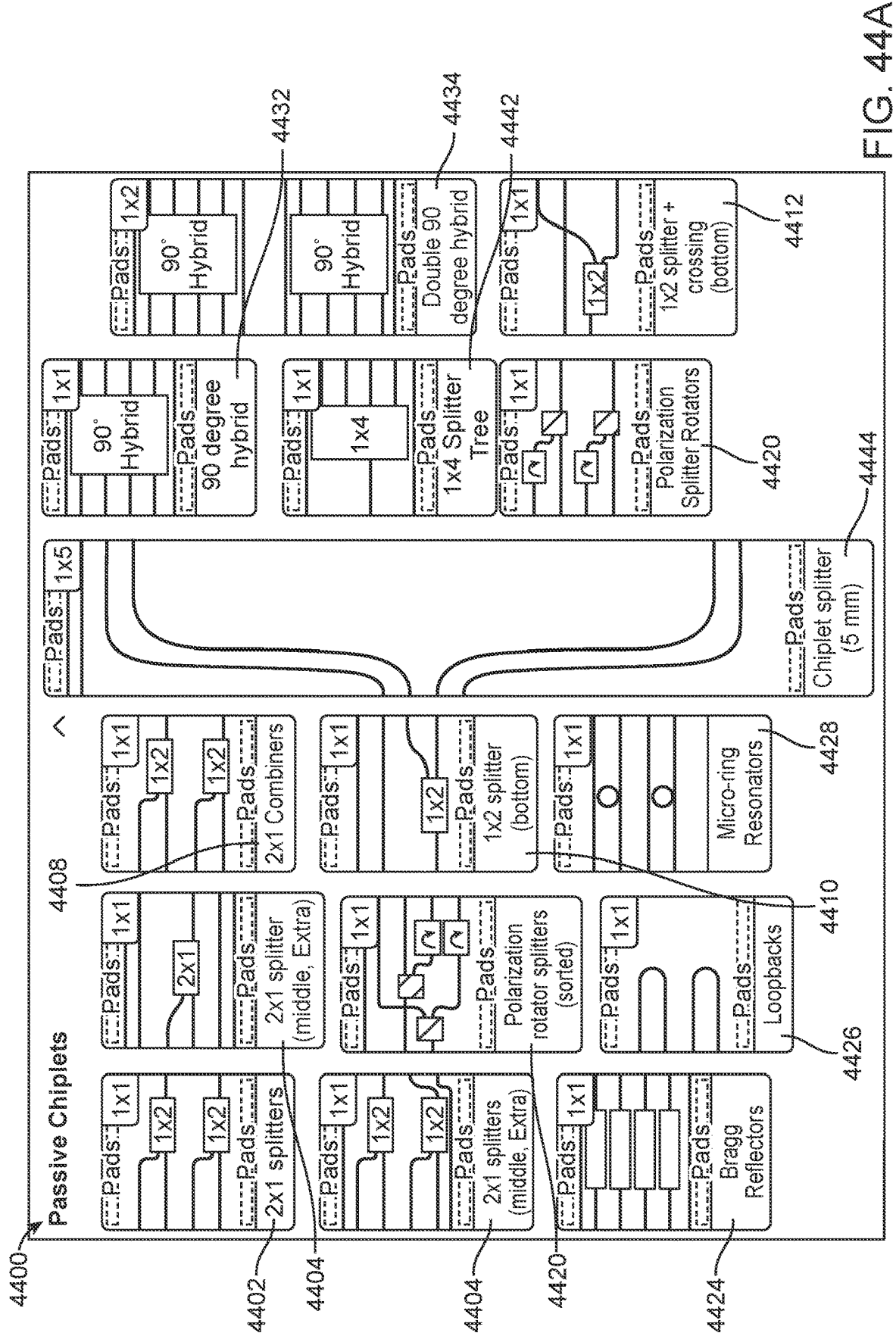
FIG. 44A-44D are graphical representations of various example virtual photonic integrated subcircuits as displayed on a menu of the user interface.
Figure 44B:
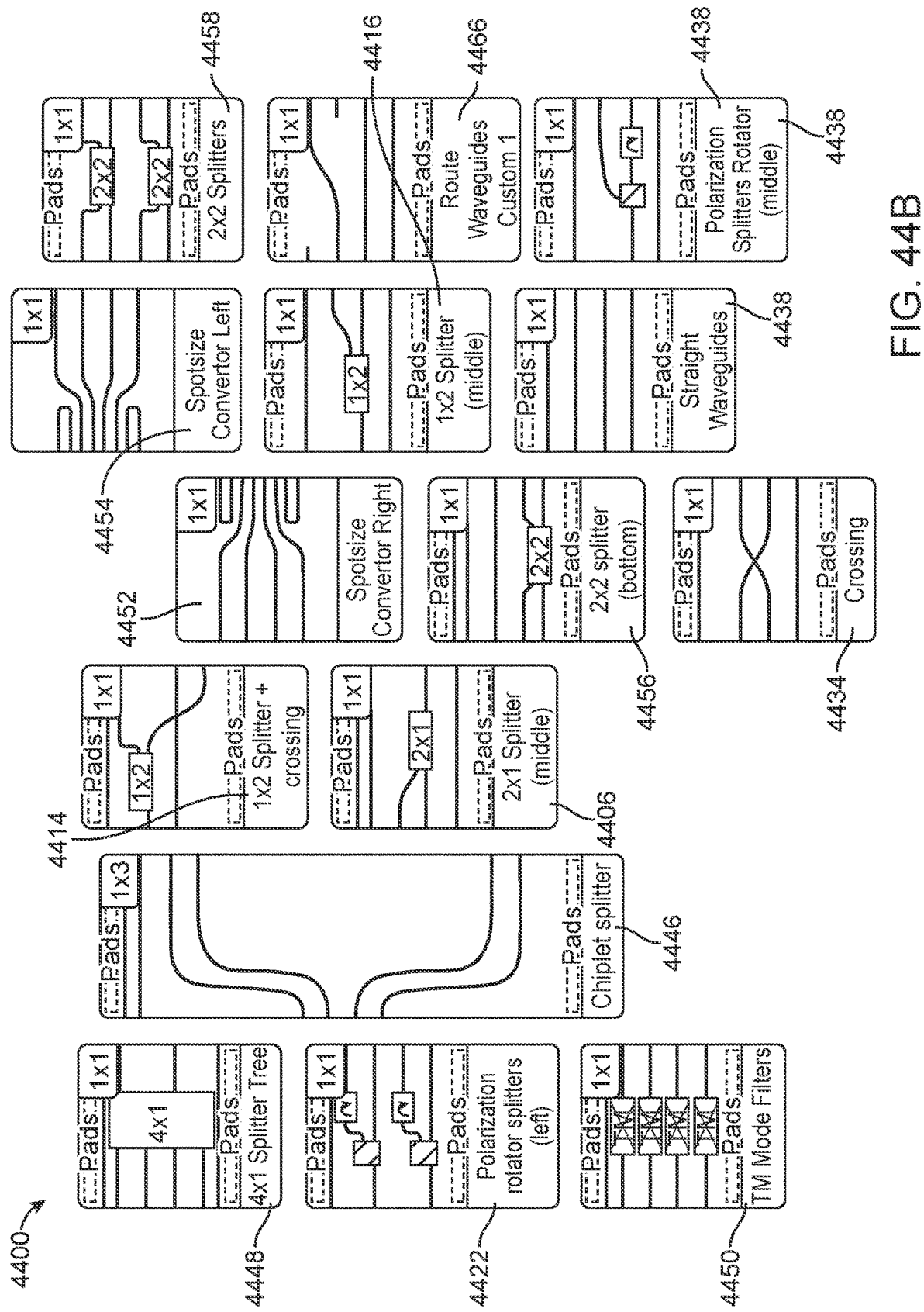
Figure 44C:
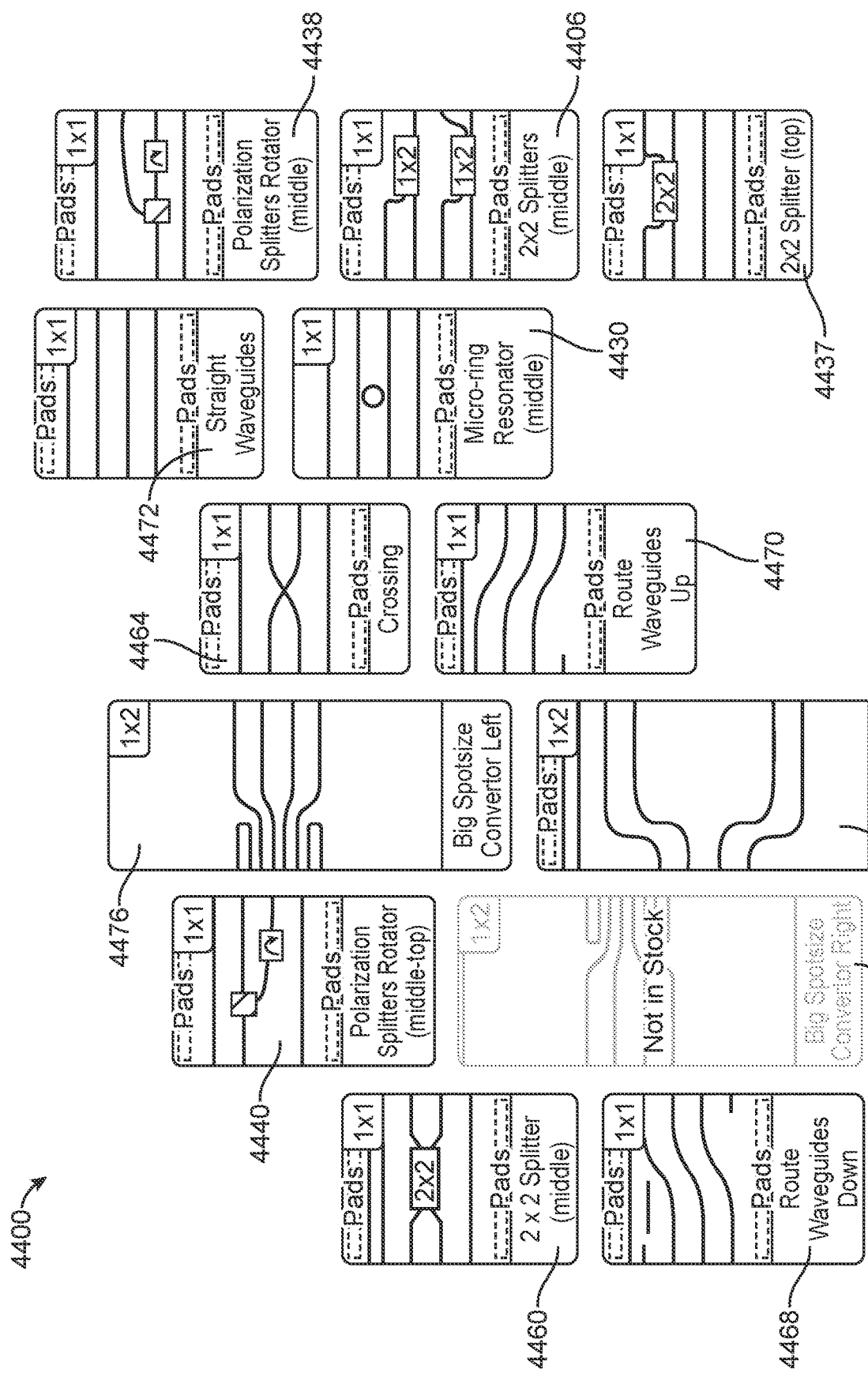
Figure 44D:
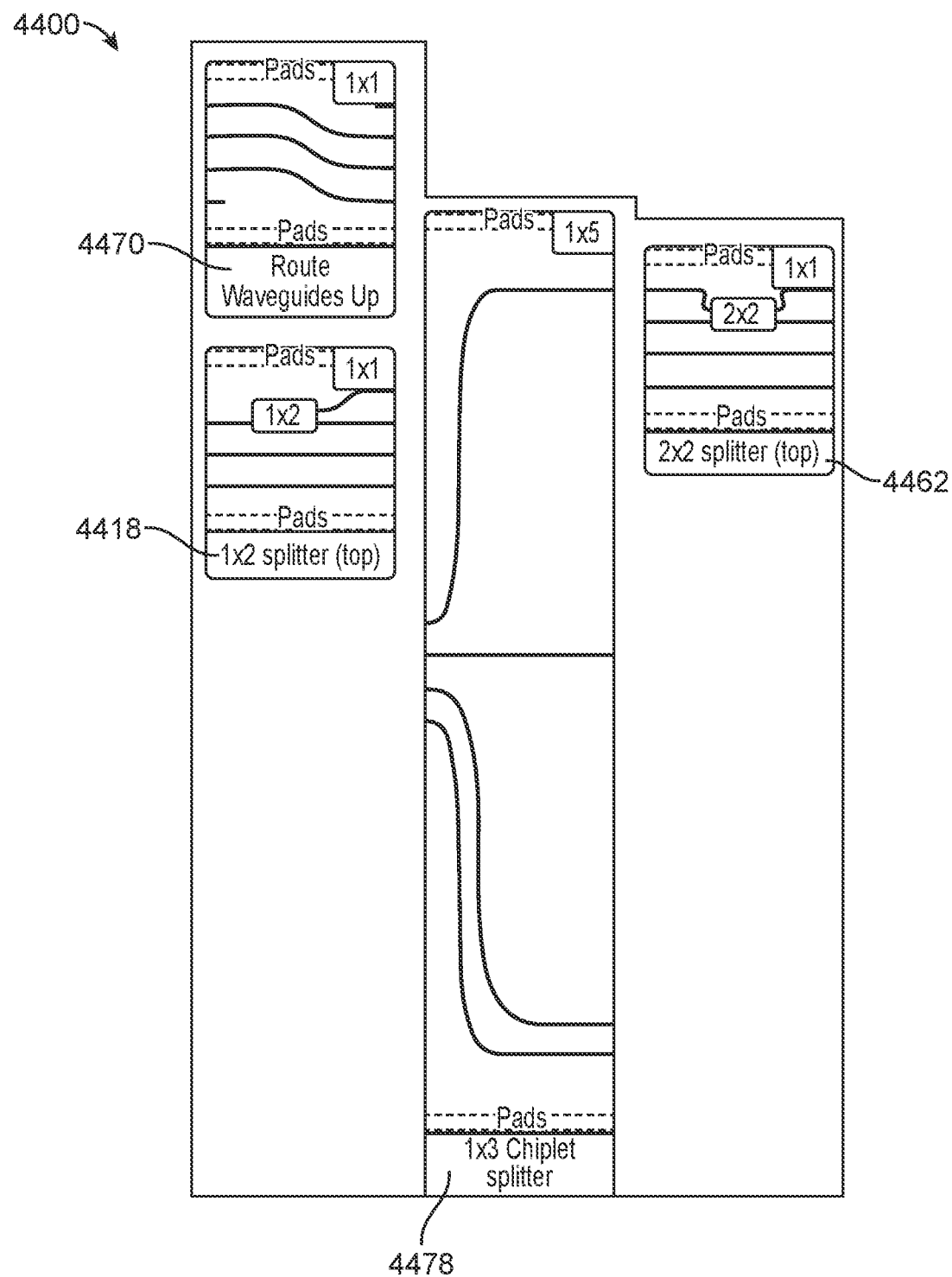

Referring to FIGS. 43A-43D, various virtual photonic integrated subcircuits as displayed on a menu of the user interface are presented, according to some embodiments. FIG. 43A shows III-V semiconductor photonic subcircuits 4300 and optical fiber array 4301. In an example, the III-V semiconductor photonic subcircuits 4300 can include distributed Bragg reflector (DBR) laser photonic subcircuits 4302, III-V distributed feedback (DFB) laser subcircuits 4304, III-V tunable laser subcircuits 4306 and photodetector subcircuits 4308. An exemplary fiber array 4301, e.g., optical fiber array 4310 (e.g., of type SMF-28), is also shown in FIG. 43A. When a particular chiplet type (e.g., fiber array PM 4312) is out of stock, the virtual representation of the chiplet may indicate as such (e.g., by a different color, description, marker, etc.). FIG. 43B shows nitride photonic subcircuits 4320 and graphene photonic subcircuits 4321. In an example, the nitride photonic subcircuits 4320 can include double wavelength demultiplexer subcircuit 4322, 4×1 splitter tree subcircuit 4324, Bragg reflector subcircuit 4326, 1 meter delay line subcircuit 4328, wavelength demultiplexer subcircuit 4330, 1×4 splitter tree subcircuit 4332, nitride double ring resonator subcircuit 4334 and micro-ring resonator subcircuit 4336. In another example, the graphene photonic subcircuits 4321 can include graphene phase shifter subcircuit 4338 and graphene saturable absorber subcircuit 4339. FIG. 43C shows hybrid photonic subcircuits 4340, lithium niobite photonic subcircuits 4341, and garnet photonic subcircuits 4343. In an example, the hybrid photonic subcircuits 4340 can include DFB laser subcircuit 4342, hybrid photodetector (PD) subcircuit 4344, reflective semiconductor optical amplifier subcircuit 4346, hybrid DBR laser subcircuits 4348, and transparent semiconductor optical amplifier subcircuit 4350. In another example, the lithium niobate photonic subcircuits 4341 can include a Mach-Zehnder modulator 4352 and an ultra-high speed phase shifter 4354. In yet another example, the garnet photonic subcircuit 4341 can include an isolator subcircuit 4356. FIG. 43D shows active optical photonics subcircuits 4360. In an example, the active optical photonic subcircuits 4360 can include thermal phase shifter subcircuit 4362, 2×2 combiners+PD subcircuit 4364, tunable splitter subcircuit 4366, photodetector subcircuit 4368, variable optical attenuator (VOA) and power monitor subcircuit 4370, Mach-Zehnder modulators subcircuit 4372, variable optical attenuator subcircuit 4374, balanced photodetector subcircuit 4376, bidirectional power monitor subcircuit 4378, high speed phase shifter subcircuit 4380, high speed photodetector subcircuit 4382 and ring modulator 4384. As shown in FIG. 43D, the high-speed photodetector subcircuit 4382 can be grayed out to show that that subcircuit is out of stock.

Referring to FIGS. 44A-44D, various virtual photonic integrated subcircuits as displayed on a menu of the user interface are presented, according to some embodiments. In some embodiments, the virtual photonic integrated subcircuits presented include passive optical photonic subcircuits 4400. The passive optical photonic subcircuits 4400 can include, but not limited to, splitter subcircuits, polarizer subcircuits, resonator subcircuits, waveguides subcircuits, among others. In a particular example, as shown, the passive optical photonic subcircuits 4400 can include a 2×1 splitter subcircuit 4402, a 2×1 splitter (middle, extra) subcircuit 4404, a 2×1 splitter (middle) subcircuit 4406, a 2×1 combiner subcircuit 4408, a 1×2 splitter (bottom) subcircuit 4410, a 1×2 splitter+crossing (bottom) subcircuit 4412, a 1×2 splitter+crossing subcircuit 4414, a 1×2 splitter (middle) subcircuit 4416, a 1×2 splitter (top) subcircuit 4418, a polarization rotator splitters (sorted) subcircuit 4420, a polarization rotator splitters (left) subcircuit 4422, a Bragg reflector subcircuit 4424, a loopback subcircuit 4426, a micro-ring resonator subcircuit 4428, a micro-ring resonator (middle) subcircuit 4430, a 90 degree hybrid subcircuit 4432, a double 90 degree hybrid subcircuit 4434, a polarization splitter rotator subcircuit 4436, a polarization splitter rotator (middle) subcircuit 4438, a polarization splitter rotator (middle-top) subcircuit 4440, a 1×4 splitter tree subcircuit 4442, a chiplet splitter subcircuit (5 mm) 4444, a chiplet splitter subcircuit 4446, a 4×1 splitter tree subcircuit 4448, a TM mode filters subcircuit 4450, a spotsize converter right 4452, a spot size converter left 4454, a 2×2 splitter (bottom) subcircuit 4456, a 2×2 splitter subcircuit 4458, 2×2 splitter (middle) subcircuit 4460, 2×2 splitter (top) subcircuit 4462, a crossing subcircuit 4464, a route waveguides subcircuit 4466, a route waveguides down subcircuit 4468, a route waveguides up subcircuit 4470, a straight waveguides 4472, a big spotsize converter right subcircuit 4474, big spot size converter left subcircuit 4476, 1×3 chiplet splitter subcircuit 4478, and a 1×2 chiplet splitter 4480.

Further, standardization of commonly used integrated photonics assemblies, herein referred to as "circuit templates" or "virtual templates" may be beneficial as they represent common combinations of various single photonic integrated subcircuits that may be fabricated quickly and affordably. Circuit templates, including their constituent photonic integrated subcircuits, and their potential uses are described herein. The specific circuit templates provided herein are given as an illustrative example, but any number of photonic integrated subcircuits substitutions may be made without departing from the scope of the present disclosure. Additionally, as used herein, circuit templates may refer to pre-configured physical integrated photonics assemblies. Furthermore, virtual templates may refer to pre-configured virtual integrated photonics assemblies, the pre-configured virtual integrated photonics assemblies can correspond to a physical integrated photonics assembly and/or correspond to a configured virtual integrated photonics assembly that includes at least one virtual photonic integrated subcircuit that directly corresponds to a physical photonic integrated subcircuit.

Figure 45:
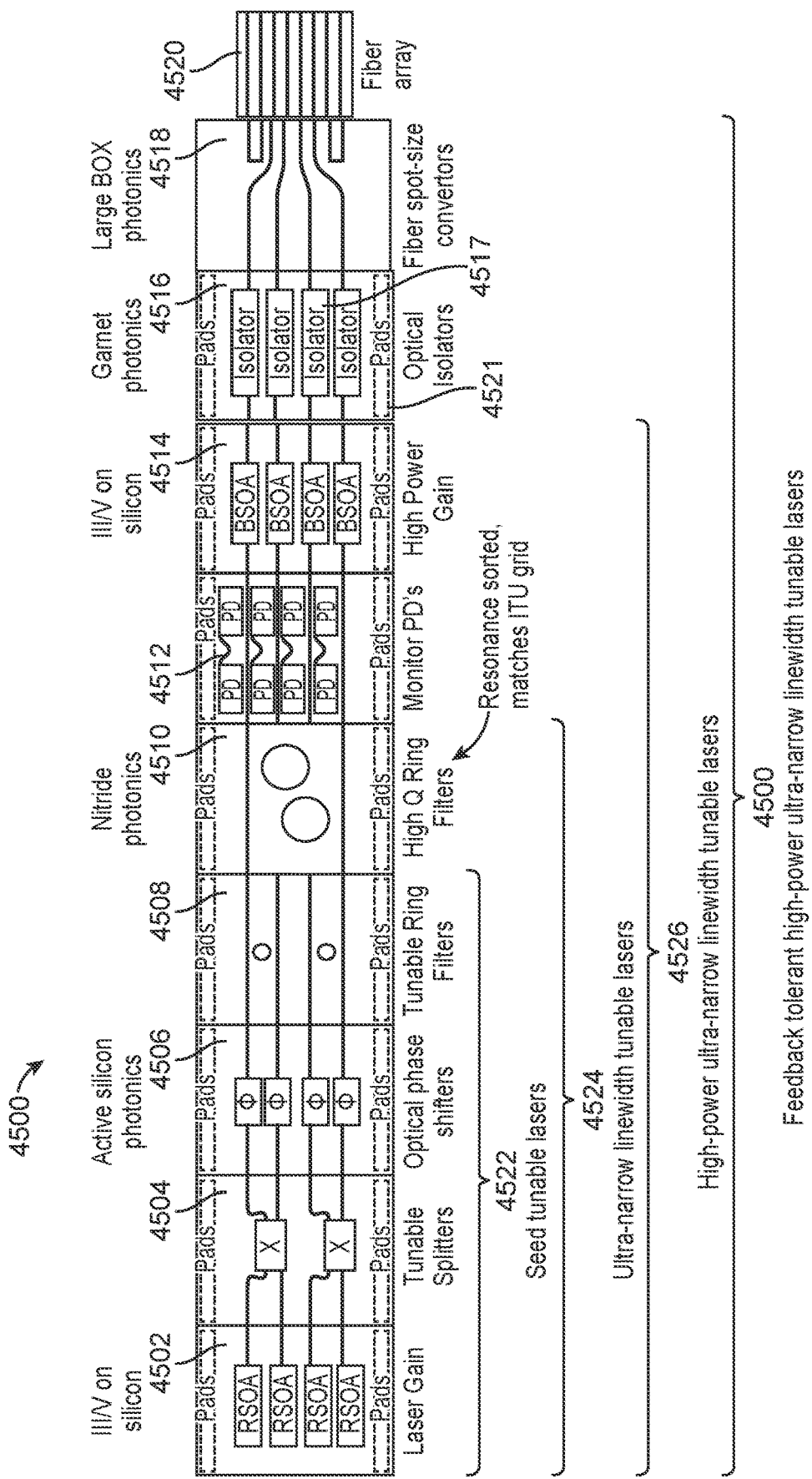
FIG. 45 is a graphical representation of an example virtual template for a feedback tolerant, high-power, ultra-narrow linewidth tunable laser array.

Referring to FIG. 45, a virtual template for a feedback tolerant, high-power, ultra-narrow linewidth tunable laser array is presented, according to some embodiments. The virtual template 4500 can include various combinations of III/V on silicon, active silicon photonics, nitride photonics, garnet photonics, and large BOX photonic subcircuits. In a particular example, virtual template 4500 can include a laser gain subcircuit 4502, a tunable splitters subcircuit 4504, an optical phase shifters subcircuit 4506, tunable ring filters subcircuit 4508, high Q ring filters subcircuit 4510, photodetection monitoring subcircuit 4512, high power gain subcircuit 4514, optical isolators subcircuit 4516 (e.g., including isolators 4517), fiber spot size converters subcircuit 4518 and a fiber array 4520. Each of the subcircuits can include a pad 4521. In some embodiments, specific subsets of the virtual template described in FIG. 45 may function independently. In an example, a laser gain subcircuit 4502, a tunable splitters subcircuit 4504, an optical phase shifters subcircuit 4506, and the tunable ring filters subcircuit 4508 can together be combined to form a seed tunable laser 4522. In a further example, combining the high Q ring filters subcircuit 4510 to the seed tunable laser assembly 4522 can together form ultra-narrow linewidth tunable lasers 4524. In another example, combining the photodetection monitoring subcircuit 4512 and high-power gain subcircuit 4514 to the ultra-narrow linewidth tunable laser assembly 4524 can form high-power ultra-narrow tunable lasers 4526. In one example, combining the optical isolators subcircuit 4516 and fiber spot size converters subcircuit 4518 to the high-power ultra-narrow tunable laser assembly 4526 can act form the feedback tolerant, high-power, ultra-narrow linewidth tunable laser array assembly 4500 shown in FIG. 45.

Figure 46:
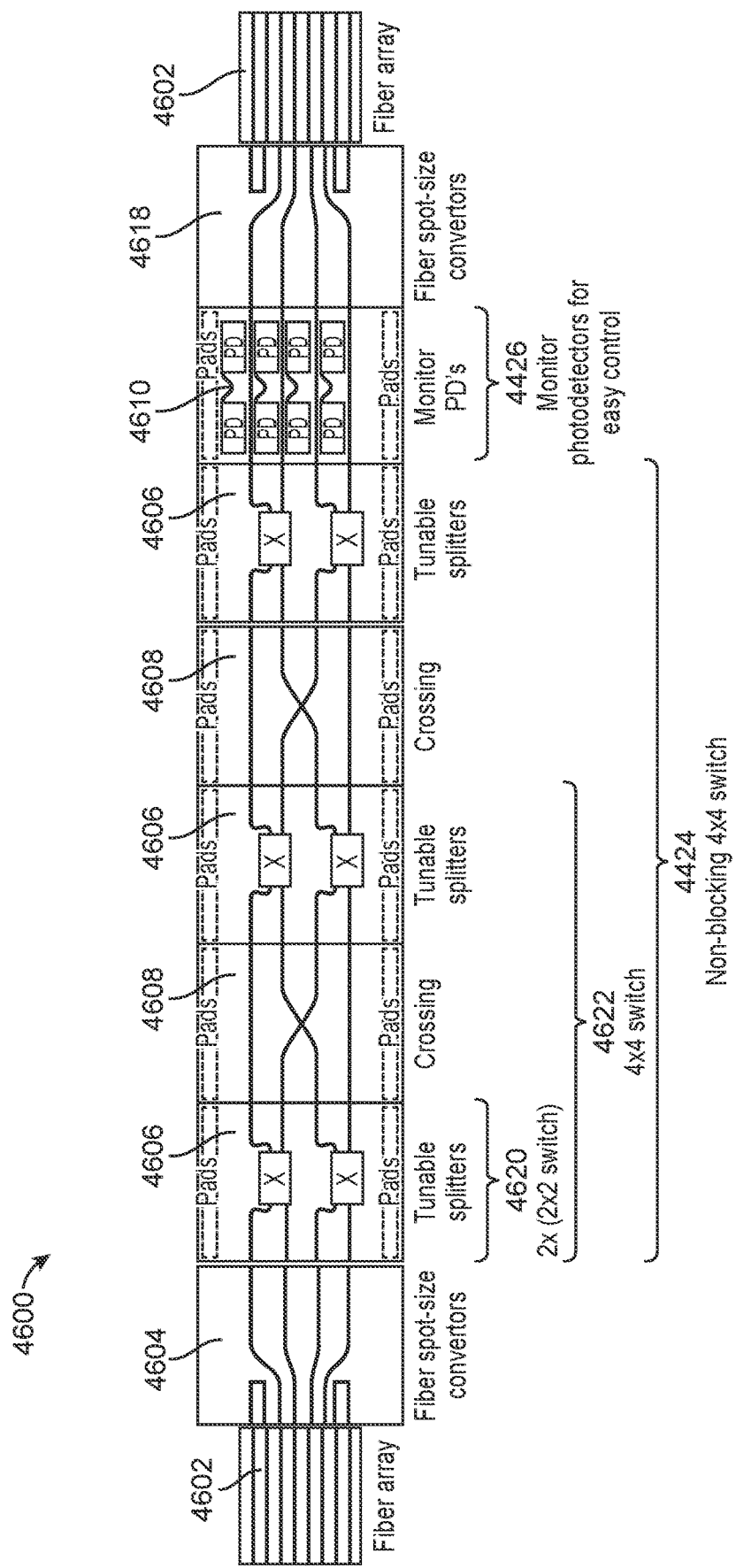
FIG. 46 is a graphical representation of an example virtual template for a non-blocking optical switch.

Referring to FIG. 46, a virtual template for a non-blocking optical switch is presented, according to some embodiments. In some embodiments, the virtual template 4600 may include fiber array subcircuit 4602, fiber spot size convertor subcircuit 4604, tunable splitters subcircuit 4606, crossing components subcircuit 4608, photodetection monitoring component subcircuit 4610, and fiber spot size converter subcircuit 4618. In some embodiments, specific subsets of the virtual template described in FIG. 46 may function as 2×2 switch assemblies 4620, 4×4 switch assemblies 4622, and non-blocking 4×4 switch assemblies 4424. In some examples, the photodetection monitoring component subcircuit 4610 can monitor photodetectors for ease and/or practical control 4426.

Figure 47:
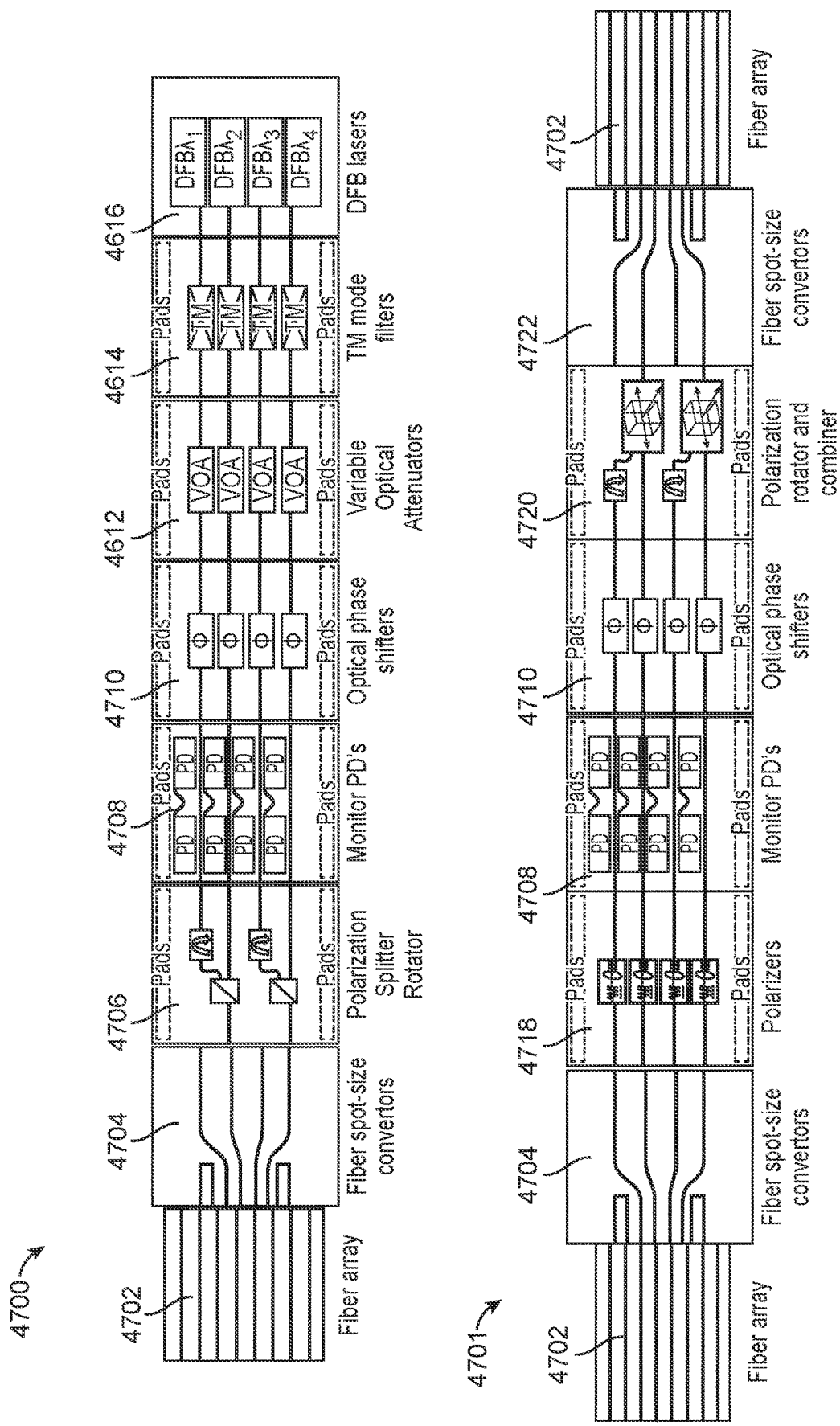
FIG. 47 a graphical representation of two example virtual templates for polarization rotator assemblies.

In FIG. 47, two virtual templates for polarization rotator assemblies are presented, according to some embodiments. The virtual templates 4700, 4701 may include fiber array subcircuit 4702, fiber spot size convertor subcircuit 4704, 4722, polarization splitter rotator subcircuit 4706, photodetection monitoring component subcircuit 4708, optical phase shifter subcircuit 4710, TM mode filter subcircuit 4614, DFB laser subcircuit 4616, polarizers 4718, and/or polarization rotator and combiner subcircuit 4720.

Figure 48:
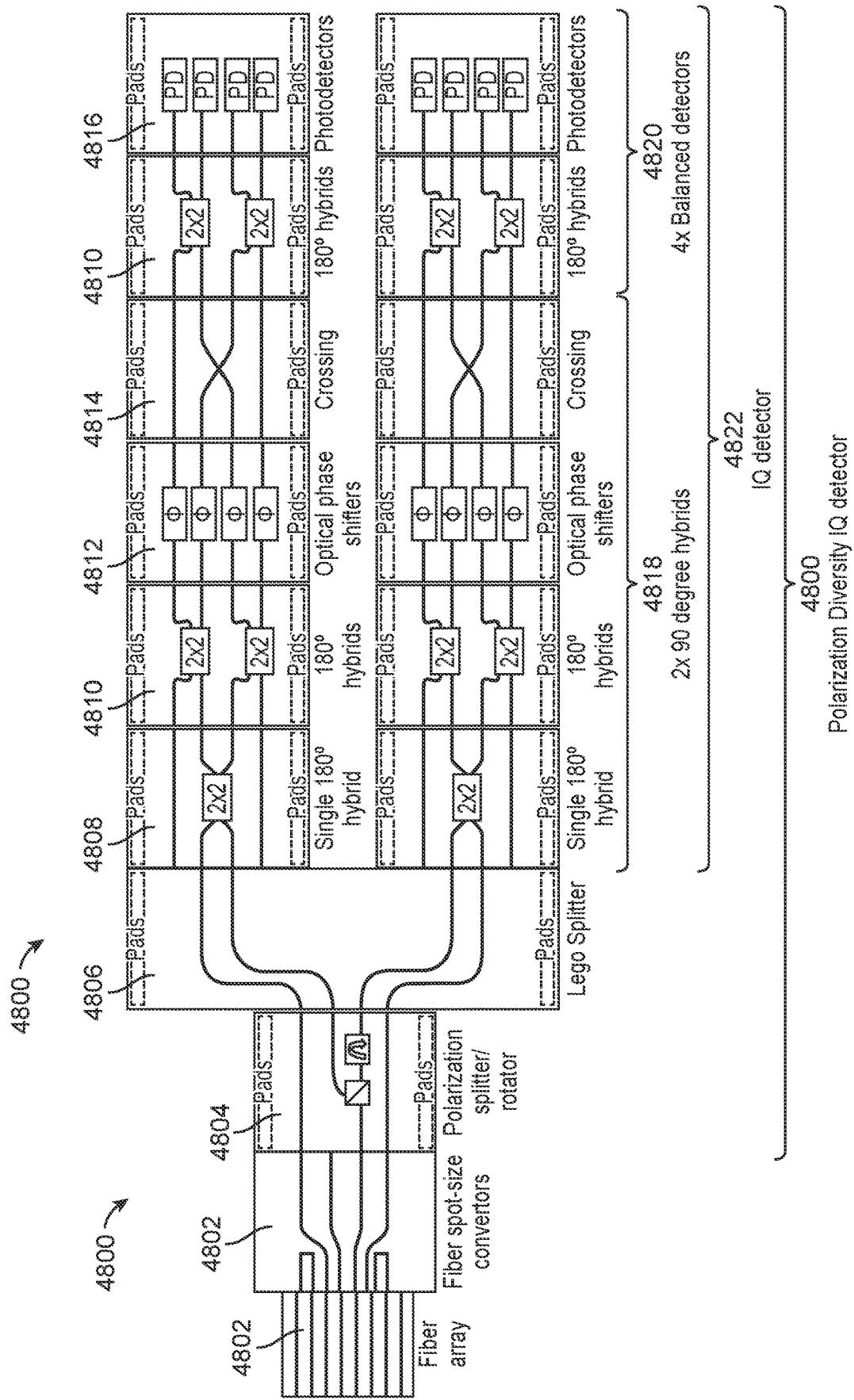
FIG. 48 is a graphical representation of an example of a polarization diversity IQ detector virtual template.

Referring to FIG. 48, a virtual template for a polarization diversity in-phase and quadrature (11Q) detector is presented, according to some embodiments. FIG. 48 shows a 1.5 D photonic assembly 4800 which can enable seamless polarization diversity assemblies. In an example, the virtual template 4800 may include a fiber array subcircuit 4802, a fiber spot size convertor subcircuit 4804, a polarization splitters and rotators subcircuit 4704, a lego splitter subcircuit (e.g., a subcircuit that may split up the subcircuit and/or photonic assembly into independent rows or columns of subcircuits) 4806, a single 180 degree hybrid subcircuit 4808, a 180 degree hybrid subcircuit 4810, an optical phase shifter subcircuit 4812, a crossing component subcircuit 4814, and a photodetector subcircuit 4816. In some embodiments, specific subsets of the virtual template 4800 may function as 2×90 degree hybrid assembly 4818, a 4× balanced detector assembly 4820, and an IQ detector assembly 4822.

Figure 49:
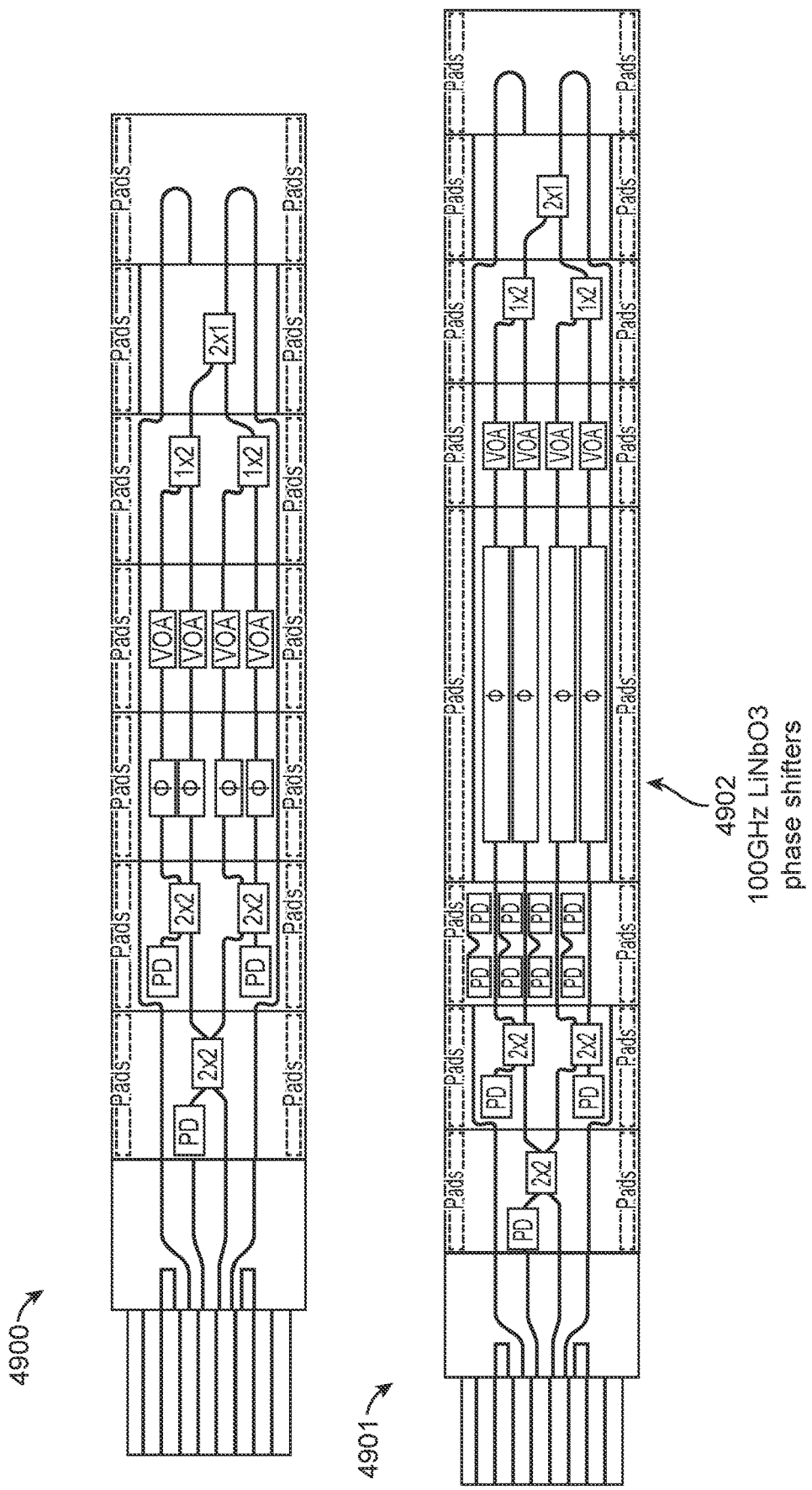
FIG. 49 is a graphical representation of an example virtual template of an IQ modulator.

Referring to FIG. 49, two virtual templates for an IQ modulator is presented, according to some embodiments. The virtual templates 4900, 4901 can include the various virtual photonic integrated subcircuits described above, e.g., in FIGS. 43A-44D. Of particular importance is the addition of a lithium niobate phase shifters subcircuit 4902 as shown in the bottom circuit. In a further example, the use of lithium niobate modulators 4902 may enable significant enhancement in speed relative to silicon photonics applications.

Figure 50:
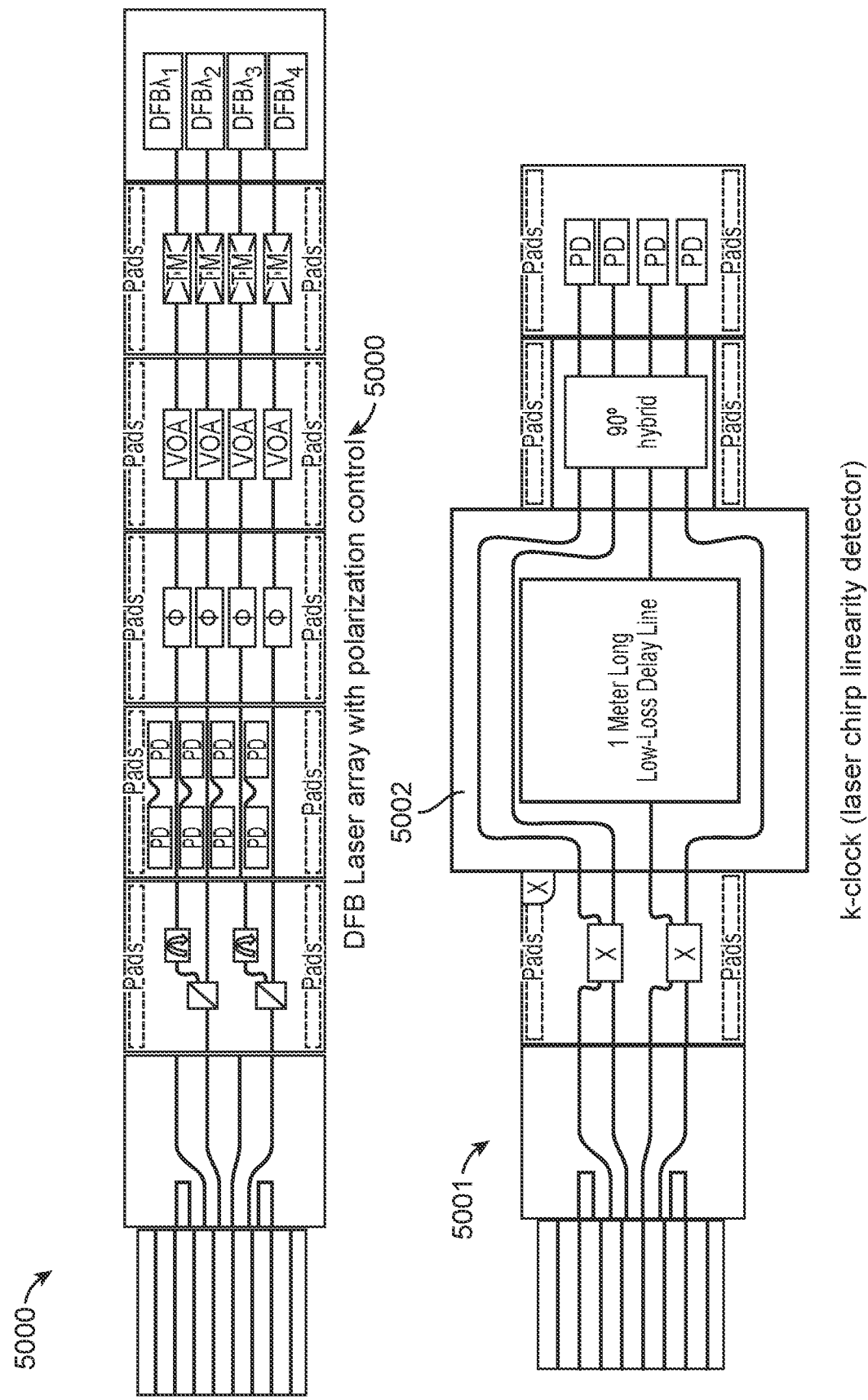
FIG. 50 is a graphical representation of two example virtual templates coupled together including a DFB laser array with polarization control and a k-clock or laser chip linearity detector.

Referring to FIGS. 50A and 50B, two virtual templates for distributed feedback (DFB) laser array with polarization control and a k-clock or laser chip linearity detector are presented respectively, according to some embodiments. In some embodiments, the use of ultra-low-loss delay lines may permit polarization-maintaining fiber-like performance. In an example, both the distributed feedback (DFB) laser array with polarization control 5000 virtual template in 50A and the polarization control and a k-clock or laser chip linearity detector 5001 shown in FIG. 50B can include the various virtual photonic integrated subcircuits described in FIGS. 1 and 2. In one example, the k-clock 5001 may include long (e.g. 1 meter) low-loss delay line subcircuit 5002.

Figure 51:
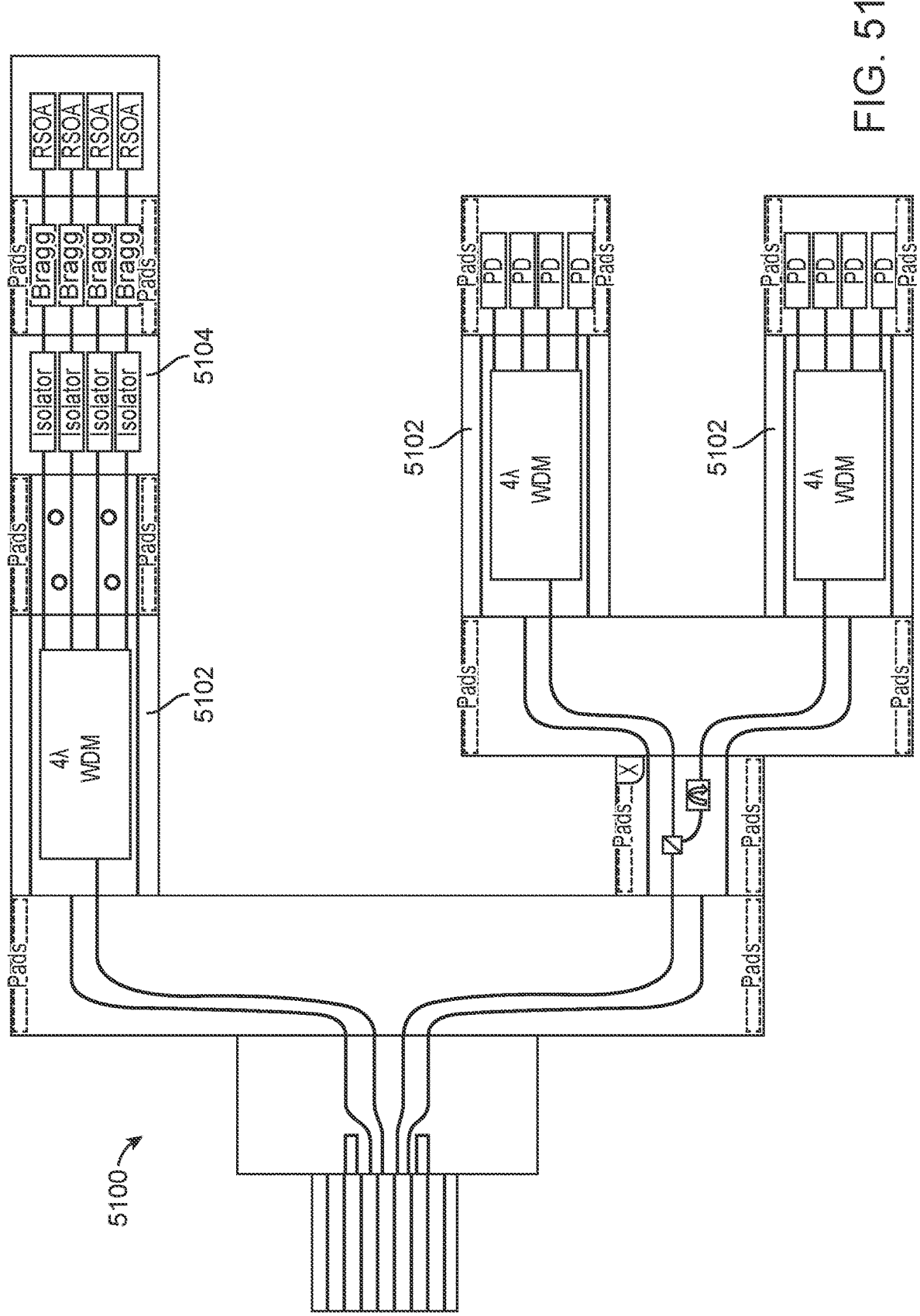
FIG. 51 is a graphical representation of an example virtual template of a CWDM transceiver and isolator.

Referring to FIG. 51, a virtual template for a coarse wavelength division multiplexing (CWDM) transceiver is presented, according to some embodiments. Similar to the above, the virtual template for CWDM transceiver 5100 can include the various virtual photonic integrated subcircuits described in FIGS. 43A-44D. In some embodiments, the use of ultra-low loss nitride WDM 5102 and isolators 5104 may be integrated and pre-yielded into the integrated photonics assembly that corresponds to the virtual template 5100.

Figure 52:
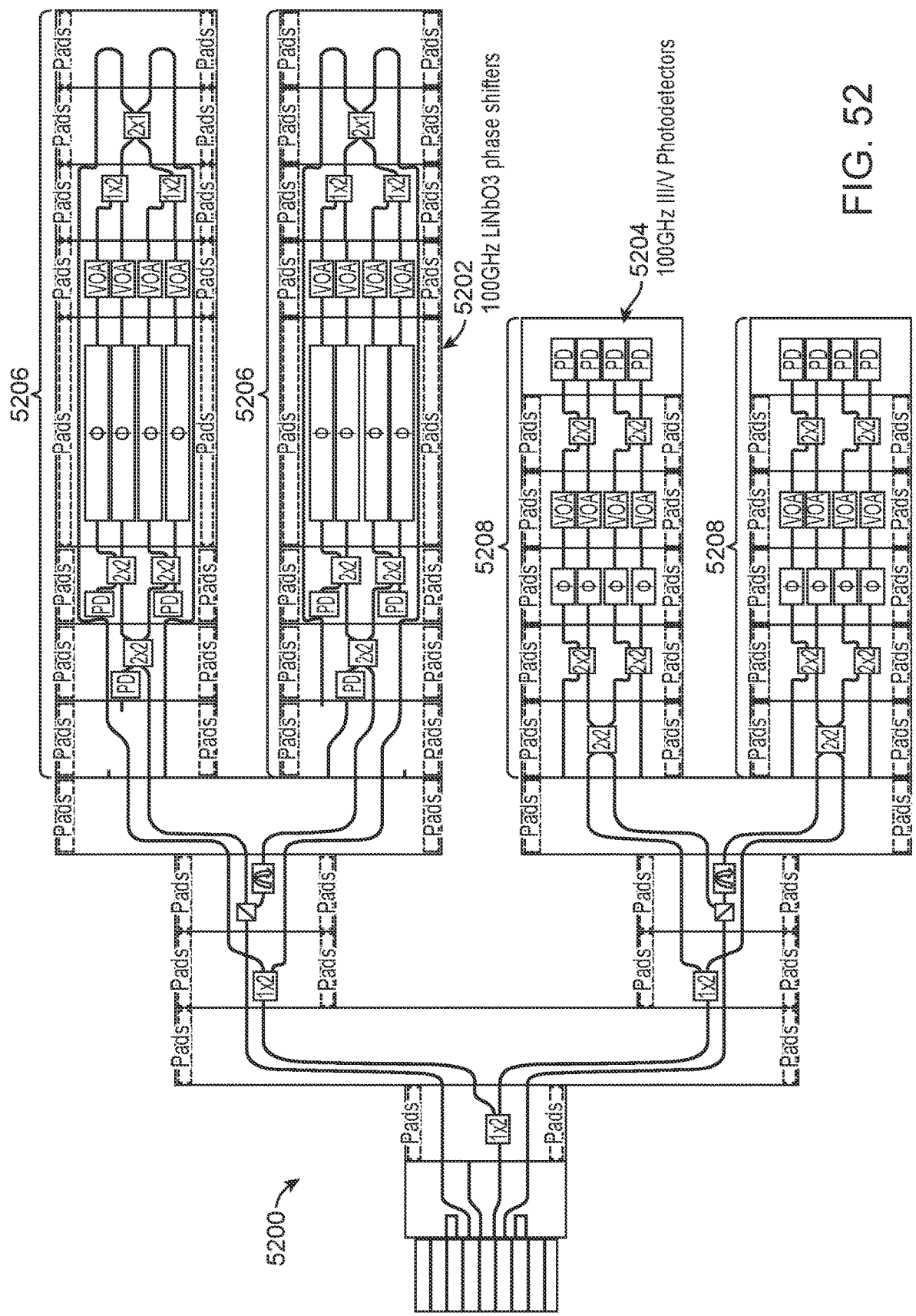
FIG. 52 is a graphical representation of an example virtual template for a PM-QPSK transceiver.

Referring to FIG. 52, a virtual template for a polarization multiplexed-quadrature phase shift keying (PM-QPSK) transceiver is presented, according to some embodiments. In some embodiments, the virtual template for a polarization multiplexed-quadrature phase shift keying (PM-QPSK) transceiver 5200 can include the various virtual photonic integrated subcircuits described for FIGS. 43A-44D. In some embodiments, the virtual template 5200 can include 100 GHz lithium niobate phase shifter subcircuit 5202 and 100 GHz III/V photodetector subcircuit 5204. Additionally, in one example and as shown, polarization diversity may be achieved through the use of identical assemblies 5206, 5208 connected in parallel.

Figure 53:
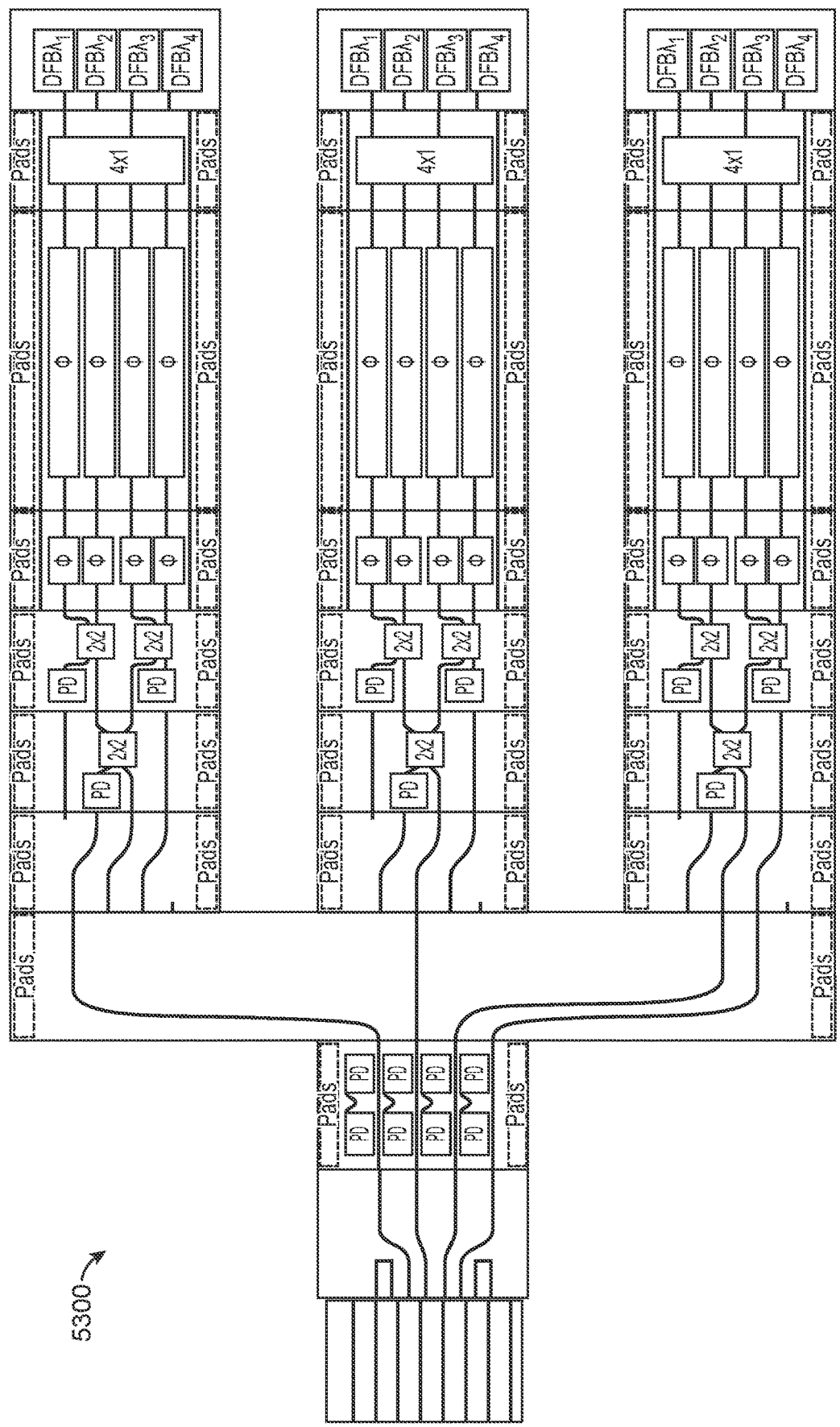
FIG. 53 is a graphical representation of an example photonic array virtual template.

Referring to FIG. 53, a virtual template for a photonic array is presented, according to some embodiments. The virtual template for a photonic array 5300, in one example, can highlights how arrays of devices may easily be combined to the same subcircuit and/or combined on the same photonics assembly. In some examples, the virtual template 5300 can include the various virtual photonic integrated subcircuits described in FIGS. 43A-44D.

Figure 54:
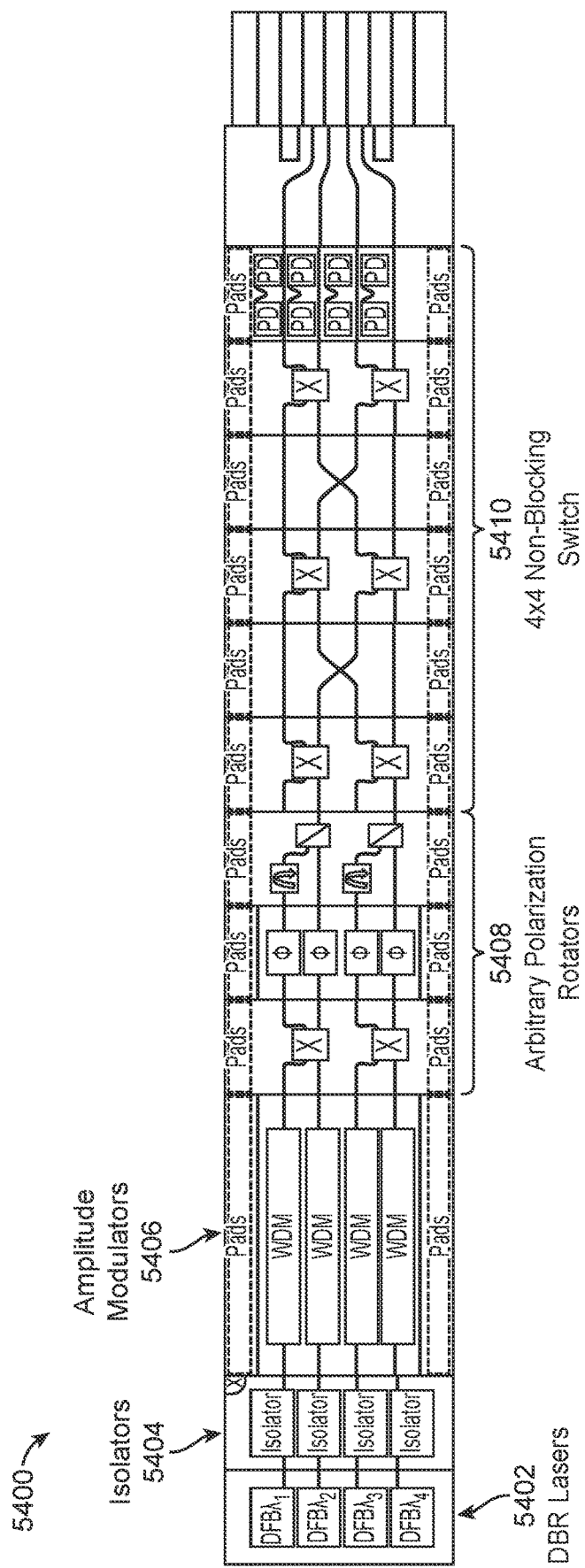
FIG. 54 is a graphical representation of an example virtual integrated photonics assembly.

Referring to FIG. 54, another exemplary virtual template is presented, according to some embodiments. In some embodiments, the virtual template 5400 can further illustrate how multiple different functional photonic assemblies may be easily combined. In one example, a distributed Bragg reflector (DBR) laser subcircuit 5402, isolator subcircuit 5404, amplitude modulator subcircuit 5406, arbitrary polarization rotator subcircuit 5408, and a 4×4 non-blocking switch subcircuit 5410 may be combined to form a larger virtual template and/or integrated photonics assembly 5400, as shown.

Figure 55:
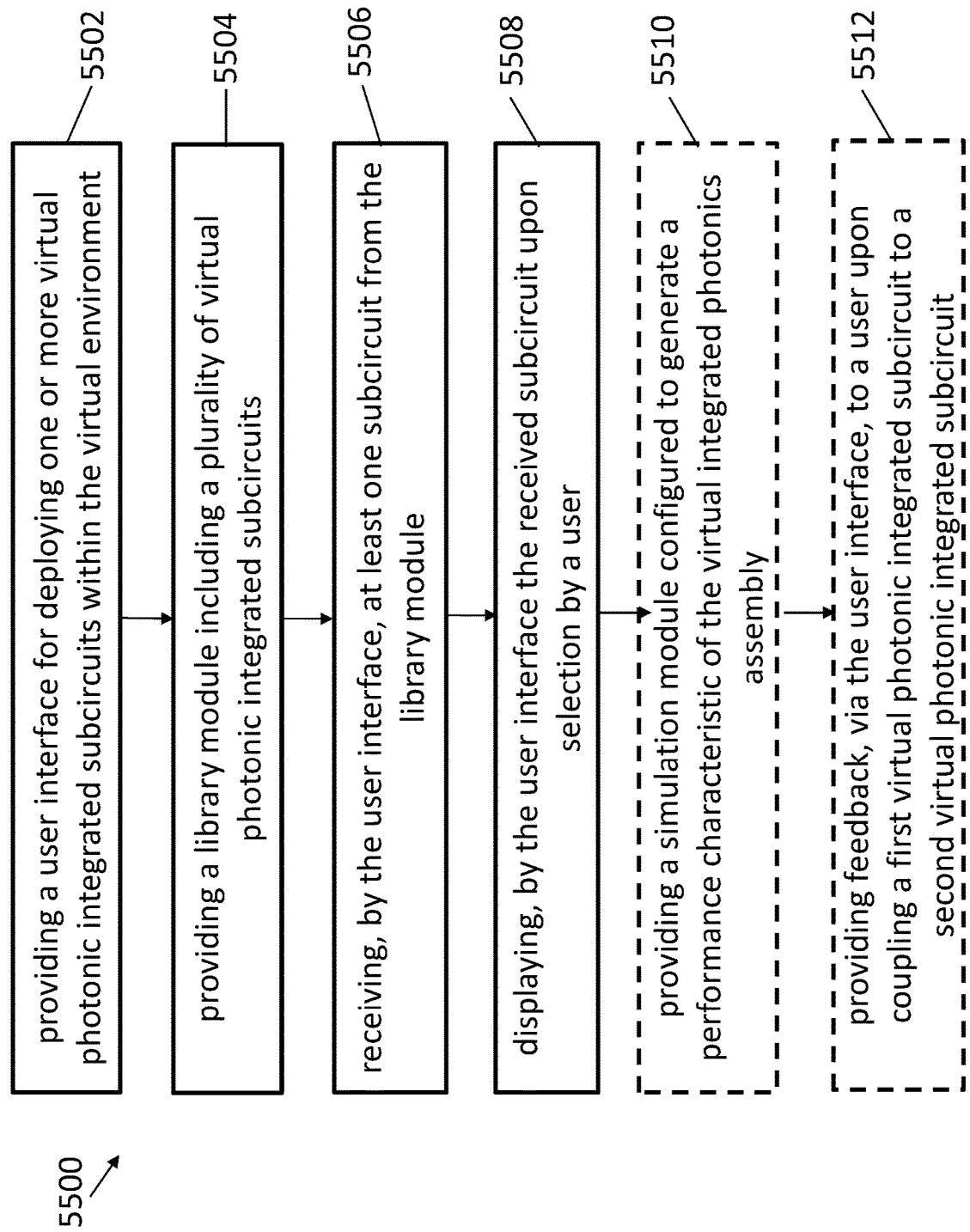
FIG. 55 is a flowchart for a method for generating a virtual environment for implementing an integrated photonics assembly.

Referring to FIG. 55, a flowchart for a method for generating a virtual environment for implementing an integrated photonics assembly is presented, according to some embodiments. A step 5502 of the flowchart 5500 can include providing a user interface for deploying one or more virtual photonic integrated subcircuits within the virtual environment. In some embodiments, the virtual environment can be configured to enable coupling of at least two virtual photonic integrated subcircuits. In some embodiments, the coupling of the virtual photonic integrated subcircuits forms a virtual integrated photonics assembly. A step 5504 can include providing a library module including a plurality of virtual photonic integrated subcircuits. In some embodiments, at least one of the plurality of virtual photonic integrated subcircuits includes a performance characteristic, and the performance characteristic can represent a real-world performance characteristic of a pre-fabricated physical photonic integrated subcircuit corresponding to the at least one virtual photonic integrated subcircuit. A step 5506 can include receiving, by the user interface, at least one subcircuit from the library module. A step 5508 can include displaying, by the user interface, the received subcircuit upon selection by a user. An optional step 5510 can include providing a simulation module configured to generate a performance characteristic of the virtual integrated photonics assembly. In some embodiments, the performance characteristic of the virtual integrated photonics assembly can represent a real-world performance characteristic of a physical integrated photonics assembly corresponding to the virtual integrated photonics assembly. An optional step 5512 can include providing feedback, via the user interface, to a user upon coupling a first virtual photonic integrated subcircuit to a second virtual photonic integrated subcircuit.

Figure 56:
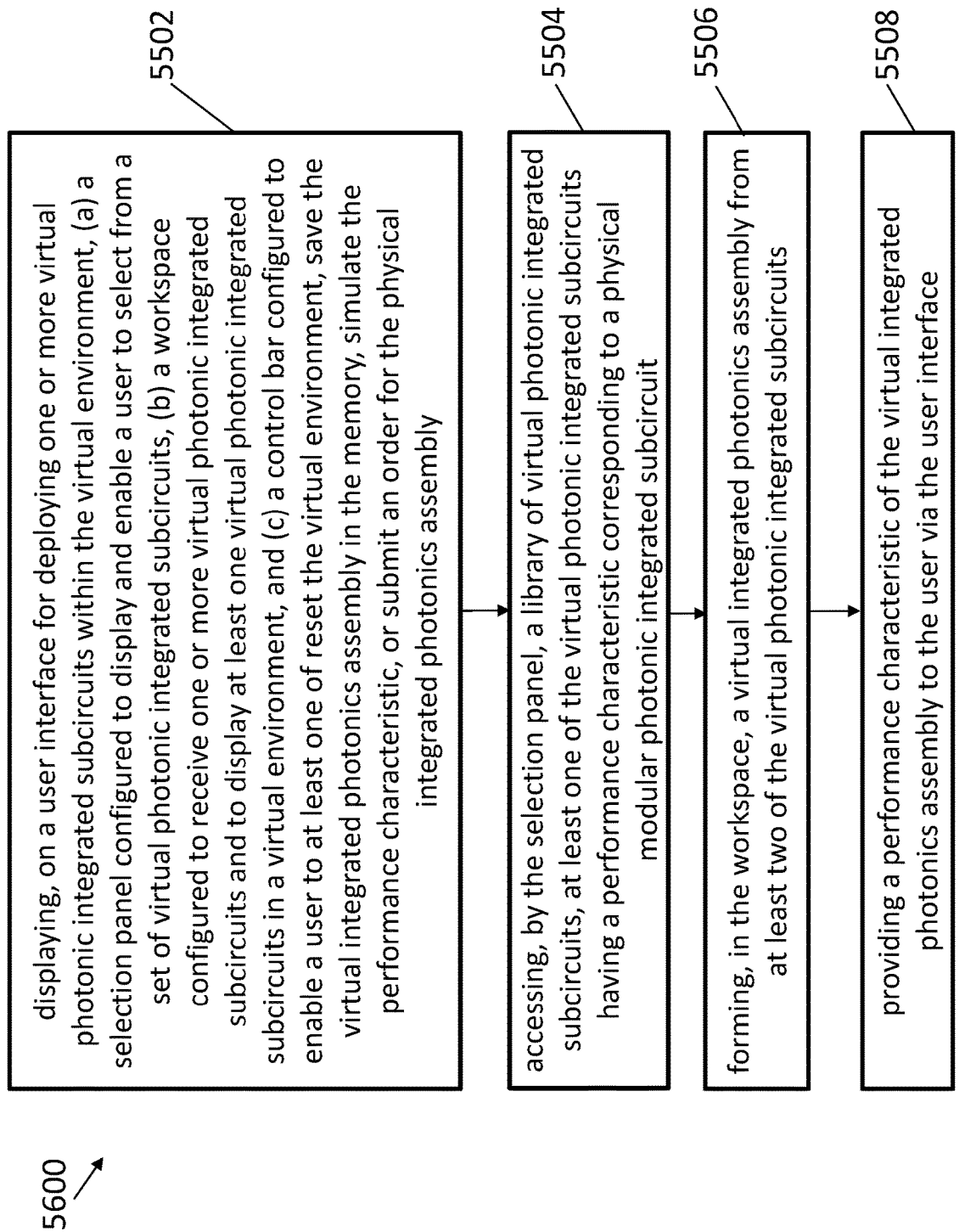
FIG. 56 is a flowchart for a method for implementing an integrated photonics assembly in a virtual environment.

Referring to FIG. 56, a flowchart for a method for implementing an integrated photonics assembly in a virtual environment is presented, according to some embodiments. A step 5602 of the flowchart 5600 can include displaying, on a user interface for deploying one or more virtual photonic integrated subcircuits within the virtual environment, (a) a selection panel configured to display and enable a user to select from a set of virtual photonic integrated subcircuits, (b) a workspace configured to receive one or more virtual photonic integrated subcircuits and to display at least one virtual photonic integrated subcircuits in a virtual environment, and (c) a control bar configured to enable a user to at least one of reset the virtual environment, save the virtual integrated photonics assembly in the memory, simulate the performance characteristic, or submit an order for the physical integrated photonics assembly. A step 5604 can include accessing, by the selection panel, a library of virtual photonic integrated subcircuits, at least one of the virtual photonic integrated subcircuits having a performance characteristic corresponding to a physical modular photonic integrated subcircuit. A step 5606 can include forming, in the workspace, a virtual integrated photonics assembly from at least two virtual photonic integrated subcircuits. A step 5608 can include providing a performance characteristic of the virtual integrated photonics assembly to the user via the user interface.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described components and systems can generally be integrated together in a single device or system or packaged into multiple devices or systems.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of" or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system for generating a virtual environment for implementing an integrated photonics assembly, the system comprising:
   one or more processors; and
   a memory coupled with the one or more processors, wherein the processor executes a plurality of modules stored in the memory, and wherein the plurality of modules comprises:
      a user interface module for deploying one or more virtual photonic integrated subcircuits within the virtual environment, the virtual environment configured to enable coupling of at least two virtual photonic integrated subcircuits, wherein the coupling of the virtual photonic integrated subcircuits comprises an alignment of at least one coupling mechanism of the virtual photonic integrated subcircuits, and further forms a virtual integrated photonics assembly; and
      a library module comprising a plurality of virtual photonic integrated subcircuits, wherein:
         at least one of the plurality of virtual photonic integrated subcircuits comprises a performance characteristic,
         the performance characteristic represents a real-world performance characteristic of a pre-fabricated physical photonic integrated subcircuit corresponding to the at least one virtual photonic integrated subcircuit, and
         at least one of the plurality of virtual photonic integrated subcircuits is rotatable and is configured for rotational alignment using a pick and place tool to constrain rotation relative to a lateral alignment feature which includes a deep trench etch;
         wherein the user interface module is further configured to provide feedback to the user to highlight proper circuit construction based on the plurality of virtual photonic integrated subcircuits of the library module.

2. The system of claim 1, further comprising a simulation module configured to generate a performance characteristic of the virtual integrated photonics assembly, wherein the performance characteristic of the virtual integrated photonics assembly represents a real-world performance characteristic of a physical integrated photonics assembly corresponding to the virtual integrated photonics assembly.

3. The system of claim 1, wherein the pre-fabricated physical photonic integrated subcircuit contributes to a greater fabrication yield of:
   (i) a physical integrated photonics assembly having the pre-fabricated physical photonic integrated subcircuit having the performance characteristic, wherein the performance characteristic is of a type, than
   (ii) a monolithic photonics integrated circuit having a performance characteristic of a same type.

4. The system of claim 1, wherein the user interface further comprises:
   a selection panel configured to (i) display and (ii) enable a user to select from a set of virtual photonic integrated subcircuits, wherein the displayed set of virtual photonic integrated subcircuits is received from the library module; and
   a control bar configured to enable a user to at least one of: (a) reset the virtual environment, (b) save the virtual integrated photonics assembly in the memory, (c) simulate the performance characteristic, or (d) submit an order for the physical integrated photonics assembly.

5. The system of claim 1, wherein the plurality of virtual photonic integrated subcircuits comprises at least one of a virtual III-V semiconductor subcircuit, a virtual nitride-based semiconductor subcircuit, a virtual graphene-based subcircuit, a virtual hybrid subcircuit, a 15 virtual heterogeneous subcircuit, a hybrid integration subcircuit comprising Ill-V semiconductor materials, a virtual lithium niobite subcircuit a virtual optical fiber-based subcircuit, a virtual active subcircuit, a virtual garnet subcircuit, a virtual silicon photonic subcircuit, a virtual glass based subcircuit, a virtual electron beam-fabricated subcircuit, a virtual fiber-to-chip coupling subcircuit, a virtual MEMS-photonic subcircuit, a virtual phase change-based subcircuit, or a 20 virtual passive subcircuit.

6. The system of claim 1, wherein the user interface is configured to provide feedback to a user upon coupling a first virtual photonic integrated subcircuit to a second virtual photonic integrated subcircuit.

7. The system of claim 1, wherein the performance characteristic comprises an optical 30 transmission as a function of wavelength.

8. The system of claim 1, wherein an insertion of at least one virtual photonic integrated subcircuit dynamically alters the virtual environment.

9. The system of claim 1, further comprising:
a template library module comprising a plurality of virtual templates, each virtual template comprising at least two virtual photonic integrated subcircuits coupled together to form a pre-configured virtual integrated photonics assembly.

10. The system of claim 9, wherein the virtual templates comprise at least one of a virtual laser photonics assembly, a virtual modulator photonics assembly, a virtual switch photonics assembly, a virtual transceiver photonics assembly, or a virtual polarization photonics assembly.

11. The system of claim 1, wherein the virtual environment is configured to simulate at least one of (i) light transfer or (ii) light reception between a first subcircuit and a second subcircuit of the plurality of subcircuits.

12. A method for generating a virtual environment for implementing an integrated photonics assembly, the method comprising:
providing a user interface for deploying one or more virtual photonic integrated subcircuits within the virtual environment, the virtual environment configured to enable coupling of at least two virtual photonic integrated subcircuits, wherein the coupling of the virtual photonic integrated subcircuits comprises an alignment of at least one coupling mechanism of the virtual photonic integrated subcircuits and further forms a virtual integrated photonics assembly;
providing a library module comprising a plurality of virtual photonic integrated subcircuits, wherein:
at least one of the plurality of virtual photonic integrated subcircuits comprises a performance characteristic,
the performance characteristic represents a real-world performance characteristic of a pre-fabricated physical photonic integrated subcircuit corresponding to the at least one virtual photonic integrated subcircuit, and
at least one of the plurality of virtual photonic integrated subcircuits is rotatable and is configured for rotational alignment using a pick and place tool to constrain rotation relative to a lateral alignment feature which includes a deep trench etch;
receiving, by the user interface, at least one subcircuit from the library module;
displaying, by the user interface, the received subcircuit upon selection by a user; and
providing, by the user interface, feedback to the user to highlight proper circuit construction based on the plurality of virtual photonic integrated subcircuits.

13. The method of claim 12, further comprising:
providing a simulation module configured to generate a performance characteristic of the virtual integrated photonics assembly, wherein the performance characteristic of the virtual integrated photonics assembly represents a real-world performance characteristic of a physical integrated photonics assembly corresponding to the virtual integrated photonics assembly.

14. The method of claim 12, wherein the pre-fabricated physical photonic integrated subcircuit contributes to a greater fabrication yield of:

(i) a physical integrated photonics assembly having the pre-fabricated physical photonic integrated subcircuit having the performance characteristic, wherein the performance characteristic is of a type, than
(ii) a monolithic photonics integrated circuit having a performance characteristic of a same type.

15. The method of claim 13, wherein the user interface further comprises:
a selection panel configured to (i) display and (ii) enable a user to select from a set of virtual photonic integrated subcircuits, wherein the displayed set of virtual photonic integrated subcircuits is received from the library module; and
a control bar configured to enable a user to at least one of:
(a) reset the virtual environment, (b) save the virtual integrated photonics assembly in a memory, (c) simulate the performance characteristic, or (d) submit an order for the physical integrated photonics assembly.

16. The method of claim 12, wherein the plurality of virtual photonic integrated subcircuits comprises at least one of a virtual III-V semiconductor subcircuit, a virtual nitride-based semiconductor subcircuit, a virtual graphene-based subcircuit, a virtual hybrid subcircuit, a virtual heterogeneous subcircuit, a hybrid integration subcircuit comprising III-V semiconductor materials, a virtual lithium niobite subcircuit, a virtual optical fiber-based subcircuit, a virtual active subcircuit, a virtual garnet subcircuit, a virtual silicon photonic subcircuit, a virtual glass based subcircuit, a virtual electron beam-fabricated subcircuit, a virtual fiber-to-chip coupling subcircuit, a virtual MEMS-photonic subcircuit, a virtual phase change-based subcircuit, or a virtual passive subcircuit.

17. The method of claim 12, further comprising:
providing feedback, via the user interface, to a user upon coupling a first virtual photonic integrated subcircuit to a second virtual photonic integrated subcircuit.

18. The method of claim 12, wherein the performance characteristic comprises an optical transmission as a function of wavelength.

19. The method of claim 12, further comprising:
dynamically altering the virtual environment upon an insertion of at least one virtual photonic integrated subcircuit.

20. The method of claim 12, further comprising:
a template library module comprising a plurality of virtual templates, each virtual template comprising at least two virtual photonic integrated subcircuits coupled together to form a pre-configured virtual integrated photonics assembly.

21. The method of claim 20, wherein the virtual templates comprise at least one of a virtual laser photonics assembly, a virtual modulator photonics assembly, a virtual switch photonics assembly, a virtual transceiver photonics assembly, or a virtual polarization photonics assembly.

22. The method of claim 12, wherein the virtual environment is configured to simulate at least one of (i) light transfer or (ii) light reception between a first subcircuit and a second subcircuit of the plurality of subcircuits.

23. A method for implementing an integrated photonics assembly in a virtual environment, the method comprising:
displaying, on a user interface for deploying one or more virtual photonic integrated subcircuits within the virtual environment, (a) a selection panel configured to display and enable a user to select from a set of virtual photonic integrated subcircuits, (b) a workspace configured to receive one or more virtual photonic integrated subcircuits and to display at least one virtual photonic integrated subcircuits in a virtual environment, and (c) a control bar configured to enable a user to at least one of reset the virtual environment, save the virtual integrated photonics assembly in a memory, simulate a performance characteristic, or submit an order for a physical integrated photonics assembly;

accessing, by the selection panel, a library of virtual photonic integrated subcircuits, at least one of the virtual photonic integrated subcircuits having a performance characteristic corresponding to a physical modular photonic integrated subcircuit, wherein at least one of the virtual photonic integrated subcircuits is rotatable and configured for rotational alignment using a pick and place tool to constrain rotation relative to a lateral alignment feature which includes a deep trench etch;

forming, in the workspace, a virtual integrated photonics assembly from at least two virtual photonic integrated subcircuits, wherein the at least two virtual photonic integrated subcircuits are coupled and wherein the coupling comprises an alignment of at least one coupling mechanism of the virtual photonic integrated subcircuits;

providing, by the user interface, feedback to the user to highlight proper circuit construction based on the virtual photonic integrated subcircuits; and providing a performance characteristic of the virtual integrated photonics assembly to the user via the user interface.

\* \* \* \* \*